(12) United States Patent
Coates

(10) Patent No.: US 12,458,435 B2
(45) Date of Patent: Nov. 4, 2025

(54) MULTIELECTRODE CATHETER

(71) Applicant: Medtronic Ireland Manufacturing Unlimited Company, Dublin (IE)

(72) Inventor: Paul J. Coates, Corte Madera, CA (US)

(73) Assignee: Medtronic Ireland Manufacturing Unlimited Company, Dublin (IE)

( * ) Notice: Subject to any disclaimer, the term of this patent is extended or adjusted under 35 U.S.C. 154(b) by 1122 days.

(21) Appl. No.: 16/255,579

(22) Filed: Jan. 23, 2019

(65) Prior Publication Data

US 2019/0223949 A1 Jul. 25, 2019

Related U.S. Application Data

(60) Provisional application No. 62/663,537, filed on Apr. 27, 2018, provisional application No. 62/621,351, filed on Jan. 24, 2018.

(51) Int. Cl.
*A61B 18/14* (2006.01)
*A61N 1/02* (2006.01)
(Continued)

(52) U.S. Cl.
CPC .......... *A61B 18/1492* (2013.01); *A61N 1/025* (2013.01); *A61N 1/0529* (2013.01);
(Continued)

(58) Field of Classification Search
CPC .............. A61B 18/1492; A61B 18/082; A61B 18/1206; A61B 2018/00577;
(Continued)

(56) References Cited

U.S. PATENT DOCUMENTS 4,602,624 A 7/1986 Naples et al.
4,649,936 A 3/1987 Ungar et al.
(Continued)

FOREIGN PATENT DOCUMENTS

CN 104271063 A 1/2015
CN 105939686 A 9/2016
(Continued)

OTHER PUBLICATIONS

P. K. Sekhar and V. Uwizeye, Review of sensor and actuator mechanisms for bioMEMS, 2012, Woodhead Publishing Limited, pp. 53, 59 (Year: 2012).*

(Continued)

*Primary Examiner* — Linda C Dvorak
*Assistant Examiner* — Lindsay Regan Lancaster
(74) *Attorney, Agent, or Firm* — Shumaker & Sieffert, P.A.

(57) ABSTRACT

In some examples, a catheter includes an elongated member comprising an electrode array including a distal electrode, a proximal electrode proximal to the distal electrode, and at least one intermediate electrode between the proximal and distal electrodes. The at least one intermediate electrode and at least one of the distal electrode or the proximal electrode differ in at least one electrode characteristic by at least a predetermined threshold. In some examples, delivery of a given electrical signal by each of the at least one intermediate electrode and the at least one of the distal electrode or the proximal electrode generates, for a given tissue site, substantially similar electric fields. In other examples, delivery of a given electrical signal by each of the at least one intermediate electrode and the at least one of the distal electrode or the proximal electrode generates, for a given tissue site, different electric fields.

19 Claims, 20 Drawing Sheets

(51) Int. Cl.
*A61N 1/05* (2006.01)
*A61B 18/00* (2006.01)
*A61B 18/08* (2006.01)
*A61B 18/12* (2006.01)

(52) U.S. Cl.
CPC .............. *A61B 2018/00404* (2013.01); *A61B 2018/00434* (2013.01); *A61B 2018/00511* (2013.01); *A61B 2018/00577* (2013.01); *A61B 2018/00875* (2013.01); *A61B 18/082* (2013.01); *A61B 18/1206* (2013.01); *A61B 2018/1253* (2013.01); *A61B 2018/126* (2013.01); *A61B 2018/1435* (2013.01); *A61B 2018/1467* (2013.01); *A61N 1/0551* (2013.01)

(58) Field of Classification Search
CPC .. A61B 2018/00875; A61B 2018/1435; A61B 2018/126; A61B 2018/00404; A61B 2018/00434; A61B 2018/00511; A61B 2018/1253; A61B 2018/1467; A61N 1/0529; A61N 1/025; A61N 1/0551
See application file for complete search history.

(56) References Cited

U.S. PATENT DOCUMENTS

| | | | |
|---|---|---|---|
| 4,764,504 A | 8/1988 | Johnson et al. | |
| 4,976,711 A | 12/1990 | Parins et al. | |
| 5,300,068 A | 4/1994 | Rosar et al. | |
| 5,358,514 A | 10/1994 | Schulman et al. | |
| 5,423,744 A | 6/1995 | Gencheff et al. | |
| 5,571,147 A | 11/1996 | Sluijter et al. | |
| 5,626,576 A | 5/1997 | Janssen | |
| 5,700,282 A | 12/1997 | Zabara | |
| 5,707,400 A | 1/1998 | Terry, Jr. et al. | |
| 5,749,914 A * | 5/1998 | Janssen | A61B 18/12 607/116 |
| 5,865,787 A | 2/1999 | Shapland | |
| 5,944,710 A | 8/1999 | Dev et al. | |
| 5,983,141 A | 11/1999 | Sluijter et al. | |
| 6,004,269 A | 12/1999 | Crowley et al. | |
| 6,009,877 A | 1/2000 | Edwards | |
| 6,066,134 A | 5/2000 | Eggers et al. | |
| 6,099,524 A | 8/2000 | Lipson et al. | |
| 6,117,101 A | 9/2000 | Diederich et al. | |
| 6,149,620 A | 11/2000 | Baker et al. | |
| 6,161,048 A | 12/2000 | Sluijter et al. | |
| 6,219,577 B1 | 4/2001 | Brown, III et al. | |
| 6,224,592 B1 | 5/2001 | Eggers et al. | |
| 6,246,912 B1 | 6/2001 | Sluijter et al. | |
| 6,273,886 B1 | 8/2001 | Edwards et al. | |
| 6,283,951 B1 | 9/2001 | Flaherty et al. | |
| 6,292,695 B1 | 9/2001 | Webster, Jr. et al. | |
| 6,405,732 B1 | 6/2002 | Edwards et al. | |
| 6,506,189 B1 | 1/2003 | Rittman et al. | |
| 6,514,226 B1 | 2/2003 | Levin et al. | |
| 6,522,926 B1 | 2/2003 | Kieval et al. | |
| 6,562,034 B2 | 5/2003 | Edwards et al. | |
| 6,635,054 B2 | 10/2003 | Fjield et al. | |
| 6,685,648 B2 | 2/2004 | Flaherty et al. | |
| 6,736,835 B2 | 5/2004 | Pellegrino et al. | |
| 6,845,267 B2 | 1/2005 | Harrison et al. | |
| 6,850,801 B2 | 2/2005 | Kieval et al. | |
| 6,885,888 B2 | 4/2005 | Rezai | |
| 6,893,436 B2 | 5/2005 | Woodard et al. | |
| 7,149,574 B2 | 12/2006 | Yun et al. | |
| 7,162,303 B2 | 1/2007 | Levin et al. | |
| 7,221,979 B2 | 5/2007 | Zhou et al. | |
| 7,381,200 B2 | 6/2008 | Katoh et al. | |
| 7,390,894 B2 | 6/2008 | Weinshilboum et al. | |
| 7,617,005 B2 | 11/2009 | Demarais et al. | |
| 7,647,115 B2 | 1/2010 | Levin et al. | |
| 7,653,438 B2 | 1/2010 | Deem et al. | |
| 7,717,948 B2 | 5/2010 | Demarais et al. | |
| 7,778,703 B2 | 8/2010 | Gross et al. | |
| 8,131,372 B2 | 3/2012 | Levin et al. | |
| 8,140,170 B2 | 3/2012 | Rezai et al. | |
| 8,145,317 B2 | 3/2012 | Demarais et al. | |
| 8,150,518 B2 | 4/2012 | Levin et al. | |
| 8,150,520 B2 | 4/2012 | Demarais et al. | |
| 8,175,711 B2 | 5/2012 | Demarais et al. | |
| 8,888,773 B2 | 11/2014 | Chang et al. | |
| 9,131,853 B2 * | 9/2015 | Tiano | A61B 18/1492 |
| 10,130,423 B1 * | 11/2018 | Viswanathan | A61B 18/1492 |
| 2001/0044645 A1 | 11/2001 | Hofstad et al. | |
| 2002/0095198 A1 * | 7/2002 | Whitebook | A61M 25/0017 607/101 |
| 2003/0060858 A1 | 3/2003 | Kieval et al. | |
| 2004/0215235 A1 * | 10/2004 | Jackson | A61B 18/1485 607/2 |
| 2005/0228460 A1 | 10/2005 | Levin et al. | |
| 2006/0206150 A1 | 9/2006 | Demarais et al. | |
| 2006/0271111 A1 | 11/2006 | Demarais et al. | |
| 2007/0129720 A1 | 6/2007 | Demarais et al. | |
| 2007/0265687 A1 | 11/2007 | Deem et al. | |
| 2008/0033426 A1 * | 2/2008 | Machell | A61B 18/1492 606/41 |
| 2008/0188846 A1 * | 8/2008 | Palanker | A61B 18/14 606/32 |
| 2008/0275445 A1 * | 11/2008 | Kelly | A61B 18/18 606/45 |
| 2008/0319513 A1 | 12/2008 | Pu et al. | |
| 2009/0036948 A1 | 2/2009 | Levin et al. | |
| 2010/0137860 A1 | 6/2010 | Demarais et al. | |
| 2010/0137952 A1 | 6/2010 | Demarais et al. | |
| 2010/0174280 A1 * | 7/2010 | Grimaldi | A61B 18/1492 606/33 |
| 2010/0191112 A1 | 7/2010 | Demarais et al. | |
| 2010/0222851 A1 | 9/2010 | Deem et al. | |
| 2010/0222854 A1 | 9/2010 | Demarais et al. | |
| 2012/0130289 A1 | 5/2012 | Demarais et al. | |
| 2012/0130345 A1 | 5/2012 | Levin et al. | |
| 2012/0172837 A1 | 7/2012 | Demarais et al. | |
| 2013/0253622 A1 * | 9/2013 | Hooven | A61B 18/14 607/101 |
| 2014/0163546 A1 * | 6/2014 | Govari | A61B 18/1206 606/41 |
| 2016/0082269 A1 * | 3/2016 | Moffitt | A61N 1/36071 607/46 |
| 2016/0324573 A1 * | 11/2016 | Mickelson | A61N 1/327 |
| 2017/0065343 A1 * | 3/2017 | Mickelsen | A61B 18/1492 |
| 2017/0151008 A1 * | 6/2017 | Mazor | A61B 18/02 |
| 2017/0215946 A1 * | 8/2017 | Lu | A61B 18/1477 |
| 2017/0215953 A1 * | 8/2017 | Long | A61B 18/1206 |
| 2018/0042672 A1 | 2/2018 | Heisel et al. | |
| 2018/0064359 A1 * | 3/2018 | Pranaitis | A61B 5/25 |
| 2019/0125422 A1 * | 5/2019 | Babkin | A61B 18/02 |
| 2020/0179044 A1 * | 6/2020 | Gross | A61B 18/1492 |

FOREIGN PATENT DOCUMENTS

| | | |
|---|---|---|
| WO | 2006044794 A2 | 4/2006 |
| WO | 2009032421 A2 | 3/2009 |
| WO | 2012061161 A1 | 5/2012 |
| WO | 2013169340 A1 | 11/2013 |
| WO | 2015103530 A1 | 7/2015 |

OTHER PUBLICATIONS

International Preliminary Report on Patentability from counterpart International Application No. PCT/US2019/014979, Jul. 28, 2020, 11 pp.

Mark R. de Jong et al. "Renal Nerve Stimulation-Induced Blood Pressure Changes Predict Ambulatory Blood Pressure Response After Renal Denervation" Mar. 9, 2016, Hypertension 2016; 68:707-714.

Search Report of Jul. 2, 2019 in PCT Application No. PCT/US2019/014979.

Allen, E.V., Sympathectomy for essential hypertension, Circulation, 1952, 6:131-140.

(56) References Cited

OTHER PUBLICATIONS

Bello-Reuss, E. et al., "Effects of Acute Unilateral Renal Denervation in the Rat," Journal of Clinical Investigation, vol. 56, Jul. 1975, pp. 208-217.

Bello-Reuss, E. et al., "Effects of Renal Sympathetic Nerve Stimulation on Proximal Water and Sodium Reabsorption," Journal of Clinical Investigation, vol. 57, Apr. 1976, pp. 1104-1107.

Bhandari, A. and Ellias, M., "Loin Pain Hematuria Syndrome: Pain Control with RFA to the Splanchanic Plexus," The Pain Clinc, 2000, vol. 12, No. 4, pp. 323-327.

Curtis, John J. et al., "Surgical Therapy for Persistent Hypertension After Renal Transplantation" Transplantation, 31:125-128 (1981).

Dibona, Gerald F. et al., "Neural Control of Renal Function," Physiological Reviews, vol. 77, No. 1, Jan. 1997, The American Physiological Society 1997, pp. 75-197.

Dibona, Gerald F., "Neural Control of the Kidney—Past, Present and Future," Nov. 4, 2002, Novartis Lecture, Hypertension 2003, 41 part 2, 2002 American Heart Association, Inc., pp. 621-624.

Janssen, Ben J.A. et al., "Effects of Complete Renal Denervation and Selective Afferent Renal Denervation on the Hypertension Induced by Intrarenal Norepinephrine Infusion in Conscious Rats", Journal of Hypertension 1989, 7: 447-455.

Katholi, Richard E., "Renal Nerves in the Pathogenesis of Hypertension in Experimental Animals and Humans," Am J. Physiol. vol. 245, 1983, the American Physiological Society 1983, pp. F1-F14.

Krum, Henry et al., "Catheter-Based Renal Sympathetic Denervation for Resistant Hypertension: A Mulitcentre Safety and Proof-of Principle Cohort Study," Lancet 2009; 373:1275-81.

Krum, et al., "Renal Sympathetic-Nerve Ablation for Uncontrolled Hypertension." New England Journal of Med, Aug. 2009, 361; 9, 3 pages.

Luippold, Gerd et al., "Chronic Renal Denervation Prevents Glomerular Hyperfiltration in Diabetic Rats", Nephrol Dial Transplant, vol. 19, No. 2, 2004, pp. 342-347.

Mahfoud et al. "Treatment strategies for resistant arterial hypertension" Dtsch Arztebl Int. 2011;108:725-731.

Osborn, et al., "Effect of Renal Nerve Stimulation on Renal Blood Flow Autoregulation and Antinatriuresis During Reductions in Renal Perfusion Pressure," Proceedings of the Society for Experimental Biology and Medicine, vol. 168, 77-81, 1981.

Page, I.H. et al., "The Effect of Renal Denervation on Patients Suffering From Nephritis," Feb. 27, 1935;443-458.

Page, I.H. et al., "The Effect of Renal Denervation on the Level of Arterial Blood Pressure and Renal Function in Essential Hypertension," J. Clin Invest. 1934; 14:27-30.

Rocha-Singh, "Catheter-Based Sympathetic Renal Denervation," Endovascular Today, Aug. 2009, 4 pages.

Schlaich, M.P. et al., "Renal Denervation as a Therapeutic Approach for Hypertension: Novel Implications for an Old Concept," Hypertension, 2009; 54:1195-1201.

Schlaich, M.P. et al., "Renal Sympathetic-Nerve Ablation for Uncontrolled Hypertension," N Engl J Med 2009; 361(9): 932-934.

Smithwick, R.H. et al., "Splanchnicectomy for Essential Hypertension," Journal Am Med Assn, 1953; 152:1501-1504.

Symplicity HTN-1 Investigators; Krum H, Barman N, Schlaich M, et al. Catheter-based renal sympathetic denervation for resistant hypertension: durability of blood pressure reduction out to 24 months. Hypertension. 2011;57(5):911-917.

Symplicity HTN-2 Investigators, "Renal Sympathetic Denervation in Patients with Treatment-Resistant Hypertension (The Symplicity HTN-2 Trial): A Randomised Controlled Trial"; Lancet, Dec. 4, 2010, vol. 376, pp. 1903-1909.

United States Renal Data System, USRDS 2003 Annual Data Report: Atlas of End-Stage Renal Disease in the United States, National Institutes of Health, National Institute of Diabetes and Digestive and Kidney Diseases, 2003, 593 pages.

Valente, John F. et al., "Laparoscopic Renal Denervation for Intractable ADPKD-Related Pain", Nephrol Dial Transplant (2001) 16: 1 page.

Wagner, C.D. et al., "Very Low Frequency Oscillations in Arterial Blood Pressure After Autonomic Blockade in Conscious Dogs," Feb. 5, 1997, Am J Physiol Regul Integr Comp Physiol 1997, vol. 272, 1997 the American Physiological Society, pp. 2034-2039.

Medtronic, "Symplicity Spyral™ Multi-Electrode Renal Denervation Catheter," Instructions for Use, Jul. 2016, Rev. 1A, 144 pages.

* cited by examiner

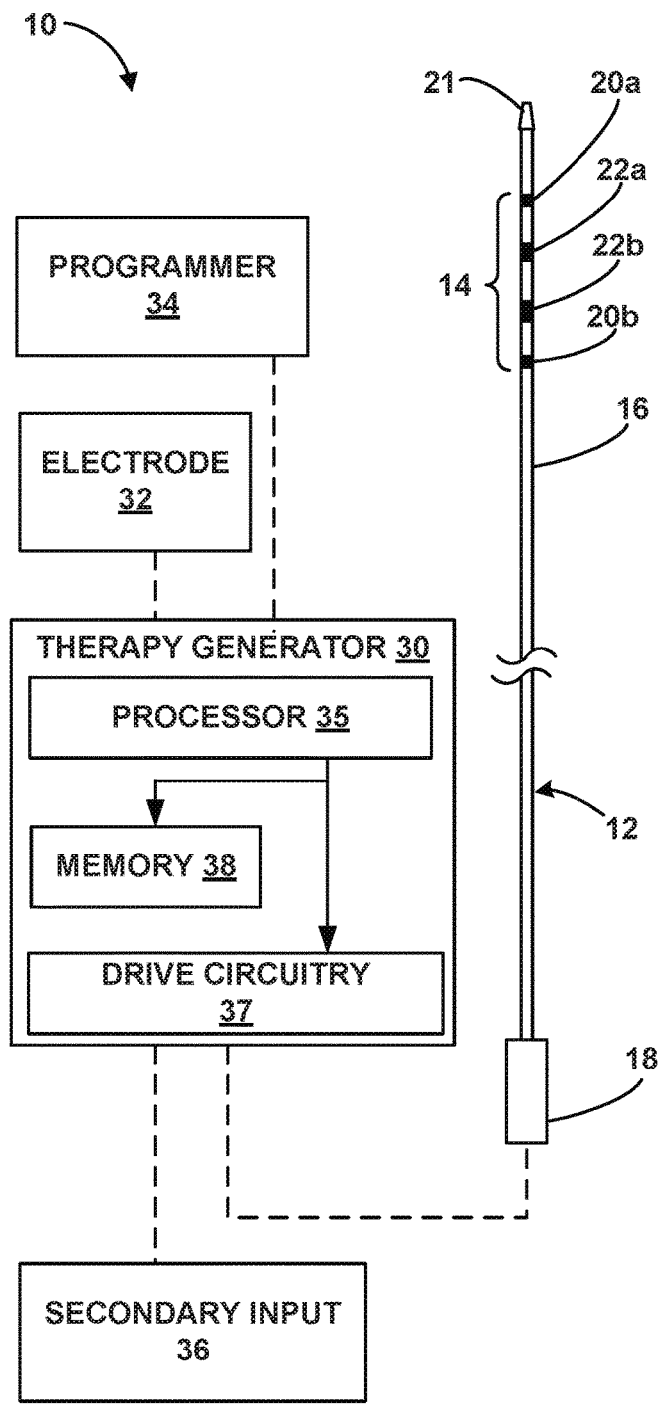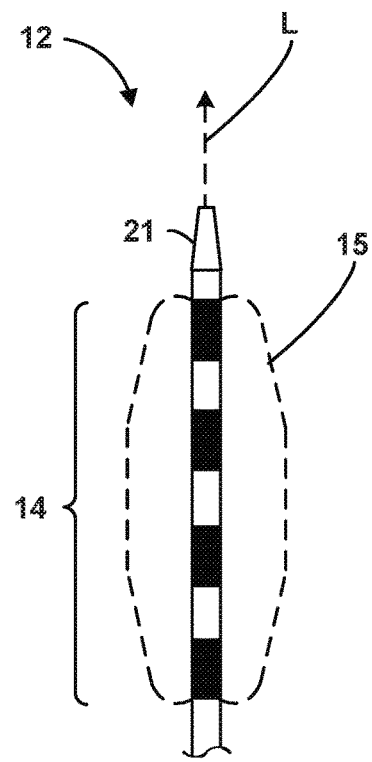
FIG. 1A
FIG. 1B

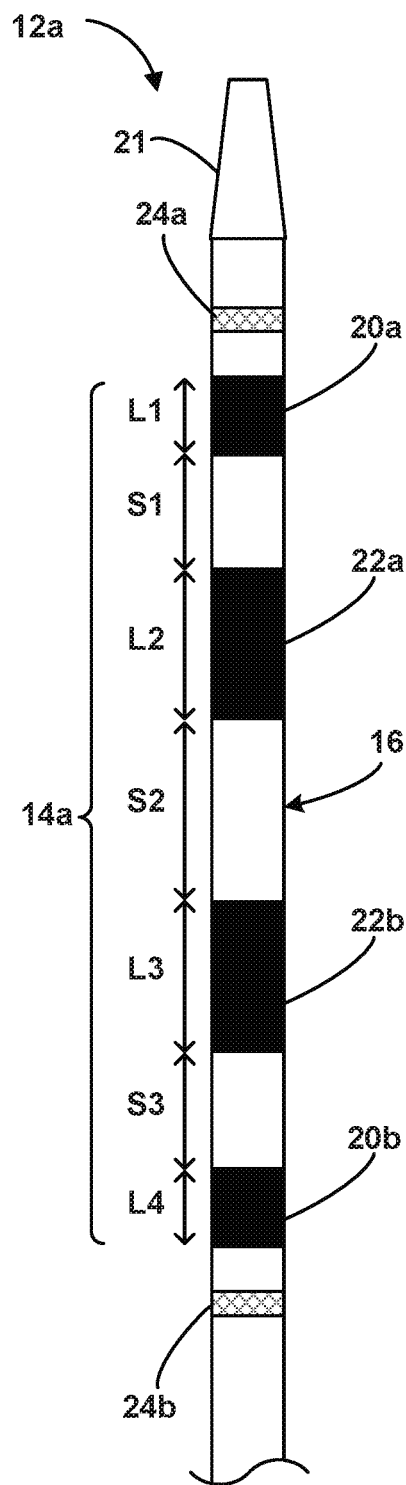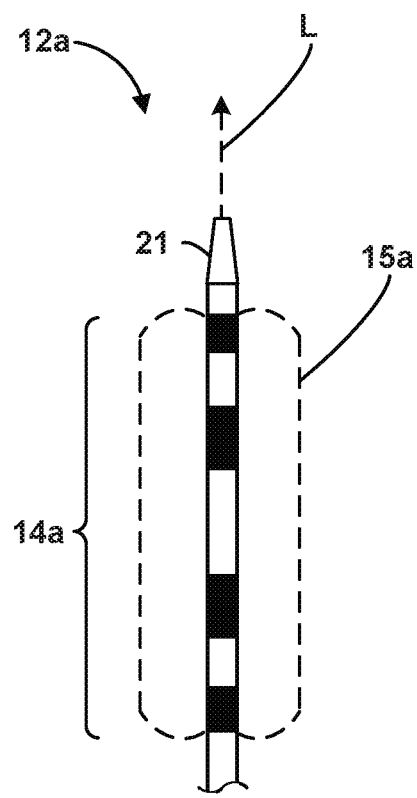
FIG. 2A
FIG. 2B

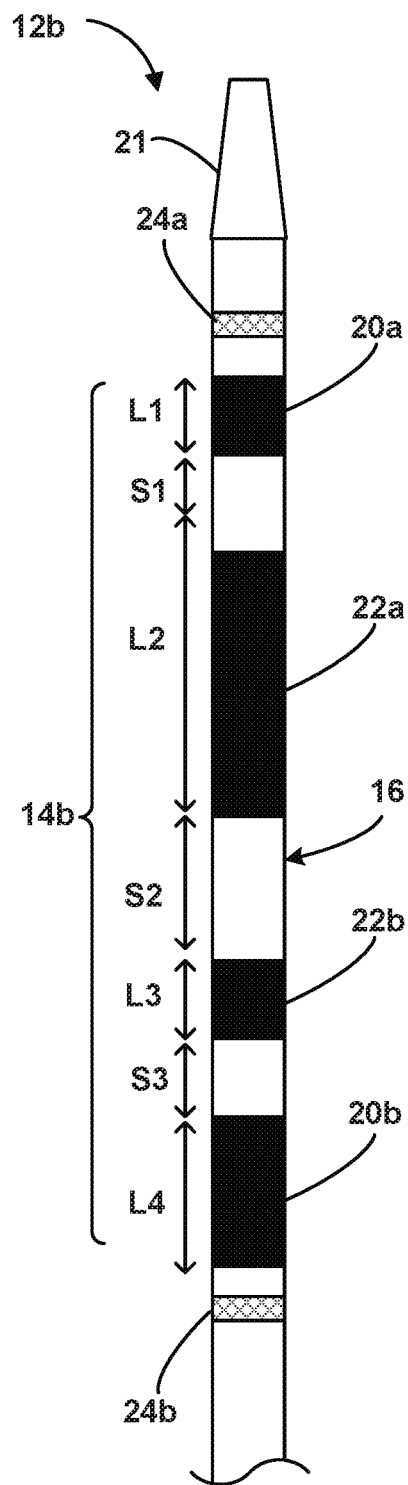
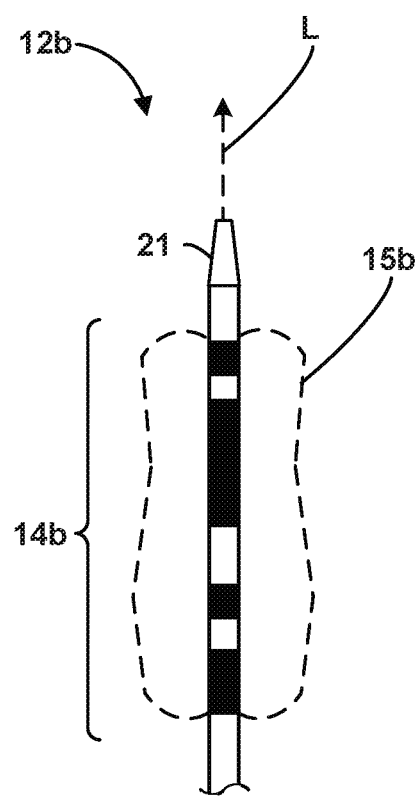
FIG. 3A
FIG. 3B

MULTIELECTRODE CATHETER

This application claims the benefit of U.S. Provisional Patent Application No. 62/621,351, filed on Jan. 24, 2018, and entitled, "DENERVATION THERAPY," and the benefit of U.S. Provisional Patent Application No. 62/663,537, filed on Apr. 27, 2018, and entitled "MULTIELECTRODE CATHETER," the entire disclosure of each of which is incorporated herein by reference.

TECHNICAL FIELD

The present disclosure relates to, in some examples, medical catheters including multiple electrodes.

BACKGROUND

Overstimulated or excessively active nerves may result in adverse effects to organs or tissue served by the respective nerves. For example, for some patients, heart, circulatory, or renal disease may be associated with pronounced cardio-renal sympathetic nerve hyperactivity. Stimulation of the renal sympathetic nerves can cause one or more of an increased renin release, increased sodium ($Na^+$) reabsorption, or a reduction of renal blood flow. The kidneys may be damaged by direct renal toxicity from the release of sympathetic neurotransmitters (such as norepinephrine) in the kidneys in response to high renal nerve stimulation. Additionally, the increase in release of renin may ultimately increase systemic vasoconstriction, aggravating hypertension. Such conditions may be mitigated by modulating the activity of overactive nerves, for example, using ablation energy delivered by electrodes of a medical catheter. A medical catheter including electrodes may also be used for other therapeutic applications, such as, but not limited to, other ablation applications, delivery of electrical stimulation therapy, sensing of one or more patient parameters, and the like.

SUMMARY

The present disclosure describes medical catheters including an array of electrodes, and systems and techniques for delivering therapy using the medical catheters. In some examples, a catheter includes an elongated member configured to be navigated through vasculature of a patient. The elongated member includes a plurality of electrodes distributed along a longitudinal axis of the elongated member, and may be referred to as an electrode array. The electrode array comprises a distal electrode, a proximal electrode proximal to the distal electrode, and at least one intermediate electrode between the distal electrode and the proximal electrode. At least one electrode characteristic of at least some of the electrodes of the electrode array may differ from each other by at least a predetermined threshold. For example, the at least one intermediate electrode and at least one of the distal electrode or the proximal electrode differ in at least one electrode characteristic by at least a predetermined threshold.

Due at least in part to this difference in the at least one electrode characteristic, delivery of an electrical signal via the at least one intermediate electrode and the at least one of the distal electrode or the proximal electrode generates, for a given tissue site, a substantially uniform electric field or, in some cases, a substantially asymmetric electric field. Electrode characteristics may include parameters that affect the electrical properties of the electrode itself or the electric field generated by delivery of an electrical signal via the electrode, and can include, for example, at least one of an electrode length measured in a direction parallel to a longitudinal axis of the elongated member, an electrode surface area, an electrode shape, an electrode thickness measured in a direction orthogonal to the longitudinal axis, an electrode orientation, an electrode composition, or an electrical conductivity.

In some examples, the catheter is part of a system that also includes a medical device configured to generate the electrical signal. In addition, in some examples, a technique includes controlling, by a processor, a medical device to generate and deliver an electrical signal to a given tissue site via an electrode array on an elongated member of a catheter. In some examples, due to the configuration of the electrodes in the electrode array and/or the spacing of the electrodes relative to each other, delivery of the electrical signal via each of the at least one intermediate electrode and at least one of the distal electrode or the proximal electrode substantially simultaneously generates a substantially uniform (e.g., symmetric) electric field. In other examples, delivery of the electrical signal via each of the at least one intermediate electrode and at least one of the distal electrode or the proximal electrode substantially simultaneously generates a non-uniform (e.g., asymmetric) electric field.

Clause 1: A catheter comprising: an elongated member configured to be navigated through vasculature of a patient, wherein the elongated member comprises an electrode array including: a distal electrode; a proximal electrode proximal to the distal electrode; and at least one intermediate electrode between the distal electrode and the proximal electrode, wherein the at least one intermediate electrode and at least one of the distal electrode or the proximal electrode differ in at least one electrode characteristic by at least a predetermined threshold such that delivery of a given electrical signal by each of the at least one intermediate electrode and the at least one of the distal electrode or the proximal electrode generates, for a given tissue site, substantially similar electric fields.

Clause 2: The catheter of clause 1, wherein the distal electrode is a distal-most electrode of the electrode array and the proximal electrode is a proximal-most electrode of the electrode array.

Clause 3: The catheter of clause 1 or 2, wherein the at least one electrode characteristic includes at least one of an electrode length measured in a direction parallel to a longitudinal axis of the elongated member, an electrode surface area, an electrode shape, an electrode thickness measured in a direction orthogonal to the longitudinal axis, an electrode orientation, an electrode composition, or an electrical conductivity.

Clause 4: The catheter of any one of clauses 1 to 3, wherein the at least one intermediate electrode includes at least two intermediate electrodes, and wherein the at least one electrode characteristic is substantially the same for each intermediate electrode of the at least two intermediate electrodes.

Clause 5: The catheter of clause 4, wherein a first electrode spacing between the at least one intermediate electrode and the at least one of the distal electrode or the proximal electrode is different from a second electrode spacing between the at least two intermediate electrodes.

Clause 6: The catheter of any one of clauses 1 to 5, wherein the at least one electrode characteristic is substantially the same for the distal electrode and the proximal electrode.

Clause 7: The catheter of any one of clauses 1 to 6, wherein the at least one intermediate electrode and the at least one of the distal electrode or the proximal electrode are configured to generate lesions having a substantially similar volume in the given tissue site.

Clause 8: The catheter of any one of clauses 1 to 7, further comprising a distal conductive element and a proximal conductive element, wherein the distal conductive element is distal to the distal electrode and is configured to influence a distal electric field generated by delivery of a first electrical signal via the distal electrode, wherein the proximal conductive element is proximal to the proximal electrode and is configured to influence a proximal electric field generated by delivery of a second electrical signal delivered via the proximal electrode.

Clause 9: The catheter of clause 8, wherein the distal conductive element and the proximal conductive element influence the electric fields generated by the distal electrode and the proximal electrode to be similar to the electric fields generated by the intermediate electrodes.

Clause 10: The catheter of any one of clauses 1 to 9, wherein the elongated member comprises a distal portion including the electrode array, the distal portion being configured to define a helical configuration.

Clause 11: The catheter of any one of clauses 1 to 10, wherein the at least one intermediate electrode consists of two intermediate electrodes.

Clause 12: The catheter of any one of clauses 1 to 11, wherein at least one of the distal electrode, the proximal electrode, or the at least one intermediate electrode includes a continuous ring electrode or a partial ring or segmented electrode.

Clause 13: The catheter of any one of clauses 1 to 12, further comprising at least a first electrical conductor and a second electrical conductor, the first electrical conductor being configured to deliver a first electrical signal from a medical device to the at least one intermediate electrode, and the second electrical conductor being configured to deliver a second electrical signal from the medical device to the at least one of the distal electrode or the proximal electrode.

Clause 14: The catheter of any one of clauses 1 to 13, further comprising a plurality of electrical conductors extending within the elongated member, each electrical conductor of the plurality of electrical conductors being configured to deliver a respective electrical signal from a medical device to a respective electrode of the electrode array.

Clause 15: The catheter of any one of clauses 1 to 14, wherein the elongated member defines a lumen configured to receive a guidewire.

Clause 16: A system comprising: the catheter of any one of clauses 1 to 15; and a medical device electrically coupled to the at least one intermediate electrode, the distal electrode, and the proximal electrode, wherein the medical device is configured to generate and deliver at least one electrical signal via at least one electrode of the electrode array.

Clause 17: The system of clause 16, wherein the electrical signal comprises a radiofrequency (RF) stimulus configured to ablate tissue at a target treatment site.

Clause 18: A method comprising: controlling, by a processor, a medical device to generate and deliver a given electrical signal via at least one of a distal electrode or a proximal electrode of an electrode array of a catheter, wherein the electrode array includes: the distal electrode, the proximal electrode proximal to the distal electrode, and at least one intermediate electrode between the distal electrode and the proximal electrode, wherein the at least one intermediate electrode and at least one of the distal electrode or the proximal electrode differ in at least one electrode characteristic by at least a predetermined threshold; and controlling, by a processor, the medical device to deliver the given electrical signal via at least one intermediate electrode of the electrode array, wherein, for a given tissue site, delivery of the given electrical signal via each of the at least one intermediate electrode and the at least one of the distal electrode or the proximal electrode generates a substantially uniform electric field.

Clause 19: The method of clause 18, wherein controlling, by the processor, the medical device to generate and deliver the given electrical signal comprises controlling the medical device to deliver a radiofrequency (RF) stimulus configured to ablate tissue at the target treatment site.

Clause 20: The method of clause 19, wherein controlling the medical device to deliver the RF stimulus comprises controlling, by the processor, the medical device to substantially simultaneously deliver a plurality of RF stimuli via the electrode array, wherein each electrode of the electrode array is configured to deliver a respective RF stimulus of the plurality of RF stimuli.

Clause 21: The method of any one of clauses 18 to 20, wherein the distal electrode is a distal-most electrode of the electrode array and the proximal electrode is a proximal-most electrode of the electrode array.

Clause 22: The method of any one of clauses 18 to 21, wherein the at least one electrode characteristic includes at least one of an electrode length measured in a direction parallel to a longitudinal axis of the elongated member, an electrode surface area, an electrode shape, an electrode thickness measured in a direction orthogonal to the longitudinal axis, an electrode orientation, an electrode composition, or an electrical conductivity.

Clause 23: The method of any one of clauses 18 to 22, wherein the at least one intermediate electrode includes at least two intermediate electrodes, and wherein the at least one electrode characteristic is substantially the same for each intermediate electrode of the at least two intermediate electrodes.

Clause 24: The method of any one of clauses 18 to 23, wherein the at least one electrode characteristic is substantially the same for the distal electrode and the proximal electrode.

Clause 25: The method of any one of clauses 18 to 24, wherein the electrical signal comprises a first electrical signal, and wherein controlling, by the processor, the medical device to deliver the electrical signal to the electrode array comprises controlling the medical device to deliver the first electrical signal via the at least one of the distal electrode or the proximal electrode, and controlling the medical device to deliver a second electrical signal via the at least one intermediate electrode.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

Reference is made to the attached drawings, wherein elements having the same reference numeral designations represent similar elements throughout and wherein:

FIG. 1A is a schematic and conceptual illustration of an example system including a catheter comprising an electrode array, and a therapy generator.

FIG. 1B is a schematic and conceptual illustration of an example trapezoidal-shaped electric field generated by the electrode array of the catheter of FIG. 1A.

FIG. 2A is a schematic and conceptual illustration of an example catheter including an electrode array having at least some electrodes that differ from each other in at least one electrode characteristic.

FIG. 2B is a schematic and conceptual illustration of a substantially uniform electric field generated by the electrode array of the catheter of FIG. 2A.

FIG. 3A is a schematic and conceptual illustration of an example catheter including an asymmetric electrode array having at least some electrodes that differ from each other in at least one electrode characteristic.

FIG. 3B is a schematic and conceptual illustration of an example asymmetric electric field generated by the electrode array of the catheter of FIG. 3A.

DETAILED DESCRIPTION

Figure 4A:
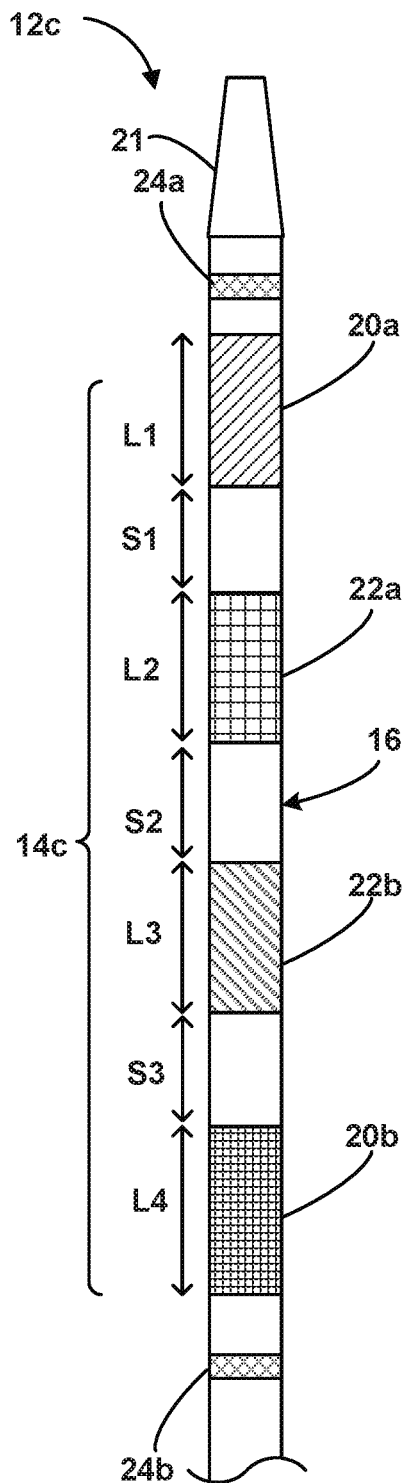
FIG. 4A is a schematic and conceptual illustration of an example catheter including an electrode array having similar-sized and uniformly spaced electrodes, where at least one electrode characteristic of at least some electrodes differ from each other.

Medical catheters including an array of electrodes may be used to deliver therapy, for example, electrical energy used to modulate activity of a nerve, such as by rendering the nerve inert, inactive, or otherwise completely or partially reduced in function. The array of electrodes includes a plurality of electrodes, and can be on any suitable portion of an elongated member of a catheter, such as on a distal portion of the elongated member. The catheter is configured to electrically connect the electrodes of the electrode array to a medical device, which may deliver electrical signals to a tissue site within a patient via one or more of the electrodes. Delivery of an electrical signal via one or more of the electrodes generates a respective electric field emanating from the one or more electrodes. The properties of each electric field, such as the volume of the electric field, may be affected by the properties of the delivered electrical signal, the electrical conductivity and the size of the electrode, the spacing between the electrodes, and the medium (e.g., tissue of a patient) through which the electric field propagates.

Multi-electrode catheters, for example, ablation catheters, including an array of substantially identical (e.g., identical or nearly identical to the extent permitted by manufacturing variances) electrodes may generate a non-uniform electric field in some cases. For example, the electric field generated by delivery of an electrical signal by a particular electrode of the electrode array may be influenced by adjacent electrodes or other conductive elements. Intermediate electrodes may each have two neighboring electrodes, while the proximal-most and distal-most electrodes may only have a single neighboring electrode. Thus, for a given medium, substantially simultaneous (e.g., simultaneous or nearly simultaneous to the extent permitted by the circuitry of a therapy generator and the catheter) delivery of an electrical signal via an array of electrodes may be nonuniform because of the cumulative effect of the electric fields associated with each of the electrodes. For example, the electric field generated by the electrode array may have a higher strength in the center of the electric field, or the ends of the electric field, along a longitudinal axis of the electrode array. The non-uniform field may be symmetric or asymmetric along the electrode array. For example, the nonuniform field may be symmetric along the electrode array in examples in which the electrode array includes substantially similar electrodes. In some cases, a proximal-most or a distal-most electrode in the array may generate an electric field that is different (for example, of a lower strength) from electric fields generated by intermediate electrodes of the electrode array between the proximal-most and distal-most electrodes. For example, the cumulative electric field near an electrode with two neighboring electrodes may be greater than a cumulative electric field near an electrode with one neighboring electrode because adjacent electric fields may reinforce each other.

The spacing between adjacent electrodes may also influence a cumulative electric field. For example, electrodes spaced closer to each other may have a greater cumulative field than electrodes spaced farther apart. Thus, even if an electrode array of a catheter includes identical electrodes, the electric fields generated by delivery of electrical signals via the different electrodes of the electrode array may differ, based on the presence of neighboring electrodes or based on inter-electrode spacing.

While non-uniform electric fields may be useful in some therapeutic applications, the same or other therapeutic applications may be benefitted by a substantially uniform electric field generated by an electrode array for a given tissue site. A substantially uniform electric field can result, for example, when electric fields generated by delivery of a given electrical signal from each of a plurality of electrodes do not differ in volume by more than 10%. For example, ablation therapy from a substantially uniform electric field may result in a substantially uniform volume of ablated tissue (also referred to herein as a "lesion" in some examples) adjacent the electrode array. In some examples, uniform RF power may simultaneously be delivered by different electrodes for ablation. Instead of using identical electrodes, which may result in a non-uniform electric field, at least one electrode may be configured to differ in at least one electrode characteristic from another electrode of the electrode array. Modifying one or more electrode characteristics of electrodes may help modify the respective electric fields generated by delivery of an electrical signal (e.g., RF power) via the electrodes. For example, at least one of an electrode length measured in a direction parallel to a longitudinal axis of the elongated member, an electrode surface area, an electrode shape, an electrode thickness measured in a direction orthogonal to the longitudinal axis, an electrode orientation, an electrode composition, or an electrical conductivity, or a spacing between electrodes may be varied from one electrode to the next. In some examples, the size, shape, material of construction, and/or spacing may be adjusted such that the electric fields from the outer (e.g., the distal-most and proximal-most) electrodes substantially matches the electric fields from the intermediate electrodes.

In some examples, at least one electrode of example electrode arrays described herein may differ in at least one electrode characteristic from other electrodes of the electrode array, such that the respective electric fields generated by delivery of an electrical signal by respective electrodes of the electrode array are substantially similar for a given tissue site. For example, an electric field generated by an electrode by an electrical signal delivered through an electrode may be substantially the same in volume or strength for tissue having substantially similar properties, for example, electrical properties. As an example, the difference in the at least one electrode characteristic may be such that substantially simultaneous delivery (e.g., simultaneous or nearly simultaneous to the extent permitted by the circuitry of a medical device and the catheter) of an electrical signal via at least one intermediate electrode and at least one of the distal-most electrode or proximal-most electrode are configured to generate, for a given tissue site, substantially similar electric fields. In some examples, the substantially similar electric fields generated by delivery of an electrical signal via the electrodes of the electrode array may result in a substantially uniform electric field and a consistent therapeutic effect for a given tissue site.

In other examples, at least one electrode of example electrode arrays described herein may differ in at least one electrode characteristic from other electrodes of the electrode array, such that the respective electric fields generated by substantially simultaneous delivery of an electrical signal by the electrodes of the electrode array are different for a given tissue site. This may permit an asymmetric electric field to be generated, which may provide some therapeutic benefits for some therapeutic applications. For example, depending on the anatomy of a patient at a target tissue site, an asymmetric electric field may be better suited to generate the desired lesion.

In this disclosure, the comparison of electric fields generated by delivery of an electrical signal via different electrodes may be made with reference to a given tissue site. The given tissue site is the same for the electrodes, such that the effects of variability in tissue (e.g., due to the density of the tissue, the fluid within the tissue, and the like) on the electric fields are eliminated to better focus on the structural configuration of a catheter.

FIG. 1A is a schematic and conceptual illustration of an example system 10 including a catheter 12 including an electrode array 14, and a therapy generator 30. FIG. 1B is a schematic and conceptual illustration of an example trapezoidal electric field 15 generated by the electrode array of the catheter of FIG. 1A. Catheter 12 includes an elongated member 16. In some examples, catheter 12 may include a hub 18 coupled to a proximal portion of elongated member 16. Elongated member 16 and hub 18 are described in further detail below.

Electrode array 14 is mechanically connected to and carried by elongated member 16. In some examples, electrode array 14 is positioned at a distal portion of elongated member 16, as shown in FIGS. 1A and 1B. In other examples, electrode array 14 may be positioned elsewhere on elongated member 16.

Therapy generator 30 is configured to generate and deliver an electrical signal (for example, via a least one electrical conductor within elongated member 16) to one or more electrodes of electrode array 14. In this way, electrodes of electrode array 14 may deliver energy to a tissue site within a patient. The energy may include electrical energy, radiofrequency (RF) energy, pulsed electrical energy, thermal energy, or the like. Thus, electrode array 14 may be used to deliver therapy to the target treatment site of the patient. In some examples, the therapy may include electrical stimulation therapy, such as cardiac therapy or neurostimulation therapy, ablation, or denervation, such as renal denervation. Therapy generator 30 may include any suitable medical device configured to generate and deliver an electrical signal that may provide therapeutic benefits to a patient, such as an ablation device, a neurostimulation device, a cardiac stimulation device, or another electrical stimulation device.

Electrode array 14 includes a distal electrode 20a, a proximal electrode 20b, and at least one intermediate electrode 22a. As shown in FIG. 1A, proximal electrode 20b is proximal to distal electrode 20a along a longitudinal axis L of elongated member 16. In some examples, distal electrode 20a is a distal-most electrode of electrode array 14 such that there are no electrodes distal to electrode 20a, and proximal electrode 20b is a proximal-most electrode of electrode array 14 such that there are no electrodes proximal to electrode 20b, as shown in FIG. 1A. At least one intermediate electrode is between distal electrode 20a and proximal electrode 20b. In the example shown in FIGS. 1A and 1B, two intermediate electrodes 22a, 22b are between distal electrode 20a and proximal electrode 20b. In other examples, electrode array 14 includes two intermediate electrodes, or more than two intermediate electrodes, for example, three, four, or more intermediate electrodes.

Electrodes 20a, 20b, 22a, 22b of electrode array 14 may be carried by elongated member 16 and may assume any suitable form. In some examples, one or more electrodes of electrode array 14 may define cylindrically shaped bodies that are secured (e.g., crimped) to elongated member 16. For example, the electrodes may be formed using a marker band crimped over elongated member 16. While the electrodes of electrode array 14 are primarily shown and described as being cylindrical in shape, other structures and shapes such as partial rings, segments, bands, discs, spirals, coils, exposed segments of electrical conductors, wires, segmented electrodes or support structures, or the like may also be used to form the electrodes. In some examples, at least one of distal electrode 20a, proximal electrode 20b, or at least one of intermediate electrodes 22a or 22b includes a continuous ring electrode or at least one partial ring or segmented electrode. In some examples, each electrode 20a, 20b, 22a, 22b of electrode array 14 includes a continuous ring electrode. In other examples, each electrode 20a, 20b, 22a, 22b of electrode array includes one or more partial ring or segmented electrodes. A partial ring or segmented electrodes does not extend around the full outer perimeter of elongated member 16. In addition, in some examples, each electrode of the array 14 may be made up of a plurality of partial ring or segmented electrodes disposed at different positions (e.g., circumferential positions) around an outer perimeter of elongated member 16.

The electrodes of electrode array 14 may be formed from any suitable electrical conductive material, such as, but not limited to one or more of the following materials: titanium alloys (e.g., Ti—Mo alloy), gold, platinum or platinum-iridium alloys, stainless steel, copper, copper alloys (e.g., copper and hafnium or tungsten), or tungsten. As discussed in further detail below, in some examples, all of the electrodes of electrode array 14 are formed from the same material, while in other examples, at least two electrodes of electrode array 14 are formed from different materials, which may affect the electrical properties of the electrode. In some examples, at least one electrical conductor may be formed using electrically insulated metal wires that extend along elongated member 16 to electrode array 14. The materials and design of electrodes of electrode array 14 and the at least one conductor may be selected such that the components do not significantly impede or hinder the navigability of catheter 12 through vasculature of a patient.

Catheter 12 may include at least one electrical conductor for electrically coupling electrodes of electrode array 14 to therapy generator 30. In some examples, each electrode of electrode array 14 may be coupled to a respective electrical conductor. In other examples, however, two or more electrodes of electrode array 14 may be electrically coupled to the same electrical conductor. Thus, catheter 12 is configured to receive one or more electrical signals from generator 30 and deliver the electrical signal to a tissue site via one or more electrodes of electrode array 14.

In some examples, generator 30 includes an electrical source, for example, an RF energy generator. Generator 30 is configured to generate a selected form and magnitude of energy for delivery to the target treatment site via electrode array 14. For example, generator 30 may include a processor 35 configured to select one or more electrodes of electrode array 14 from which electrical signals are delivered, and drive circuitry 37 for electrically driving electrode array 14. Drive circuitry 37 may amplify or send electrical signals from processor 35 to electrode array 14.

Generator 30 may include a memory 38. Memory 38 includes computer-readable instructions that, when executed by processor 35, causes generator 30 to perform various functions. Processor 35 may include any one or more microprocessors, controllers, digital signal processors (DSPs), application specific integrated circuits (ASICs), field-programmable gate arrays (FPGAs), or equivalent discrete or integrated digital or analog logic circuitry, and the functions attributed to processor 35 herein may be embodied as software, firmware, hardware or any combination thereof.

Memory 38 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. Memory 38 may store any suitable information, including patient identification information, and information for selecting one or more electrodes through which generator 30 generates and delivers therapy to a patient. Memory 38 may also store operating instructions with which processor 35 controls the operation of generator 30.

In some examples, electrodes of electrode array 14 are configured to be electrically connected to a medical device in series or in parallel. When connected in series, e.g., via respective electrical conductors, therapy generator 30 may deliver electrical signals via all the electrodes of electrode array 14 or via a selected subset of electrodes of electrode array 14, which can include one electrode or multiple electrodes. In some examples, processor 35 of therapy generator 30 may be configured to select a subset of electrodes of array 14 for delivery of electrical energy, and may make the selection in response to user input or in response to a predetermined therapy program stored by memory. When connected in parallel, therapy generator 30 may deliver an electrical signal via all the electrodes of electrode array 14 simultaneously.

In some examples, catheter 12 includes at least a first electrical conductor and a second electrical conductor. The first and the second electrical conductors may extend within elongated member 16 from a proximal portion of catheter 12 to electrode array 14. The first electrical conductor may be configured to deliver a first electrical signal from therapy generator 30 to at least one intermediate electrode 22a or 22b. The second electrical conductor may be configured to deliver a second electrical signal from therapy generator 30 to at least one of distal electrode 20a or proximal electrode 20b.

In some examples, catheter 12 may include a plurality of electrical conductors extending within elongated member 16 from a proximal portion of catheter 12 to electrode array 14. The plurality of electrical conductors may include the first electrical conductor and the second electrical conductor. Each electrical conductor of the plurality of electrical conductors may be configured to deliver a respective electrical signal of a plurality of electrical signals from therapy generator 30 to a respective electrical of electrode array 14. The plurality of electrical signals may include the first electrical signal and the second electrical signal.

Electrode array 14 may be carried by or disposed on elongated member 16. Elongated member 16 is configured to be navigated through vasculature of the patient, for example, to position electrode array 14 adjacent the target treatment site of the patient. For example, elongated member 16 may be used to access relatively distal vasculature locations in a patient or other relatively distal tissue sites (e.g., relative to a vasculature access point). Example vasculature locations may include, for example, locations in a coronary artery, peripheral vasculature (e.g., carotid, iliac, or femoral artery, or a vein), or cerebral vasculature. In some examples, elongated member 16 is structurally configured to be relatively flexible, pushable, and relatively kink- and buckle-resistant, so that it may resist buckling when a pushing force is applied to a relatively proximal portion of catheter 12 to advance elongated member 16 distally through vasculature, and so that it may resist kinking when traversing around a tight turn in the vasculature.

Elongated member 16 may have any suitable shape, such as a tubular body or a paddle-like shape. Elongated member 16 may be constructed using any suitable materials. In some examples, elongated member 16 may include one or more polymeric materials, for example, polyamide, polyimide, polyether block amide copolymer sold under the trademark PEBAX, polyethylene terephthalate (PET), polypropylene, aliphatic, polycarbonate-based thermoplastic polyurethane, or a polyether ether ketone (PEEK) polymer that provides elongated member 16 with a predetermined flexibility. The polymeric materials may be extruded as one or more solid or hollow tubes to form elongated member 16.

In some examples, a support structure or shape member may be included within or about elongated member 16, for example, being disposed about, within, or between one or more polymeric tubes used to form elongated member 16. The support structure or shape member may be used to impart a predetermined strength, flexibility, shape, or geometric qualities to elongated member 16. The support structure or shape member may be formed using any suitable materials including, for example, metal, alloy, or polymer-based wires used to form coils or braids, a hypotube, shape memory materials, for example, nickel-titanium (nitinol), shape memory polymers, electro-active polymers, or the like. The support structure or shape member may be cut using a laser, electrical discharge machining (EDM), electrochemical grinding (ECG), or other suitable means to achieve a desired finished component length, apertures, and geometry. In some examples, the support structure or shape member may be arranged in a single or dual-layer configuration, and manufactured with a selected tension, compression, torque and pitch direction. Thus, elongated member 16 may maintain electrodes of electrode array 14 in any suitable predetermined configuration or orientation.

In some examples, catheter 12 may also include an atraumatic tip 21 at a distal end of elongated member 16. Atraumatic tip 21 may be affixed to the distal end of elongated member 16 via adhesive, crimping, over-molding, or other suitable techniques or may be integrally formed as part of elongated member 16. In some examples, atraumatic tip 21 may be formed from a polymeric material (e.g., polyether block amide copolymer sold under the trademark PEBAX), a thermoplastic polyether urethane material (sold under the trademarks ELASTHANE or PELLETHANE), or other suitable materials having the desired properties, including a selected durometer hardness or flexibility. In addition, or instead, the distal end of catheter 12 may be configured to engage another element of system 10. For example, the distal end of catheter 12 may define a passageway for engaging a guidewire (not shown) for delivery of the treatment device using over-the-wire ("OTW") or rapid exchange ("RX") techniques. In some example, elongated member 16 may define a lumen configured to receive a guidewire.

Elongated member 16 may also include one or more radiopaque markers which may help a clinician determine the positioning of elongated member 16 relative to relative to the target treatment site using ultrasound or other suitable technique. For example, one or more radiopaque markers may be positioned along elongated member 16 such as near a distal end, adjacent to one or more of electrodes of electrode array 14 or the like. In some examples, one or more of electrodes of electrode array 14 may act as radiopaque markers.

In some examples, at least a portion of an outer surface of elongated member 16 may include one or more coatings, such as, but not limited to, an anti-thrombogenic coating, which may help reduce the formation of thrombi in vitro, an anti-microbial coating, and/or a lubricating coating. In some examples, the entire working length of elongated member 16 may be coated with the hydrophilic coating. In other examples, only a portion of the working length of elongated member 16 coated with the hydrophilic coating. This may provide a length of elongated member 16 distal to hub 18 with which the clinician may grip elongated member 16, e.g., to rotate elongated member 16 or push elongated member 16 through vasculature. In some examples, the entire working length of elongated member 16 or portions thereof may include a lubricious outer surface, e.g., a lubricious coating. The lubricating coating may be configured to reduce static friction and/or kinetic friction at a surface of elongated member 16 as elongated member 16 is advanced through the vasculature.

The proximal portion of elongated member 16 may be received within hub 18 and can be mechanically connected to hub portion 18 via an adhesive, welding, or another suitable technique or combination of techniques. Hub portion 18 may serve as a handle for catheter 12 allowing the clinician to grasp catheter 12 at hub portion 18 and advance elongated member 16 through vasculature of a patient. In some examples, catheter 12 can include another structure in addition or instead of hub 18. For example, catheter 12 or hub 18 may include one or more luers or other mechanisms (e.g., access ports) for establishing connections between catheter 12 and other devices. Additionally, or alternatively, catheter 12 may include a strain relief body (not shown), which may be a part of hub 18 or may be separate from hub 18 to alleviate potential strain of kinking of elongated member 16 near its proximal end.

In some examples, system 10 includes an electrode 32 (for example, a dispersive electrode or a patient return electrode) electrically connected to generator 30 and attached to the exterior of the patient. In some examples, generator 30 may be configured to deliver therapy via electrode array 14 and electrode 32 in a monopolar configuration, or by a bipolar or a multipolar configuration of multiple electrodes, or a combination of monopolar and bipolar stimulation.

A secondary input 36, for example, a foot pedal, may be connected (e.g., pneumatically connected or electrically connected) to generator 30 to allow the clinician to initiate, terminate and, optionally, adjust various operational characteristics of generator 30, including, but not limited to, power delivery. System 10 may also include a remote control device (not shown) that can be positioned in a sterile field and operably coupled to one or both of catheter 12 or generator 30. The remote control device may be configured to allow for selectively turning on/off electrodes of electrode array 14. In other examples, the remote control device may be built into hub 18.

System 10 may include a programmer 34. Generator 30 can be configured to receive one or more therapy parameter values with which generator generates and delivers an electrical signal to electrode array 14 via programmer 34. In some examples, the electrical signal comprises a radiofrequency (RF) stimulus configured to ablate tissue at a target treatment site. In some examples, generator 30 or programmer 34 may include one or more evaluation or feedback modules to provide feedback to the clinician before, during, and/or after therapy.

Additionally, one or more sensors (not shown), such as one or more temperature (for example, thermocouple, thermistor, or the like), impedance, pressure, optical, flow, chemical or other sensors, may be located proximate to or within electrode array 14 and connected to one or more electrical conductors (not shown) within elongated body 16. For example, a total of two electrical conductors may be included, in which both electrical conductors could transmit the signal from the sensor and one electrical conductor could serve dual purpose and also convey the energy to one or more electrodes of electrode array 14. Alternatively, a different number of electrical conductors may be used to transmit energy to electrodes of electrode array 14. The sensors may be used by processor 35 of therapy generator 30 to, for example, control delivery of therapy, as described in International Application No. PCT/US2011/057756, published as International Publication No. WO 2012/061161 A1, herein incorporated in its entirety by reference.

Generator 30 may be part of a device or monitor that may include processing circuitry, such as a microprocessor, and a display. In some examples, functions described with reference to generator 30 may be performed by programmer 34. Thus, system 10 may include a memory (for example, in generator 30 or programmer 34), and a processor coupled to the memory.

Electrodes 20a, 20b, 22a, 22b of electrode array 14 may exhibit respective electrode characteristics, for example, electrode length (measured in a direction along longitudinal axis L), conductive electrode surface area, electrode shape, electrode thickness in a direction orthogonal to longitudinal axis L (and, in examples in which the electrode is cylindrical, in a radial direction), electrode orientation, electrode composition, electrical conductivity, or proximity to an adjacent electrode. One or more electrode characteristics may influence an electric field generated by an electrode. For example, a longer electrode length, greater conductive surface area, or higher electrical conductivity may result in a greater electric field strength. The electric field generated by an electrode may also be influenced by adjacent or neighboring electrodes.

For example, an electric field adjacent an electrode with one neighboring electrode may be weaker than an electric field adjacent an electrode with two neighboring electrodes. Thus, the cumulative electric field generated by an electrode array including identical electrodes may differ in strength along the electrode array, based on the presence of neighboring electrodes. For example, even if identical distal, proximal, and intermediate electrodes form an electrode array, the intermediate electrodes would each have two neighboring electrodes, while the proximal and distal electrodes would only have a single neighboring electrode. Thus, if the identical electrodes are placed sufficiently close to influence the electric fields of neighboring electrodes, the electric field generated by the distal and proximal electrodes may be different (for example, higher strength) than the electric field generated by the intermediate electrodes. This difference may manifest as a "trapezoidal effect," where the electric field may assume a trapezoidal-shaped cross-section. For example, as shown in FIG. 1B, an electrode array 14 including substantially identical electrodes may generate a trapezoidal electric field 15, with a greater volume or strength adjacent intermediate electrodes 22a or 22b, and a lower volume or strength adjacent distal electrode 20a and proximal electrode 20b.

Similarly, the electric field may be influenced by the spacing of a neighboring electrode. For example, a neighboring electrode that is farther away may have a lower influence on the electric field of an electrode than a neighboring electrode that is relatively close to an electrode. The electric field generated by an electrode may also be influenced by the environment, for example, properties of tissue adjacent or surrounding the electrode, such as density, permittivity, or electrical conductivity of tissue.

FIG. 2A is a schematic and conceptual illustration of an example catheter 12a including an electrode array 14a including a plurality of electrodes having at least some electrodes that differ from each other in at least one electrode characteristic. Some therapeutic applications may be benefitted by a substantially uniform electric field generated an electrode array for a given tissue site. FIG. 2B is a schematic and conceptual illustration of a substantially uniform electric field 15a generated by electrode array 14 of catheter 12a of FIG. 2A.

Catheter 12a includes elongated member 16 and may be similar in construction to catheter 12 described with reference to FIGS. 1A and 1B. Electrodes of electrode array 14a may also be similar in construction and composition as described with reference to electrodes of electrode array 14 described with reference to FIGS. 1A and 1B. However, in some examples, at least one electrode of electrode array 14a may differ in at least one electrode characteristic from at least one other electrode of electrode array 14a, such that the electric field 15a generated by delivery of an electrical signal by each electrode 20a, 20b, 22a, 22b of electrode array 14 is substantially uniform along electrode array 14a for a given tissue site. For example, at least one of intermediate electrodes 22a or 22b and at least one of distal electrode 20a or proximal electrode 20b may differ in at least one electrode characteristic by at least a predetermined threshold. The difference in the at least one electrode characteristic may be sufficient to enable at least one intermediate electrode 22a or 22b and the at least one of distal electrode 20a or proximal electrode 20b to generate, for a given tissue site and a given electrical signal, substantially similar electric fields. In some examples, the substantially similar electric fields generated by electrodes of electrode array 14a may result in a substantially uniform field 15a generated by electrode array 14a, which may result in substantially uniform therapeutic effect for some tissue sites. For example, at least one intermediate electrode 22a or 22b and the at least one of distal electrode 20a or proximal electrode 20b may be configured to generate lesions having a substantially similar volume in a tissue of the patient.

The at least one electrode characteristic may include at least one of an electrode length, an electrode surface area, an electrode shape, an electrode thickness, an electrode orientation, an electrode composition, or an electrical conductivity. In some examples, the intermediate electrodes of electrode array 14, 14a includes at least two intermediate electrodes 22a and 22b (or other intermediate electrodes), and the at least one electrode characteristic is substantially the same for each intermediate electrode 22a and 22b of the at least two intermediate electrodes (or other intermediate electrodes). In some examples, the at least one electrode characteristic is substantially the same for distal electrode 20a and proximal electrode 20b.

In some examples, electrodes of electrode array 14a may differ in length (or surface area) to generate substantially uniform electric fields. Distal electrode 20a may have a length L1, intermediate electrodes 22a and 22b may have respective lengths L2 and L3, and proximal electrode 20b may have a length L4. The respective lengths of the electrodes 20a, 20b, 22a, 22b may be multiplied by respective circumferences or other geometric factors to obtain the respective surface areas of the electrodes. Thus, the respective lengths L1, L2, L3, and L4 may be proportional to or otherwise indicative of the respective surface areas of respective electrodes of electrode array 14a.

L1, L2, L3, or L4 may be set to any suitable value. In some examples, distal electrode 20a and proximal electrode 20b have the same or substantially the same length (for example, L1=L4) or the same or substantially the same surface area (e.g., the same to the extent as permitted by manufacturing tolerances). In some examples, each intermediate electrodes 22a and 22b (and further intermediate electrodes, if present) may have same or substantially the same length (for example, L2=L3) or the same or substantially the same surface area. In some such examples, the lengths or surface areas of one or both of the intermediate electrodes 22a, 22b may differ from the lengths or surface areas of at least one of distal electrode 20a or proximal electrode 20b. For example, L1 and L4 may each differ from each of L2 and L3 by a predetermined threshold.

In other examples, the lengths or surface areas of at least two electrodes of electrode array 14 may be different. For example, L1 may be different from L4, or L2 may be different from L3, or none of L1, L2, L3, or L4 may be the same. In some examples, the difference in lengths may be such that at least one intermediate electrode 22a or 22b and the at least one of distal electrode 20a or proximal electrode 20b are configured to generate, for a predetermined tissue site, substantially similar electric fields in response to delivery of a given electrical signal from therapy generator 30. For example, L2 may be substantially equal to L3, L1 may be substantially equal to L4, and L1 may be sufficiently smaller than L2, so that electric fields generated by distal electrode 20a, proximal electrode 20b, and intermediate electrodes 22a and 22b are substantially similar for the same tissue site. For electrodes having the same electrical conductivity characteristics, a current density through a relatively smaller electrode may be higher, and may result in the generation of a relatively stronger field and volume of activation for the smaller electrode compared to a relatively larger electrode for the same potential.

Electrodes of electrode array 14a may be spaced any suitable distance from each other, and the spacing between the respective electrodes of electrode array 14a as well as other dimensions of catheter 12 may vary based on the particular application for which catheter 12 is intended to be used. For example, distal electrode 20a may be spaced from intermediate electrode 22a by spacing S1, intermediate electrode 22a may be spaced from intermediate electrode 22b by spacing S2, and intermediate electrode 22b may be spaced from proximal electrode 20b by spacing S3, as shown in FIG. 1B. In some examples, spacing S1 and S3 may be the same or substantially the same, so that distal electrode 20a and proximal electrode 20b are spaced from their respective nearest neighboring electrodes by substantially the same spacing (S1=S3). In some examples, all electrodes of electrode array 14a may be spaced at substantially the same spacing (for example, S1=S2=S3). In other examples, the spacing between intermediate electrodes 22a and 22b may be different from the spacing between distal electrode 20a or proximal electrode 20b and their respective nearest neighboring electrodes in electrode array 14a (for example, S2>S1 and S2>S3, or S2<S1 and S2<S3).

In some examples, spacing distances S1-S4 are selected to facilitate the generation of a substantially uniform electric field by delivery of an electrical signal by multiple electrodes of electrode array 14, or, in some cases, the generation of asymmetric electric fields. For example, one or more electrodes of electrode array 14a may be spaced at different distances from neighboring electrodes (e.g., directly adjacent electrodes) than other electrodes. In some examples, S1 may be substantially equal to S2, and S1 may be sufficiently smaller than S3, so that electric fields generated by distal electrode 20a, proximal electrode 20b, and intermediate electrodes 22a and 22b are substantially similar for the same tissue site. Other variations in spacings between electrodes (along longitudinal axis L) are also contemplated and may depend on the particular characteristics of tissue at the target tissue site within a patient.

In some examples, the electric field generated by delivery of an electrical signal via electrode array 14a may be influenced by non-electrode conductive elements carried by elongated member 16. For example, elongated member 16 may include a distal conductive element 24a and a proximal conductive element 24b. In the example shown in FIG. 2A, distal conductive element 24a is distal to distal electrode 20a and is configured to influence a distal electric field generated by delivery of a first electrical signal via distal electrode 20a. In addition, in the example shown in FIG. 2A, proximal conductive element 24b is proximal to proximal electrode 20b and is configured to influence a proximal electric field generated by delivery of a second electrical signal via proximal electrode 20b. In some examples, electrodes of electrode array 14 may be connected in series, and the first electrical signal and the second electrical may be the same signal simultaneously delivered to each electrode of electrode array 14.

The construction, geometry, and composition of distal conductive element 24a and proximal conductive element 24b may be similar to that described herein with reference to electrodes of electrode array 14a. However, distal conductive element 24a and proximal conductive element 24b may not be electrically connected to a therapy generator 30 and/or may not be electrically connected to an electrical conductor within elongated member 16, or may otherwise not deliver an electrical signal, but may yet influence electric fields of one or more electrodes of electrode array 14. For example, distal conductive element 24a and proximal conductive element 24b may dissipate neighboring electric fields.

As shown in FIG. 2B, electrodes of electrode array 14a are configured such that delivery of an electrical signal via two or more electrodes of electrode array 14a results in a substantially uniform electric field 15a. For example, as discussed above, for a given electrical signal, electrodes 20a, 20b may be configured to deliver substantially similar electrical energy or generate substantially similar electric fields as electrodes 22a, 22b, resulting in a substantially uniform field 15a.

As discussed above, in some examples, it may be therapeutically beneficial to generate an asymmetric electric field to influence different regions of a given tissue site to different extents. For example, in some patients, a distance between a renal nerve and a renal artery through which a catheter may access a renal nerve, may differ along a length of the renal artery. As an example, in some patients, a renal nerve may move closer to a renal artery (in which a catheter may be disposed) in a distal direction (e.g., away from the clinician). Selecting an asymmetric electric field shape (e.g., using a particular electrode array 14 and/or the electrical signal parameter values used to generate a denervation stimulus delivered via electrodes of array 14) may thus be useful in some examples to effectively lesion the renal nerve.

FIG. 3A is a schematic and conceptual illustration of an example catheter 12b including an asymmetric electrode array 14b having at least some electrodes that differ from each other in at least one electrode characteristic. The difference in at least one electrode characteristic may be such that the identical configurations of electrodes, to the extent catheter 12b includes electrodes having identical configurations are asymmetrically arranged along electrode array 14b, a plane of symmetry extending orthogonal to longitudinal axis L and through a center of electrode array 14b. FIG. 3B is a schematic and conceptual illustration of an asymmetric electric field 15b generated by electrode array 14b of the catheter of FIG. 3A, the plane of symmetry also extending orthogonal to longitudinal axis L and through a center of electrode array 14b.

Electrode array 14b may be similar in construction to electrode array 14 or 14a. However, electrodes in electrode array 14b may be asymmetric from distal electrode 20a through proximal electrode 20b. For example, as shown in FIG. 3A, length L1 of distal electrode 20a may be different from L4 of proximal electrode 20b, and length L2 of intermediate electrode 22a may be different from length L3 of intermediate electrode 22b. Such an asymmetric difference of lengths (or of surface area) may generate an asymmetric field 15b, as shown in FIG. 3B. For example, asymmetric field 15b may be asymmetric along longitudinal axis L from distal electrode 20a to proximal electrode 20b. In some examples, asymmetric field 15b may exhibit asymmetry in the field strength or field volume along longitudinal axis L. While asymmetric field 15b may result from differences in geometric parameters of electrodes of array 14b, for example, length or surface area of electrodes of electrode array 14b, in other examples, differences in non-geometric electrode characteristics (for example, conductivity, composition, or the like) may generate asymmetric field 15b alone or in combination with the geometric parameters.

Figure 4B:
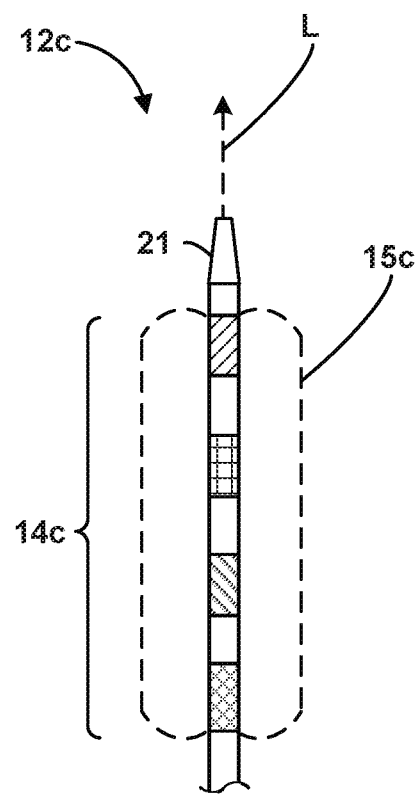
FIG. 4B is a schematic and conceptual illustration of a substantially uniform electric field generated by the electrode array of the catheter of FIG. 4A.

While geometrically identical electrodes may generate trapezoidal electric field 15 as described with reference to FIG. 1B, in other examples, non-geometric characteristics of electrodes may differ such that geometrically identical electrodes may generate a substantially uniform electric field. For example, FIG. 4A is a schematic and conceptual illustration of an example catheter 12c including an electrode array 14c having similar-sized and uniformly spaced electrodes, where at least one electrode characteristic of at least some electrodes differ from each other. FIG. 4B is a schematic and conceptual illustration of a substantially uniform electric field 15c generated by electrode array 14c of catheter 12c of FIG. 4A. As shown in FIGS. 4A and 4B, distal electrode 20a, intermediate electrodes 22a and 22b, and proximal electrode 20b may have similar geometries and spacing, with L1=L2=L3=L4 and/or S1=S2=S3. However, at least one electrode of electrode array 14c may differ in a non-geometric electrode characteristic such an electrode composition or an electrical conductivity such that electric field 15c generated by electrode array 14c is substantially uniform.

Figure 5A:
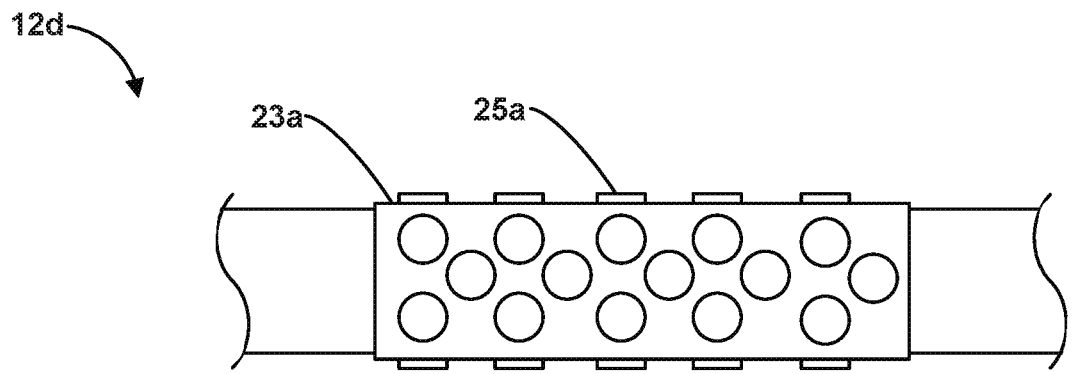
FIG. 5A is a schematic and conceptual illustration of a catheter including an example electrode defining a surface texture.

In some examples, a surface texture of an electrode may be modified to increase the electrically conductive surface area of the electrode, influencing the electric field generated by the electrode. For example, FIG. 5A is a schematic and conceptual illustration of catheter 12d including an example electrode 23a defining a surface texture 25a. Surface texture 25a may include bumps, protrusions, pedestals, or other raised features to increase the surface area of electrode 23a compared to a non-textured electrode. While circular raised features are shown in FIG. 5A, surface texture 25a may include any suitable geometric shape or cross section.

Figure 5B:
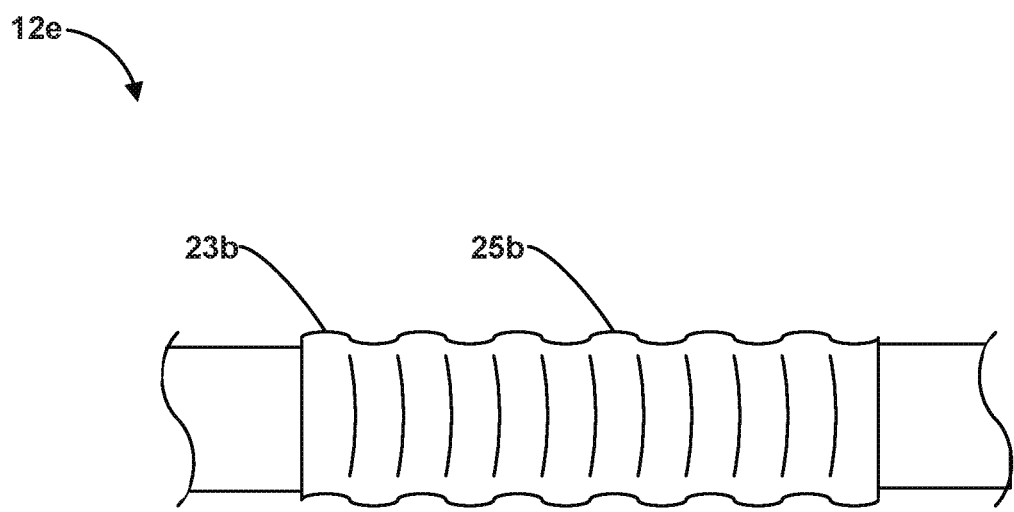
FIG. 5B is a schematic and conceptual illustration of another catheter including an example electrode defining a surface texture.

FIG. 5B is a schematic and conceptual illustration of a catheter 12e including an example electrode 23b defining a surface texture 25b. As shown in FIG. 5B, surface texture 25b may include an undulating or wave-like surface, which may provide a greater surface area compared to a non-textured electrode having the same given footprint. One or more electrodes of electrode arrays 14, 14a, 14b, or 14c may include a textured electrode, for example, electrode 23a, 23b, or any suitable textured electrode.

While elongated member 16 may be substantially straight and electrode array 14 may be positioned along a substantially straight line (as shown in the example configurations of catheter 12 illustrated in FIGS. 1A and 1B), in other examples, a portion of elongated member 16 may be configured to assume a nonlinear configuration (e.g., biased away from a straight configuration or otherwise held in the nonlinear configuration), as described with reference to FIGS. 6A to 6C.

Figure 6A:
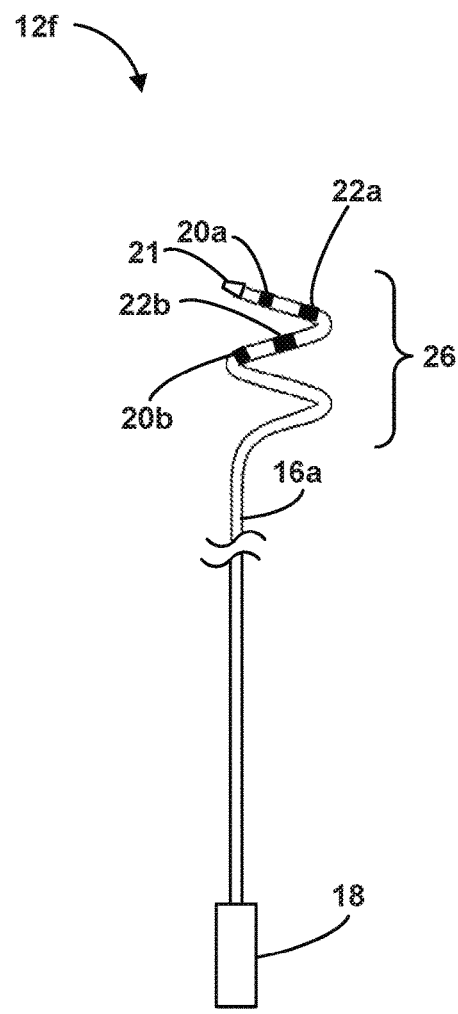
FIG. 6A is a schematic and conceptual illustration of an example catheter configured to define a helical configuration.
Figure 6B:
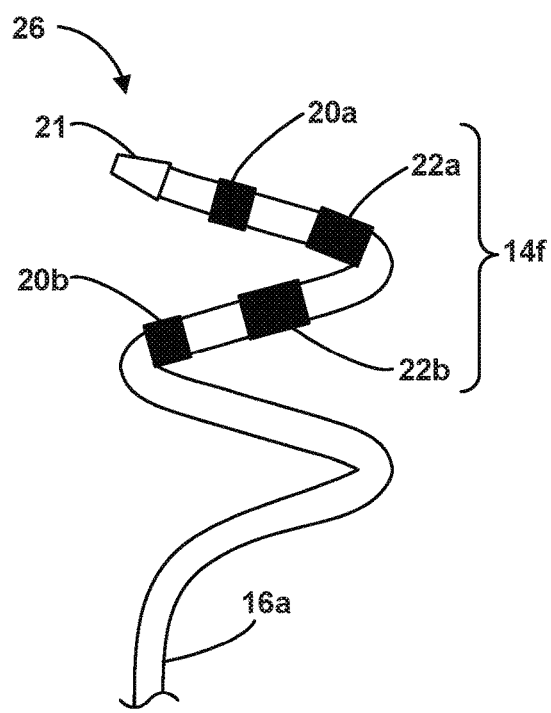
FIG. 6B is a schematic and conceptual illustration of a distal portion of the catheter of FIG. 6A.
Figure 6C:
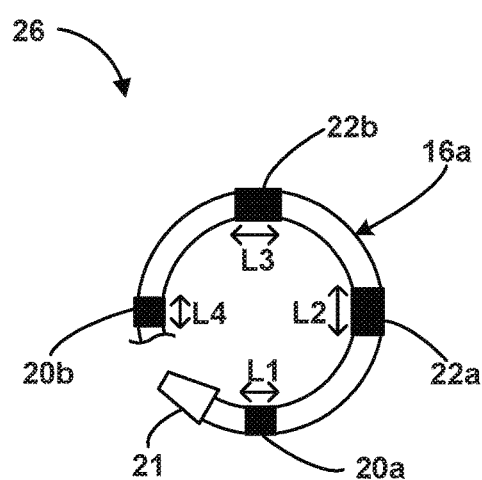
FIG. 6C is a schematic and conceptual illustration of a top view of the distal portion of the catheter of FIG. 6B.

FIG. 6A is a schematic and conceptual illustration of an example catheter 12f configured to define a helical configuration. FIG. 6B is a schematic and conceptual illustration of a distal portion 26 of catheter 12f of FIG. 6A. FIG. 6C is a schematic and conceptual illustration of a partial top view of distal portion 26 of catheter 12f of FIG. 6B. The construction and configuration of electrodes in electrode array 14f may be similar to electrodes of electrode array 14 described with reference to FIGS. 1A and 1B. In other examples, instead of electrode array 14, catheter 12f may include one of electrode arrays 14a, 14b, or 14c. The construction and configuration of elongated member 16a may be similar to that of elongated member 16 described with reference to FIGS. 1A and 1B.

In the example shown in FIG. 6A, catheter 12f includes electrode array 14f including four electrodes (distal electrode 20a, proximal electrode 20b, and intermediate electrodes 22a and 22b) arranged in a helical configuration. For example, electrodes of electrode array 14a may be arranged approximately 90 degrees apart when looking at catheter 12f through an axis that runs through the center of the spiral, as shown in FIG. 6C. In some examples, a maximum width of catheter 12f, e.g., along the spiral and taken in a direction orthogonal to longitudinal axis L of catheter 12f, may be 3 millimeters (mm) to 8 mm, although other widths are also contemplated. The helical configuration of distal portion 26 may include at least one helical turn, or at least two helical turns, or any suitable number of turns. Electrode array 14f may be disposed along one or more helical turns.

Any of catheters 12 to 12f may be configured to be delivered into a patient, e.g., a blood vessel of the patient, a low-profile configuration, such as the substantially straight configuration shown in FIG. 1A. Upon delivery to a target location within and along the blood vessel, catheter 12, 12a, 12b, 12c, 12d, 12e, 12f may be deployed into an expanded state (for example, a generally helical or spiral configuration), in which one or more electrodes of catheter 12, 12a, 12b, 12c, 12d, 12e, 12f may contact the blood vessel. In the expanded state, catheter 12, 12a, 12b, 12c, 12d, 12e, 12f may deliver energy at a treatment site and provide therapeutically-effective electrical signals, e.g., denervation stimuli. While a spiral or helical configuration is shown in the example of FIGS. 6A to 6C, electrode array 14, 14a, 14b, 14c may be alternatively disposed along a substantially straight and elongated catheter 12, as shown in FIG. 1A, or any other suitable configuration of electrodes.

In some examples, catheter 12, 12a, 12b, 12c, 12d, 12e, 12f may be placed or transformed into the deployed state or arrangement via remote actuation, e.g., via an actuator, such as a knob, pin, or lever carried by hub 18. In other examples, however, catheter 12, 12a, 12b, 12c, 12d, 12e, 12f may be transformed between the delivery and deployed states using other suitable mechanisms or techniques. In some examples, support structures described herein may be transformed to cause catheter 12, 12a, 12b, 12c, 12d, 12e, 12f to transform between delivery and deployed shapes. For example, catheter 12, 12a, 12b, 12c, 12d, 12e, 12f may include a shape memory material, such that catheter 12, 12a, 12b, 12c, 12d, 12e, 12f is configured to assume the relatively low-profile delivery configuration under the force applied by an outer sheath, and upon withdrawal of the sheath, catheter 12 may automatically assume the deployed state.

Figure 7:
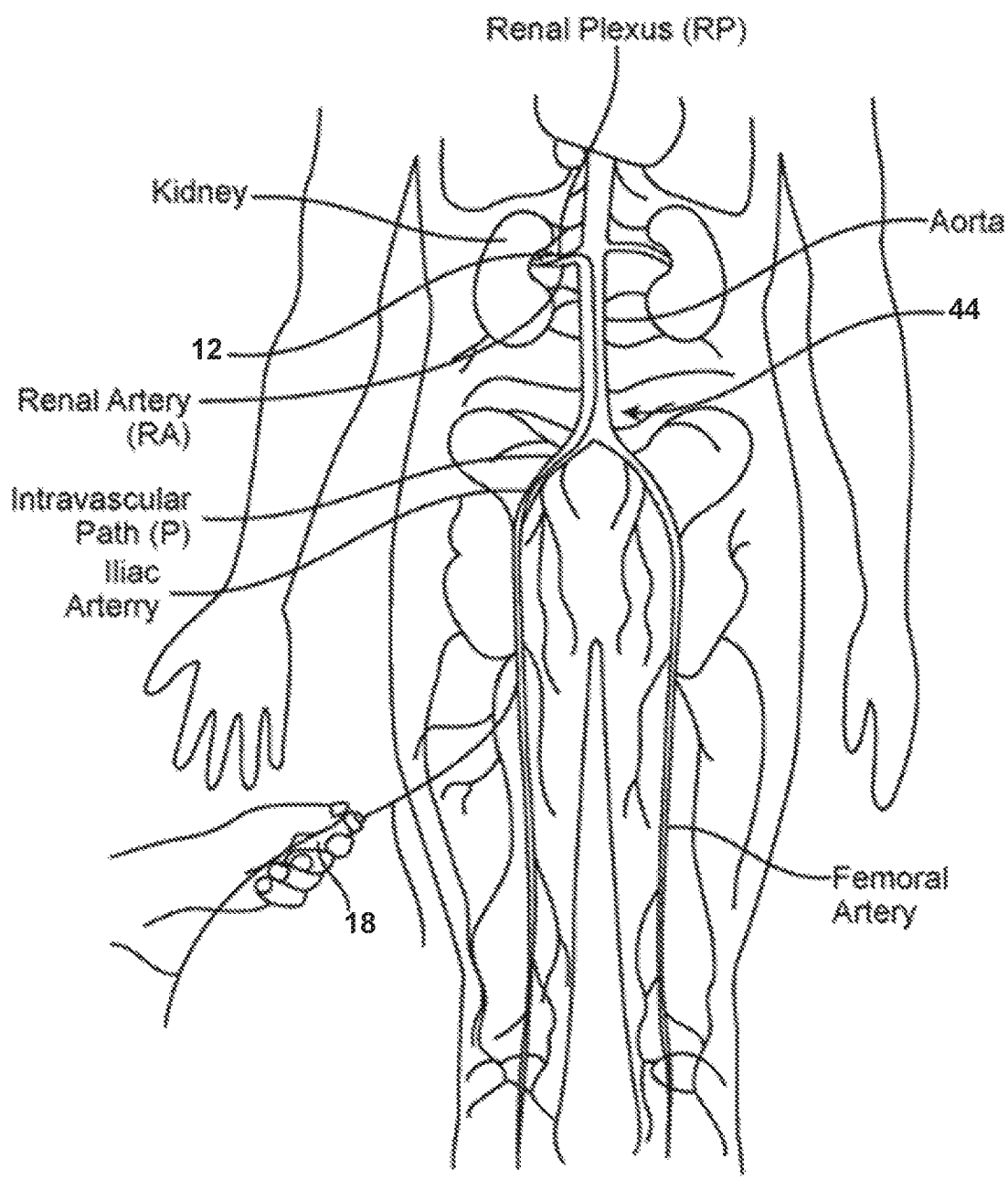
FIG. 7 is a schematic and conceptual illustration of an example deployment of the example system of FIG. 1A for delivering therapy to a patient.

FIG. 7 is a schematic and conceptual illustration of an example deployment of the system of FIG. 1A for delivering therapy to a patient. Catheter 12 provides access to the renal plexus RP through an intravascular path P, such as a percutaneous access site in the femoral (illustrated), brachial, radial, or axillary artery to a targeted treatment site within a respective renal artery RA of the patient. As illustrated, a section of the proximal portion of elongated member 16 is exposed externally of the patient, near hub 18. By manipulating hub 18 and the external section of catheter 12 from outside the intravascular path P, the clinician may advance a more distal portion of elongated member 16 through the sometimes tortuous intravascular path P and remotely manipulate elongated member 16 through vasculature 44. Instead of catheter 12, any of catheters 12a, 12b, 12c, 12d, 12e, or 12f may be similarly deployed.

Image guidance, for example, computed tomography (CT), fluoroscopy, intravascular ultrasound (IVUS), optical coherence tomography (OCT), or another suitable guidance modality, electrode impedance tomography (EIT), or combinations thereof, may be used to aid the clinician's manipulation. Further, in some examples, image guidance components (e.g., IVUS, electrode impedance tomography, or OCT) may be incorporated into catheter 12 itself. In examples in which catheter 12 may change shape (e.g., to a helical shape or another shape) or electrodes of catheter 12 may change shape (e.g., to expand outwardly), after catheter 12 is positioned at a desired place in the renal artery RA, it can be radially expanded or otherwise deployed using hub 18 or other suitable means until electrode array 14 is in stable contact with the inner wall of the renal artery RA. The purposeful application of energy from one or more electrodes of electrode array 14 is then applied to tissue to induce one or more desired therapeutic effects on a target treatment site, for example, localized regions of the renal artery and adjacent regions of the renal plexus RP, which lay intimately within, adjacent to, or in close proximity to the adventitia of the renal artery RA.

The therapeutic effects may generally depend on, at least in part, power, time, contact between electrode array 14 and the vessel wall, and blood flow through the vessel. The therapeutic effects include, for example, denervation, thermal ablation, and non-ablative thermal alteration or lesioning (for example, via sustained heating and/or resistive heating). Desired thermal heating effects may include raising the temperature of target neural fibers above a desired threshold to achieve non-ablative thermal alteration, or above a higher temperature to achieve ablative thermal alteration. For example, the target temperature may be above body temperature (e.g., approximately 37° C.) but less than about 45° C. for non-ablative thermal alteration, or the target temperature may be about 45° C. or higher for the ablative thermal alteration. Desired non-thermal denervation effects may include altering the electrical signals transmitted in a nerve, for example, attenuating the electrical signals.

Exposure to thermal energy (e.g., heat) in excess of a body temperature of about 37° C., but below a temperature of about 45° C., may induce thermal alteration via moderate heating of the target neural fibers or of vascular structures that perfuse the target fibers. In examples in which vascular structures are affected, the target neural fibers are denied perfusion resulting in necrosis of the neural tissue. For example, this may induce nonablative thermal alteration in the fibers or structures. Exposure to heat above a temperature of about 45° C., or above about 60° C., may induce thermal alteration via substantial heating of the fibers or structures. For example, such higher temperatures may thermally ablate the target neural fibers or the vascular structures. In some patients, it may be desirable to achieve temperatures that thermally ablate the target neural fibers or the vascular structures, but that are less than about 90° C., or less than about 85° C., or less than about 80° C., and/or less than about 75° C. Regardless of the type of heat exposure utilized to induce the thermal neuromodulation, a reduction in renal sympathetic nerve activity ("RSNA") is expected. A more detailed description of pertinent patient anatomy and physiology is described with reference to FIGS. 9 to 12B.

Figure 8:
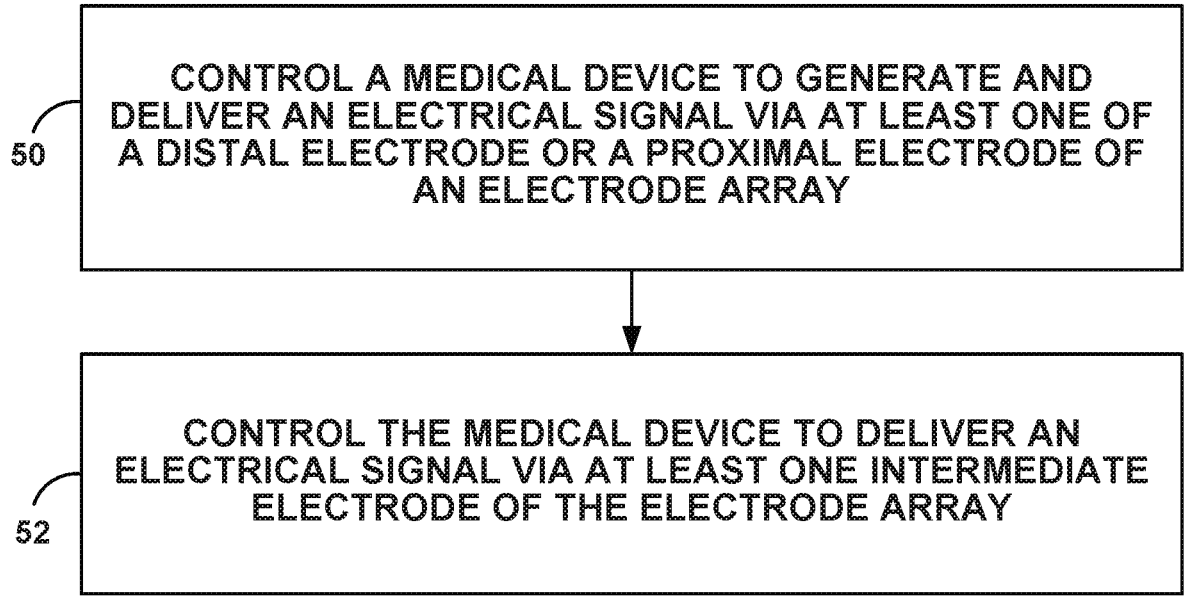
FIG. 8 is a flow diagram illustrating an example technique for delivering therapy using a catheter including an electrode array.

FIG. 8 is a flow diagram illustrating an example technique for delivering therapy using an example catheter described herein, such as catheter 12, 12a including electrode array 14, 14a. While the technique of FIG. 8 is primarily described with respect to catheters 12, 12a, in other examples, the technique may be used with other catheters described herein (e.g., catheters 12b, 12c, 12d, 12e, 12f), the catheters each including an array of electrodes, where one or more electrode characteristics of at least two of the electrodes of the array differ from each other by at least a predetermined threshold.

In some examples, the example technique shown in FIG. 8 includes controlling, by processor 35, a medical device (for example, therapy generator 30), to generate and deliver an electrical signal via at least one of distal electrode 20a or proximal electrode 20b of electrode array 14, 14a (50). In some examples, the electrical signal includes a first electrical signal. In some examples, the medical device may be separately electrically coupled to distal electrode 20a and proximal electrode 20b, such that a different electrical signal may be delivered via the at least one of distal electrode 20a or proximal electrode 20b.

The example technique of FIG. 8 may also include controlling, by processor 35, the medical device to deliver an electrical signal via at least at least one intermediate electrode 22a or 22b (52). In some examples, the electrical signal includes a second electrical signal that is the same as or different than the first electrical signal. In some examples, each intermediate electrode 22a, 22b (and other intermediate electrodes) receives the same electrical signal, for example, the second electrical signal. In addition, in some examples, the medical device may be separately electrically coupled to each of the intermediate electrodes 22a, 22b, such that a different electrical signal may be delivered via each of the electrodes 22a, 22b.

In some examples, processor 35 controls the medical device to deliver the same electrical signal via the at least one of distal electrode 20a or proximal electrode 20b, and via the at least one intermediate electrode 22a, 22b. In these examples, due to the electrode characteristics of the electrodes, substantially simultaneous delivery of the electrical signal in a given tissue site via the electrodes generates a substantially uniform electric field. In other examples, due to the electrode characteristics of the electrodes, substantially simultaneous delivery of the electrical signal in a given tissue site via the electrodes generates an asymmetric electric field.

In other examples, processor 35 controls the medical device to deliver a first electrical signal via the at least one of distal electrode 20a or proximal electrode 20b, and deliver a second electrical signal via the at least one intermediate electrode 22a, 22b. The first and second electrical signals may be different in at least one signal characteristic. In these examples, due to the electrode characteristics of the electrodes, substantially simultaneous delivery of the first and second electrical signals in a given tissue site via the electrodes generates a substantially uniform electric field. In other examples, due to the electrode characteristics of the electrodes, substantially simultaneously delivery of the electrical signal in a given tissue site via the electrodes generates an asymmetric electric field.

The electrical signals delivered to distal electrode 20a, proximal electrode 20b, or intermediate electrodes 22a, 22b (or other intermediate electrodes) may differ in any suitable electrical signal characteristic, for example, amplitude, power, frequency, spectrum, or the like.

In some examples, processor 35 controls therapy generator 30 to deliver a radiofrequency (RF) power signal configured to ablate tissue at the target treatment site (50, 52). In some examples, the processor 35 controls therapy generator 30 to substantially simultaneously deliver a plurality of RF stimuli via electrode array 14, 14a (50, 52). For example, each electrode of electrode array 14, 14a may be configured to deliver a respective RF stimulus of the plurality of RF stimuli.

The following discussion provides further details regarding patient anatomy and physiology as it may relate to renal denervation therapy. This section is intended to supplement and expand upon the previous discussion regarding the relevant anatomy and physiology, and to provide additional context regarding the disclosed technology, the therapeutic benefits associated with renal denervation, and design configurations for catheter 12, 12a-12f (e.g., the configuration of the electrode array 14, 14a-14f). For example, several properties of the renal vasculature may inform the design of treatment devices and associated methods for achieving renal neuromodulation via intravascular access, and may impose specific design requirements for such devices. Specific design requirements may include accessing the renal artery, facilitating stable contact between electrodes of an electrode array (for example, of example medical catheters according to the disclosure) and a luminal surface or wall of the renal artery, and/or effectively modulating the renal nerves with electrical signals delivered through by the electrode array by modifying at least one characteristic of at least one electrode of the electrode array.

The Sympathetic Nervous System (SNS) is a branch of the autonomic nervous system along with the enteric nervous system and parasympathetic nervous system. It is always active at a basal level (called sympathetic tone) and becomes more active during times of stress. Like other parts of the nervous system, the sympathetic nervous system operates through a series of interconnected neurons. Sympathetic neurons are frequently considered part of the peripheral nervous system (PNS), although many lie within the central nervous system (CNS). Sympathetic neurons of the spinal cord (which is part of the CNS) communicate with peripheral sympathetic neurons via a series of sympathetic ganglia. Within the ganglia, spinal cord sympathetic neurons join peripheral sympathetic neurons through synapses. Spinal cord sympathetic neurons are therefore called presynaptic (or preganglionic) neurons, while peripheral sympathetic neurons are called postsynaptic (or postganglionic) neurons.

The sympathetic nervous system is responsible for up- and down-regulating many homeostatic mechanisms in living organisms. Fibers from the SNS innervate tissues in almost every organ system, providing at least some regulatory function to things as diverse as pupil diameter, gut motility, and urinary output. This response is also known as sympathoadrenal response of the body, as the preganglionic sympathetic fibers that end in the adrenal medulla (but also all other sympathetic fibers) secrete acetylcholine, which activates the secretion of adrenaline (epinephrine) and to a lesser extent noradrenaline (norepinephrine). Therefore, this response that acts primarily on the cardiovascular system is mediated directly via impulses transmitted through the sympathetic nervous system and indirectly via catecholamines secreted from the adrenal medulla.

Figure 9:
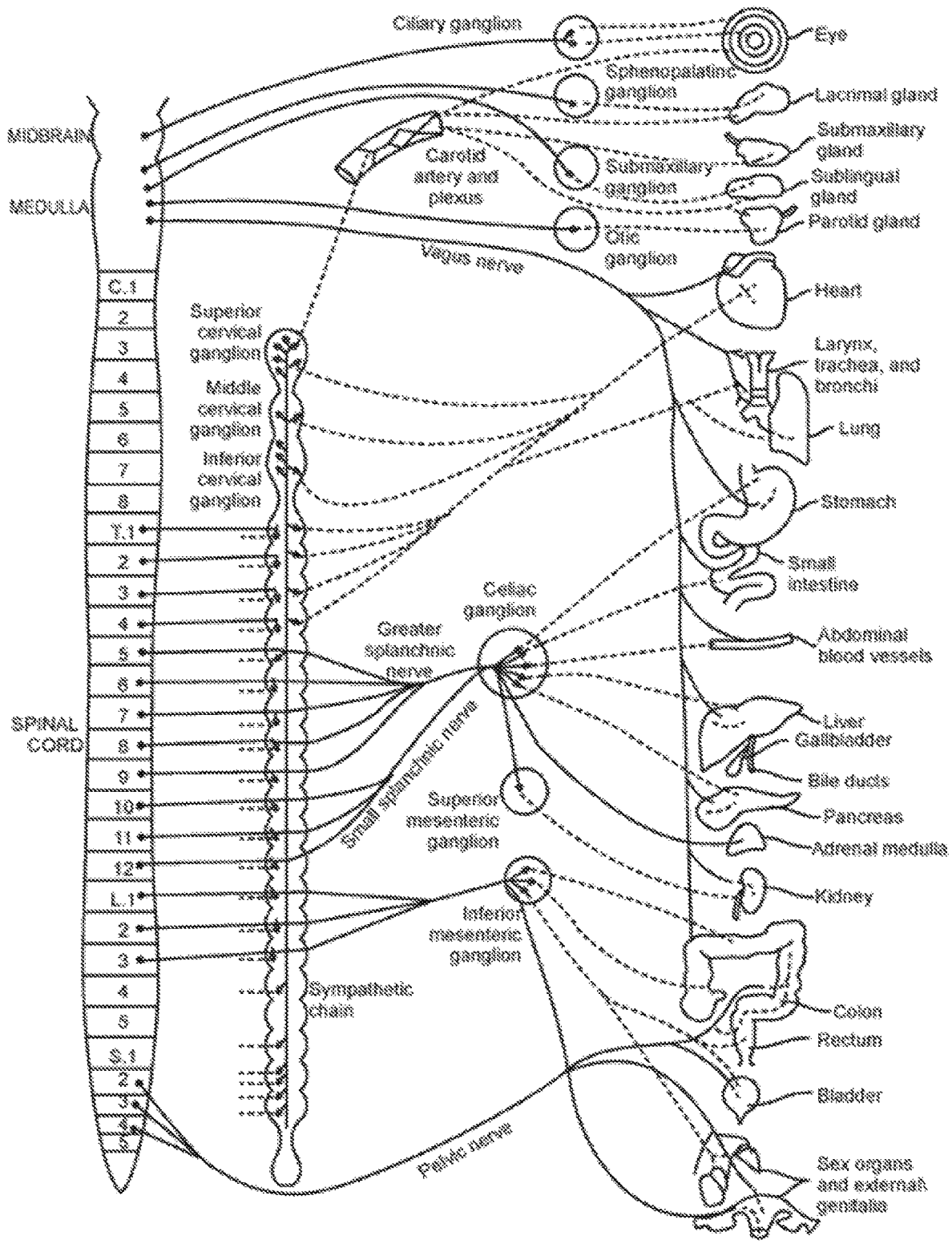
FIG. 9 is a conceptual and schematic illustration of the sympathetic nervous system (SNS) and communication between the brain and the body via the SNS.

FIG. 9 is a conceptual and schematic illustration of the sympathetic nervous system (SNS) and communication between the brain and the body via the SNS. As shown in FIG. 9, the SNS provides a network of nerves that allows the brain to communicate with the body. Sympathetic nerves originate inside the vertebral column, toward the middle of the spinal cord in the intermediolateral cell column (or lateral horn), beginning at the first thoracic segment of the spinal cord and are thought to extend to the second or third lumbar segments. Because its cells begin in the thoracic and lumbar regions of the spinal cord, the SNS is said to have a thoracolumbar outflow. Axons of these nerves leave the spinal cord through the anterior rootlet/root. They pass near the spinal (sensory) ganglion, where they enter the anterior rami of the spinal nerves. However, unlike somatic innervation, they quickly separate out through white rami connectors which connect to either the paravertebral (which lie near the vertebral column) or prevertebral (which lie near the aortic bifurcation) ganglia extending alongside the spinal column.

In order to reach the target organs and glands, the axons should travel long distances in the body, and, to accomplish this, many axons relay their message to a second cell through synaptic transmission. The ends of the axons link across a space, the synapse, to the dendrites of the second cell. The first cell (the presynaptic cell) sends a neurotransmitter across the synaptic cleft where it activates the second cell (the postsynaptic cell). The message is then carried to the final destination.

In the SNS and other components of the peripheral nervous system, these synapses are made at sites called ganglia. The cell that sends its fiber is called a preganglionic cell, while the cell whose fiber leaves the ganglion is called a postganglionic cell. As mentioned previously, the preganglionic cells of the SNS are located between the first thoracic (T1) segment and third lumbar (L3) segments of the spinal cord. Postganglionic cells have their cell bodies in the ganglia and send their axons to target organs or glands.

The ganglia include not just the sympathetic trunks but also the cervical ganglia (superior, middle and inferior), which sends sympathetic nerve fibers to the head and thorax organs, and the celiac and mesenteric ganglia (which send sympathetic fibers to the gut).

Figure 10:
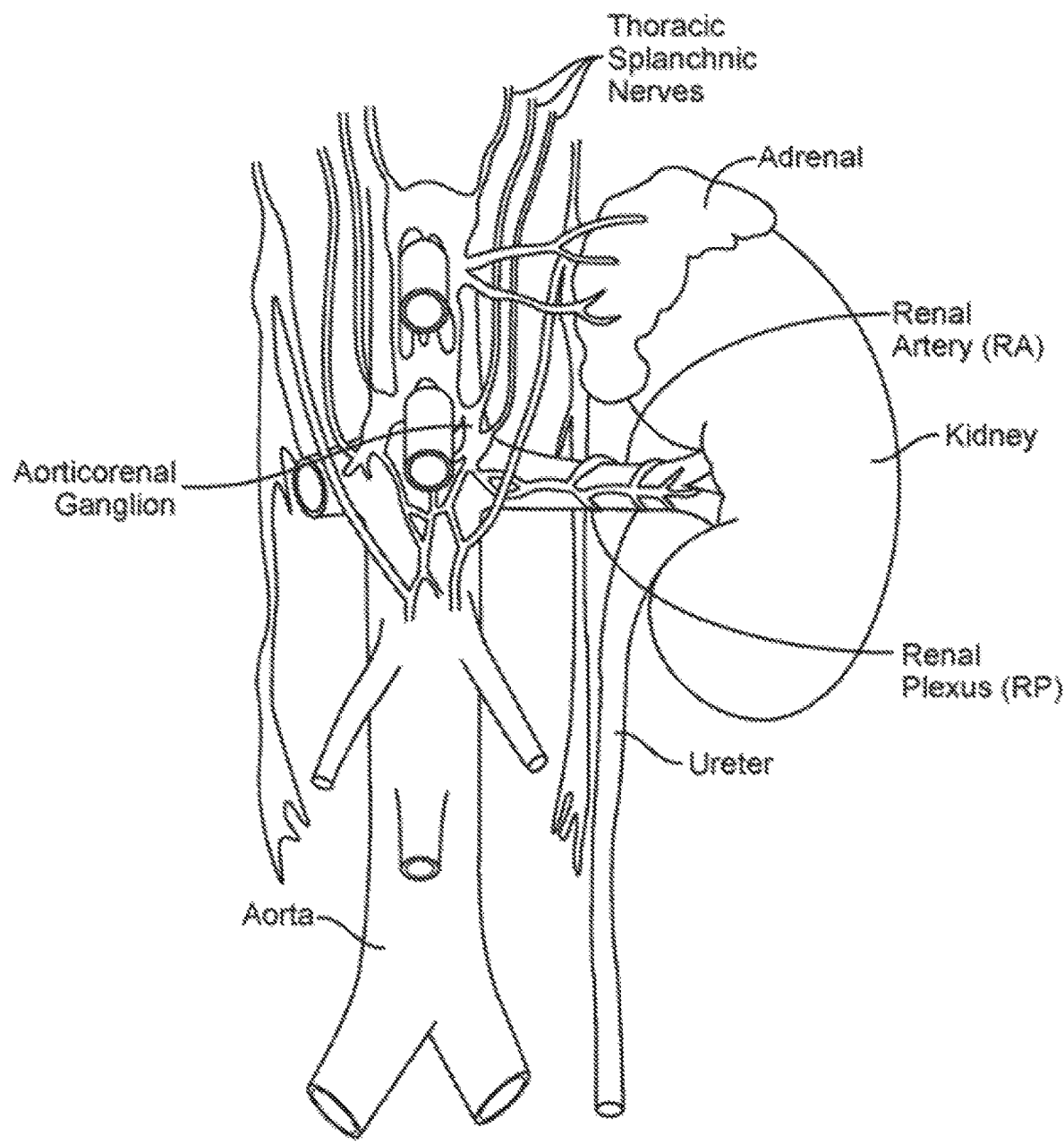
FIG. 10 is a conceptual anatomic view of nerves innervating a left kidney to form the renal plexus surrounding the left renal artery.

FIG. 10 is a conceptual anatomic view of nerves innervating a left kidney to form the renal plexus surrounding the left renal artery. As shown in FIG. 10, the kidney is innervated by the renal plexus RP, which is intimately associated with the renal artery. The renal plexus RP is an autonomic plexus that surrounds the renal artery and is embedded within the adventitia of the renal artery. The renal plexus RP extends along the renal artery until it arrives at the substance of the kidney. Fibers contributing to the renal plexus RP arise from the celiac ganglion, the superior mesenteric ganglion, the aorticorenal ganglion and the aortic plexus. The renal plexus RP, also referred to as the renal nerve, is predominantly comprised of sympathetic components. There is no (or at least very minimal) parasympathetic innervation of the kidney.

Preganglionic neuronal cell bodies are located in the intermediolateral cell column of the spinal cord. Preganglionic axons pass through the paravertebral ganglia (they do not synapse) to become the lesser splanchnic nerve, the least splanchnic nerve, first lumbar splanchnic nerve, second lumbar splanchnic nerve, and travel to the celiac ganglion, the superior mesenteric ganglion, and the aorticorenal ganglion. Postganglionic neuronal cell bodies exit the celiac ganglion, the superior mesenteric ganglion, and the aorticorenal ganglion to the renal plexus RP and are distributed to the renal vasculature.

Messages travel through the SNS in a bidirectional flow. Efferent messages may trigger changes in different parts of the body simultaneously. For example, the sympathetic nervous system may accelerate heart rate; widen bronchial passages; decrease motility (movement) of the large intestine; constrict blood vessels; increase peristalsis in the esophagus; cause pupil dilation, piloerection (goose bumps) and perspiration (sweating); and raise blood pressure. Afferent messages carry signals from various organs and sensory receptors in the body to other organs and, particularly, the brain.

Hypertension, heart failure and chronic kidney disease are a few of many disease states that result from chronic activation of the SNS, especially the renal sympathetic nervous system. Chronic activation of the SNS is a maladaptive response that drives the progression of these disease states. Pharmaceutical management of the renin-angiotensin-aldosterone system (RAAS) has been a longstanding, but somewhat ineffective, approach for reducing over-activity of the SNS.

As mentioned above, the renal sympathetic nervous system has been identified as a major contributor to the complex pathophysiology of hypertension, states of volume overload (such as heart failure), and progressive renal disease, both experimentally and in humans. Studies employing radiotracer dilution methodology to measure overflow of norepinephrine from the kidneys to plasma revealed increased renal norepinephrine (NE) spillover rates in patients with essential hypertension, particularly so in young hypertensive subjects, which in concert with increased NE spillover from the heart, is consistent with the hemodynamic profile typically seen in early hypertension and characterized by an increased heart rate, cardiac output, and renovascular resistance. It is now known that essential hypertension is commonly neurogenic, often accompanied by pronounced sympathetic nervous system overactivity.

Activation of cardiorenal sympathetic nerve activity is even more pronounced in heart failure, as demonstrated by an exaggerated increase of NE overflow from the heart and the kidneys to plasma in this patient group. In line with this notion is the recent demonstration of a strong negative predictive value of renal sympathetic activation on all-cause mortality and heart transplantation in patients with congestive heart failure, which is independent of overall sympathetic activity, glomerular filtration rate, and left ventricular ejection fraction. These findings support the notion that treatment regimens that are designed to reduce renal sympathetic stimulation have the potential to improve survival in patients with heart failure.

Both chronic and end stage renal disease are characterized by heightened sympathetic nervous activation. In patients with end stage renal disease, plasma levels of norepinephrine above the median have been demonstrated to be predictive for both all-cause death and death from cardiovascular disease. This is also true for patients suffering from diabetic or contrast nephropathy. There is compelling evidence suggesting that sensory afferent signals originating from the diseased kidneys are major contributors to initiating and sustaining elevated central sympathetic outflow in this patient group; this facilitates the occurrence of the well known adverse consequences of chronic sympathetic over activity, such as hypertension, left ventricular hypertrophy, ventricular arrhythmias, sudden cardiac death, insulin resistance, diabetes, and metabolic syndrome.

Sympathetic nerves to the kidneys terminate in the blood vessels, the juxtaglomerular apparatus and the renal tubules. Stimulation of the renal sympathetic nerves causes increased renin release, increased sodium (Na+) reabsorption, and a reduction of renal blood flow. These components of the neural regulation of renal function are considerably stimulated in disease states characterized by heightened sympathetic tone and clearly contribute to the rise in blood pressure in hypertensive patients. The reduction of renal blood flow and glomerular filtration rate as a result of renal sympathetic efferent stimulation is likely a cornerstone of the loss of renal function in cardio-renal syndrome, which is renal dysfunction as a progressive complication of chronic heart failure, with a clinical course that typically fluctuates with the patient's clinical status and treatment. Pharmacologic strategies to thwart the consequences of renal efferent sympathetic stimulation include centrally acting sympatholytic drugs, beta blockers (intended to reduce renin release), angiotensin converting enzyme inhibitors and receptor blockers (intended to block the action of angiotensin II and aldosterone activation consequent to renin release), and diuretics (intended to counter the renal sympathetic mediated sodium and water retention). However, the current pharmacologic strategies have significant limitations including limited efficacy, compliance issues, side effects and others.

The kidneys communicate with integral structures in the central nervous system via renal sensory afferent nerves. Several forms of "renal injury" may induce activation of sensory afferent signals. For example, renal ischemia, reduction in stroke volume or renal blood flow, or an abundance of adenosine enzyme may trigger activation of afferent neural communication.

Figure 11A:
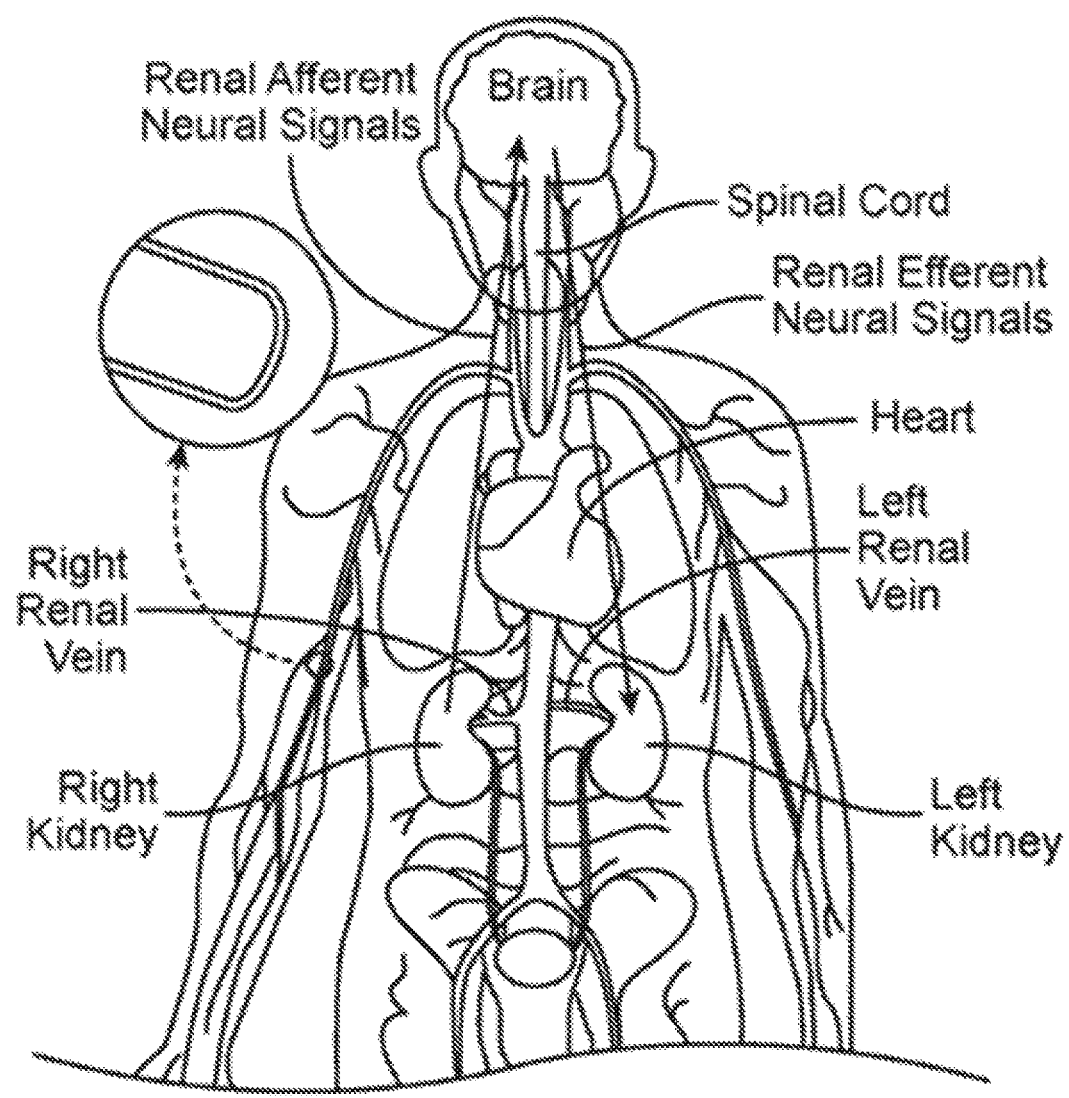
FIGS. 11A and 11B are conceptual anatomic views of a human body, respectively, depicting neural efferent and afferent communication between the brain and kidneys.
Figure 11B:
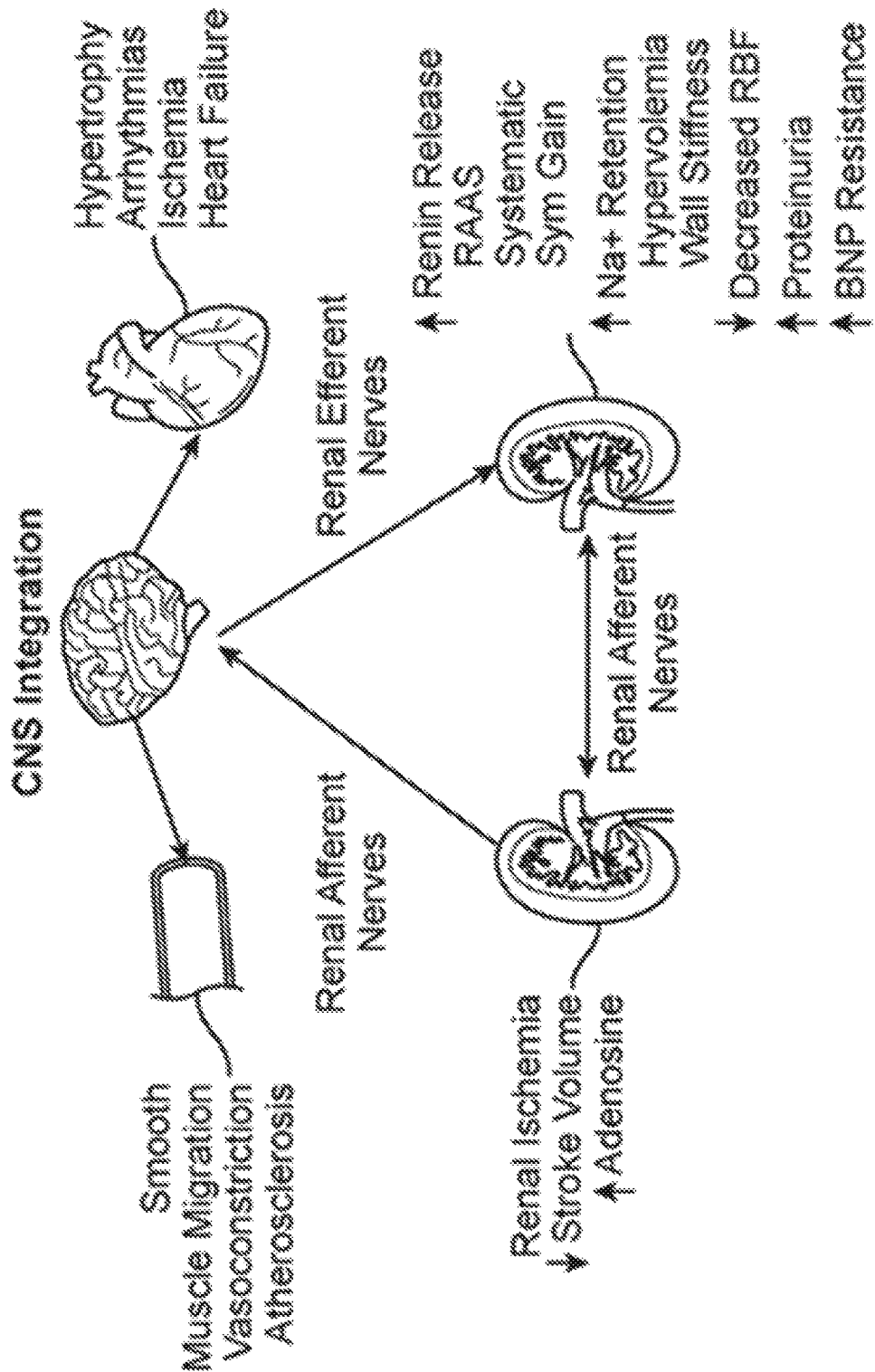

FIGS. 11A and 11B are conceptual anatomic views of a human body, respectively, depicting neural efferent and afferent communication between the brain and kidneys. As shown in FIGS. 11A and 11B, this afferent communication might be from the kidney to the brain or might be from one kidney to the other kidney (via the central nervous system). These afferent signals are centrally integrated and may result in increased sympathetic outflow. This sympathetic drive is directed towards the kidneys, thereby activating the RAAS and inducing increased renin secretion, sodium retention, volume retention and vasoconstriction. Central sympathetic over activity also impacts other organs and bodily structures innervated by sympathetic nerves such as the heart and the peripheral vasculature, resulting in the described adverse effects of sympathetic activation, several aspects of which also contribute to the rise in blood pressure.

The physiology therefore indicates that (i) modulation of tissue with efferent sympathetic nerves may reduce inappropriate renin release, salt retention, and reduction of renal blood flow, and that (ii) modulation of tissue with afferent sensory nerves may reduce the systemic contribution to hypertension and other disease states associated with increased central sympathetic tone through its direct effect on the posterior hypothalamus as well as the contralateral kidney. In addition to the central hypotensive effects of afferent renal denervation, a desirable reduction of central sympathetic outflow to various other sympathetically innervated organs such as the heart and the vasculature is anticipated.

As provided above, renal denervation may be valuable in the treatment of several clinical conditions characterized by increased overall and particularly renal sympathetic activity such as hypertension, metabolic syndrome, insulin resistance, diabetes, left ventricular hypertrophy, chronic end stage renal disease, inappropriate fluid retention in heart failure, cardio-renal syndrome, and sudden death. Because the reduction of afferent neural signals contributes to the systemic reduction of sympathetic tone/drive, renal denervation might also be useful in treating other conditions associated with systemic sympathetic hyperactivity. Accordingly, renal denervation may also benefit other organs and bodily structures innervated by sympathetic nerves, including those identified in FIG. 10. For example, as previously discussed, a reduction in central sympathetic drive may reduce the insulin resistance that afflicts people with metabolic syndrome and Type II diabetics. Additionally, patients with osteoporosis are also sympathetically activated and might also benefit from the down regulation of sympathetic drive that accompanies renal denervation.

In accordance with the present technology, neuromodulation (e.g., denervation) of a left and/or right renal plexus RP, which is intimately associated with a left and/or right renal artery, may be achieved through intravascular access.

Figure 12A:
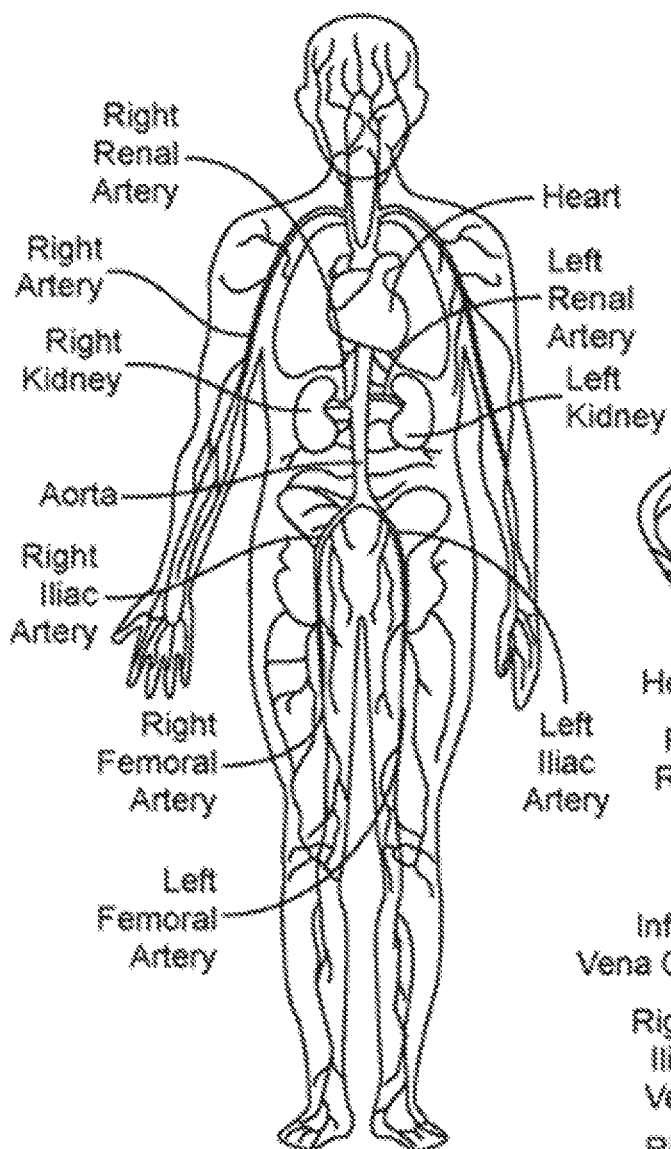
FIGS. 12A and 12B are, respectively, conceptual anatomic views of the arterial and venous vasculatures of a human.
Figure 12B:
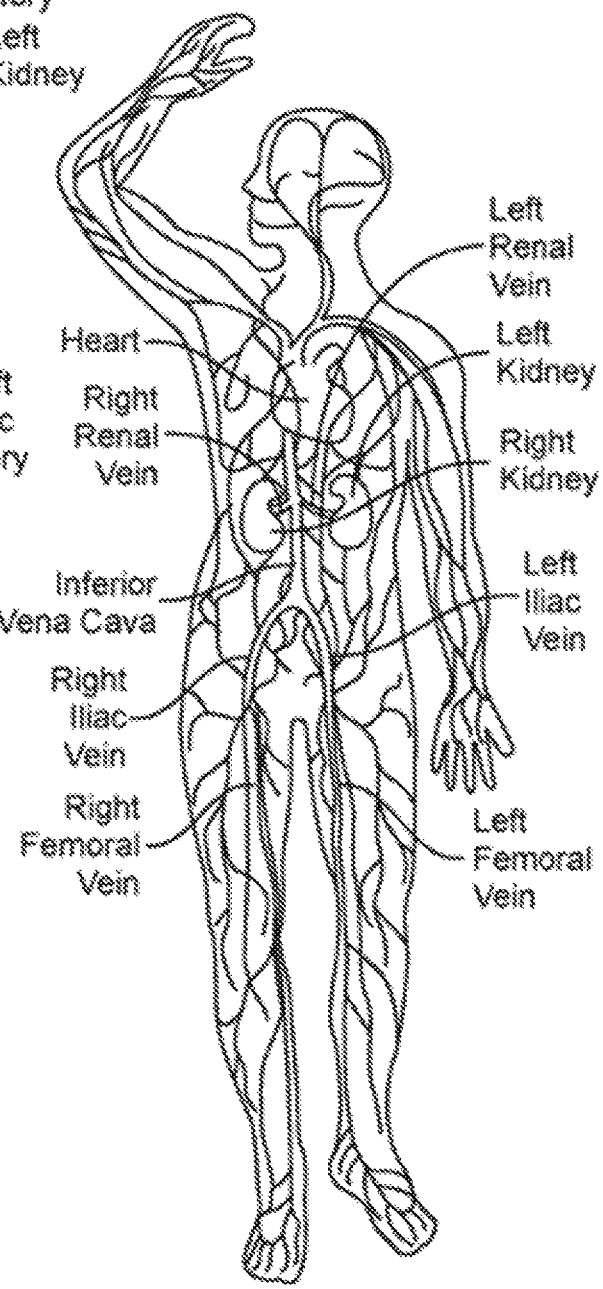

FIGS. 12A and 12B are, respectively, conceptual anatomic views of the arterial and venous vasculatures of a human. As shown in FIG. 12A, blood moved by contractions of the heart is conveyed from the left ventricle of the heart by the aorta. The aorta descends through the thorax and branches into the left and right renal arteries. Below the renal arteries, the aorta bifurcates at the left and right iliac arteries. The left and right iliac arteries descend, respectively, through the left and right legs and join the left and right femoral arteries.

As shown in FIG. 12B shows, the blood collects in veins and returns to the heart, through the femoral veins into the iliac veins and into the inferior vena cava. The inferior vena cava branches into the left and right renal veins. Above the renal veins, the inferior vena cava ascends to convey blood into the right atrium of the heart. From the right atrium, the blood is pumped through the right ventricle into the lungs, where it is oxygenated. From the lungs, the oxygenated blood is conveyed into the left atrium. From the left atrium, the oxygenated blood is conveyed by the left ventricle back to the aorta.

The femoral artery may be accessed and cannulated at the base of the femoral triangle just inferior to the midpoint of the inguinal ligament. A catheter may be inserted percutaneously into the femoral artery through this access site, passed through the iliac artery and aorta, and placed into either the left or right renal artery. This comprises an intravascular path that offers minimally invasive access to a respective renal artery and/or other renal blood vessels.

The wrist, upper arm, and shoulder region may provide other locations for introduction of catheters into the arterial system. For example, catheterization of either the radial, brachial, or axillary artery may be utilized in select cases. Catheters introduced via these access points may be passed through the subclavian artery on the left side (or via the subclavian and brachiocephalic arteries on the right side), through the aortic arch, down the descending aorta and into the renal arteries using standard angiographic technique.

Because neuromodulation of a left and/or right renal plexus RP may be achieved in accordance with the present technology through intravascular access, properties and characteristics of the renal vasculature may impose constraints upon and/or inform the design of apparatus, systems, and methods for achieving such renal neuromodulation. Some of these properties and characteristics may vary across the patient population and/or within a specific patient across time, as well as in response to disease states, such as hypertension, chronic kidney disease, vascular disease, end-stage renal disease, insulin resistance, diabetes, metabolic syndrome, etc. These properties and characteristics, as explained herein, may have bearing on the efficacy of the procedure and the specific configuration of electrodes in electrode arrays (e.g., the electrode characteristics) with which the neuromodulation therapy is delivered. Properties of interest may include, for example, material/mechanical, spatial, fluid dynamic/hemodynamic and/or thermodynamic properties. Based on the properties, electrode characteristics for respective electrodes of example electrode arrays may be selected such that an electric field suitable for providing the desired lesion size or other therapeutic result is generated by an electrode array for a given tissue site within the patient.

As discussed previously, a catheter or another therapy delivery device may be advanced percutaneously into either the left or right renal artery via a minimally invasive intravascular path. However, minimally invasive renal arterial access may be challenging, for example, because as compared to some other arteries that are routinely accessed using catheters, the renal arteries are often extremely tortuous, may be of relatively small diameter, and/or may be of relatively short length. Furthermore, renal arterial atherosclerosis is common in many patients, particularly those with cardiovascular disease. Renal arterial anatomy also may vary significantly from patient to patient, which further complicates minimally invasive access. Significant inter-patient variation may be seen, for example, in relative tortuosity, diameter, length, and/or atherosclerotic plaque burden, as well as in the take-off angle at which a renal artery branches from the aorta. Apparatuses, systems, and methods for achieving renal neuromodulation via intravascular access should account for these and other aspects of renal arterial anatomy and its variation across the patient population when minimally invasively accessing a renal artery.

In addition to complicating renal arterial access, specifics of the renal anatomy may also complicate establishment of stable contact between a therapy delivery device and a luminal surface or wall of a renal artery. When the therapy delivery device includes an energy delivery element, such as an electrode, consistent positioning and appropriate contact force applied by the energy delivery element to the vessel wall may be desirable for predictable denervation therapy delivery. However, navigation may be impeded by the tight space within a renal artery, as well as tortuosity of the artery. Furthermore, establishing consistent contact may be complicated by patient movement, respiration, and/or the cardiac cycle because these factors may cause significant movement of the renal artery relative to the aorta, and the cardiac cycle may transiently distend the renal artery (i.e., cause the wall of the artery to pulse.

Even after accessing a renal artery and facilitating stable contact between therapy delivery device and a luminal surface of the artery, nerves in and around the adventitia of the artery should be effectively modulated via the electrode array. Configurations of electrode arrays using techniques described herein may help achieve a more effective thermal treatment. Effectively applying thermal treatment from within a renal artery can be non-trivial given the potential clinical complications associated with such treatment. For example, the intima and media of the renal artery are relatively vulnerable to adverse effects from thermal energy. As discussed in greater detail below, the intima-media thickness separating the vessel lumen from its adventitia means that target renal nerves may be multiple millimeters distant from the luminal surface of the artery. Sufficient energy should be delivered to or heat removed from the target renal nerves to modulate the target renal nerves without excessively cooling or heating the vessel wall to the extent that the wall is frozen, desiccated, or otherwise potentially affected to an undesirable extent. A potential clinical complication associated with excessive heating is thrombus formation from coagulating blood flowing through the artery. Accordingly, the complex fluid mechanics and thermodynamic conditions present in the renal artery during treatment, particularly those that may impact heat transfer dynamics at the treatment site, may be considered in applying energy (e.g., heating thermal energy) and/or removing heat from the tissue (e.g., cooling thermal conditions) from within the renal artery.

The therapy delivery device should also be configured to allow for adjustable positioning and repositioning of the energy delivery element within the renal artery since location of treatment may also impact clinical efficacy. For example, it may be tempting to apply a full circumferential treatment from within the renal artery given that the renal nerves may be spaced circumferentially around a renal artery. In some situations, full-circle lesion likely resulting from a continuous circumferential treatment may be potentially related to renal artery stenosis. Therefore, the formation of more complex lesions along a longitudinal dimension of the renal artery may be desirable, and may be aided by manipulating the cumulative electric field by modifying at least one electrode characteristic of at least one electrode of an electrode array. It should be noted, however, that a benefit of creating a circumferential ablation may outweigh the potential of renal artery stenosis or the risk may be mitigated with certain embodiments or in certain patients and creating a circumferential ablation could be a goal. Additionally, variable positioning and repositioning of the electrode array, an/or modification of volumes of influence of a delivered stimulus via selection of certain electrodes of the electrode array (which may have different electrode characteristics) may prove to be useful in circumstances where the renal artery is particularly tortuous or where there are proximal branch vessels off the renal artery main vessel, making treatment in certain locations challenging. Manipulation of a device in a renal artery should also consider potentially adverse mechanical interaction between the device and the renal artery. Motion of a device in an artery, for example by inserting, manipulating, negotiating bends and so forth, may contribute to dissection, perforation, denuding intima, or disrupting the interior elastic lamina.

Based on the above described challenges of (1) renal artery intervention, (2) consistent and stable placement of the treatment element against the vessel wall, (3) effective application of treatment across the vessel wall, (4) positioning and potentially repositioning the treatment apparatus to allow for multiple treatment locations, and (5) avoiding or limiting duration of blood flow occlusion, various independent and dependent properties of the renal vasculature that may be of interest include, for example, (a) vessel diameter, vessel length, intima-media thickness, coefficient of friction, and tortuosity; (b) distensibility, stiffness and modulus of elasticity of the vessel wall; (c) peak systolic, end-diastolic blood flow velocity, as well as the mean systolic-diastolic peak blood flow velocity; and mean/max volumetric blood flow rate; (d) specific heat capacity of blood and/or of the vessel wall, thermal conductivity of blood and/or of the vessel wall, and/or thermal convectivity of blood flow past a vessel wall treatment site and/or radiative heat transfer; (e) renal artery motion relative to the aorta induced by respiration, patient movement, and/or blood flow pulsatility: and (f) as well as the take-off angle of a renal artery relative to the aorta. These properties will be discussed in greater detail with respect to the renal arteries. However, dependent on the apparatus, systems and methods utilized to achieve renal neuromodulation, such properties of the renal arteries, also may guide and/or constrain design characteristics of electrode arrays.

As noted above, an apparatus positioned within a renal artery, such as elongated member 16, should conform to the geometry of the artery in some examples. Renal artery vessel diameter, DRA, may be in a range of about 2-10 mm, with most of the patient population having a DRA of about 4 mm to about 8 mm and an average of about 6 mm. Renal artery vessel length, LRA, between its ostium at the aorta/renal artery juncture and its distal branchings, may be in a range of about 5-70 mm, and a significant portion of the patient population is may be in a range of about 20-50 mm. Because the target renal plexus is embedded within the adventitia of the renal artery, the composite Intima-Media. Thickness, IMT, (i.e., the radial outward distance from the artery's luminal surface to the adventitia containing target neural structures) also is notable and may be in a range of about 0.5-2.5 mm for some patients, with an average of about 1.5 mm. Although a certain depth of treatment is important to reach the target neural fibers, the treatment should not be too deep (e.g., greater than 5 mm from inner wall of the renal artery) to avoid non-target tissue and anatomical structures such as the renal vein.

An additional property of the renal artery that may be of interest is the degree of renal motion relative to the aorta, induced by respiration and/or blood flow pulsatility. A patient's kidney, which located at the distal end of the renal artery, may move as much as 4 inches (about 10 centimeters) cranially with respiratory excursion. This may impart significant motion to the renal artery connecting the aorta and the kidney, thereby requiring from the catheter a unique balance of stiffness and flexibility to maintain contact between a thermal or electrical treatment element and the vessel wall during cycles of respiration. Furthermore, the take-off angle between the renal artery and the aorta may vary significantly between patients, and also may vary dynamically within a patient, e.g., due to kidney motion. The take-off angle generally may be in a range of about 30°-135°.

As discussed above, therapeutic efficacy for some medical procedures, such as renal denervation, may be achieved by a substantially uniform electric field in some examples, while in other examples, therapeutic efficacy may be better achieved by an asymmetric electric field. Using catheters including an array of electrodes, where at least one electrode characteristic of at least two electrodes differ, a therapy system including therapy generator 30 and the catheter may be used to generate a substantially uniform electric field, a nonuniform field, a symmetric field, or an asymmetric field to provide a desired level of tissue lesioning at a given tissue site. In some examples, example electrode arrays may be used to generate a uniform electric field having a field strength adjacent the given tissue site configured to provide a uniform level of lesioning along the given tissue site. In other examples, example electrode arrays may be used to generate different field strengths along the electrode arrays to provide different desired levels of lesioning at different tissue sites adjacent different regions of the electrode arrays, or at different tissue sites along the vasculature of the patient.

In some examples, therapy delivery by example electrode arrays and catheter according to the disclosure may be modeled using computer models, for example, computer models that incorporate patient-specific data or tissue parameter data to determine electric fields and volumes of influence generated by different configurations of electrode arrays or different types of catheters or other therapy delivery devices, as described with reference to FIGS. 13 to 19. The computer modeling may be used to select a particular catheter (and, therefore, a particular electrode array configuration) for therapy delivery and/or to determine, for a given electrode array and patient anatomy, the electrical signal parameters of therapy (e.g., denervation therapy) expected to provide efficacious results. While denervation therapy (also referred as neuromodulation therapy) is primarily described with reference to the modeling in other examples, the devices, systems, and techniques described herein may be used with other types of therapy.

As discussed above, denervation therapy may include delivering electrical energy, for example, via an RF energy field, to a nerve in order to render the nerve inert, inactive, or otherwise completely or partially reduced in function. This complete or partial reduction in function may be temporary or permanent. As described with reference to FIGS. 13 to 19, some systems and techniques according to the disclosure may be used to estimate a volume of influence of a denervation stimulus delivered to a target nerve, and based on the volume of influence, to determine one or more parameters of denervation therapy. In some examples, the one or more parameters of denervation therapy determined based on the estimated volume of influence may be used to automatically control a medical device to deliver the denervation therapy to a patient. The volume of influence may be estimated based on a computer model generated from a digital reconstruction of a region of a patient, the digital reconstruction indicating parameters such as tissue types and relative locations. The volume of influence may be considered to be a volume within a predetermined region of a patient in which an applied denervation stimulation results in denervation, for example, by ablation or lesioning within the volume of influence. The volume of influence may indicate the effect of the denervation stimulus on tissue. Thus, the viability of nerves in the volume of influence may be reduced below a predetermined threshold, so that the nerves in the volume of influence exhibit reduced, substantially reduced, or substantially no activity. In some examples, the denervation therapy may result in lesioning of the target nerve while avoiding lesioning of a predetermined adverse-effect region, for example, a non-target non-nerve tissue. In some examples, the denervation therapy results in ablation or lesioning of tissue (e.g., a target nerve), but may not directly stimulate nerves or cardiac tissue of the patient.

Devices, systems, and techniques for determining one or more parameters of denervation therapy using a computer model that takes into consideration patient-specific tissue characteristics and anatomy, as well as the configuration of an electrode array (e.g., electrode array 14), including the varying electrode characteristics of the electrodes, may be useful for determining one or more parameters of denervation therapy. In some examples, these parameters can include an electrical signal parameter, the electrodes of electrode array 14 with which an electrical signal is delivered to the target tissue site, and, in some examples, the specific catheter used to deliver the denervation stimuli (which may inform the configuration of the electrode array). The one or more determined parameters of denervation therapy may be stored by a device, such as a medical device programmer or a medical device, as a therapy program, which may be used by the medical device to generate and deliver denervation therapy to a patient.

Figure 13:
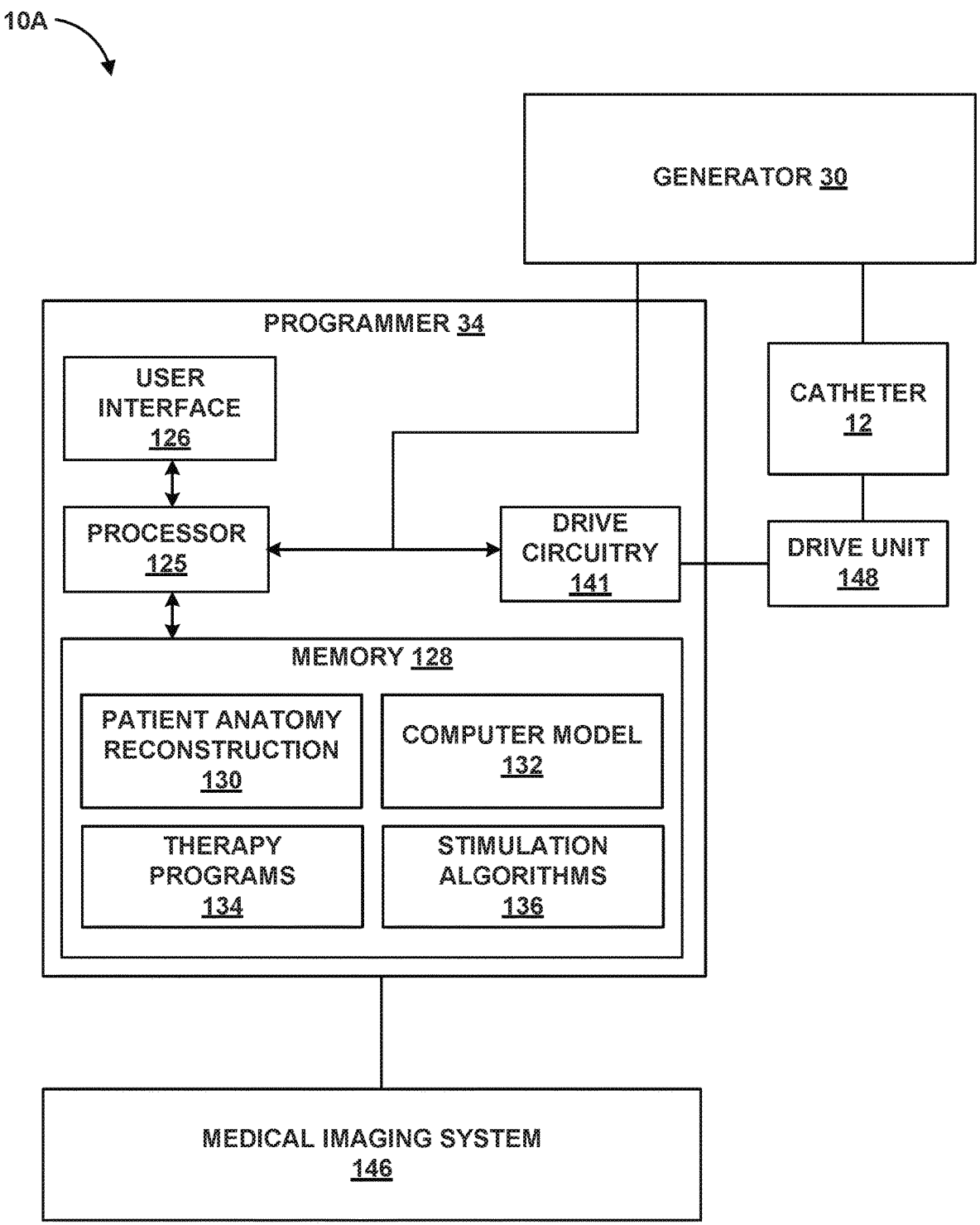
FIG. 13 is a schematic and conceptual illustration of an example programmer coupled to an imaging system and an example therapy delivery device.

FIG. 13 is a schematic and conceptual illustration of an example system 10A including programmer 34 coupled to a medical imaging system 146 and to catheter 12. In some examples, system 10A is similar to system 10 described with reference to FIG. 1A. Instead of, or in addition to, processor 35 and memory 38 in therapy generator 30, system 10A may include programmer 34 including a processor 125, a user interface 126, and a memory 128. In some examples, processor 35 and memory 38 in therapy generator 30 may perform functions described with reference to processor 125 and memory 128.

Memory 128 includes computer-readable instructions that, when executed by processor 125, causes programmer 124 to perform various functions. Processor 125 may include any one or more microprocessors, controllers, digital signal processors (DSPs), application specific integrated circuits (ASICs), field-programmable gate arrays (FPGAs), or equivalent discrete or integrated digital or analog logic circuitry, and the functions attributed to processor 125 herein may be embodied as software, firmware, hardware or any combination thereof.

Memory 128 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. Memory 128 may store any suitable information, including patient identification information, and information for generating one or more therapy program with which generator 30 generates and delivers denervation therapy to a patient. For example, memory 128 may store one or more of patient anatomy reconstruction 130, computer model 132, therapy programs 134, stimulation algorithms 136, and operating instructions in separate memories within memory 128 or separate areas within memory 128. Memory 128 may also store operating instructions with which processor 125 controls the operation of programmer 124, and may include instructions for measuring the impedance of electrode array 14 and/or determining placement and orientation of electrode array 14 along the blood vessel.

In examples in which system 10A includes programmer 124, generator 30 can be configured to receive one or more therapy parameter values with which generator 30 generates and delivers denervation therapy via programmer 124. In some examples, generator 30 or programmer 124 may include one or more evaluation or feedback modules to provide feedback to the clinician before, during, and/or after denervation therapy.

In some examples, functions described elsewhere with reference to programmer 124 may be performed by generator 30, and system 10A may not include a separate programmer. Thus, system 10A may include a memory (for example, in generator 30 or programmer 124) configured to store one or more tissue characteristics of tissue proximate a target nerve and a blood vessel of a patient, and a processor coupled to the memory. The processor is configured to determine one or more tissue characteristics of tissue proximate a target nerve and a blood vessel. The processor is configured to generate, based on the one or more tissue characteristics, an estimated volume of influence of denervation therapy delivered by catheter 12 disposed within the blood vessel. The processor is configured to generate a GUI that provides information to a clinician to help visualize denervation therapy, and determine the effects of different therapy delivery parameters. In some examples, the GUI includes a graphical representation of the tissue proximate the target nerve and the blood vessel and a graphical representation of the estimated volume of influence.

Thus, systems and techniques according to the disclosure may constitute an improvement at least to the denervation therapy system 10 or 10A itself. For example, example systems and techniques according to the disclosure can provide more efficacious denervation therapy. In some examples, the denervation therapy may be delivered in less treatment time, for example, because of a relatively more even distribution of therapy delivery locations. Further, systems and techniques according to the disclosure may reduce or avoid the need for trial-and-error in the clinician's determination of placement, positioning, orientation, and denervation therapy parameters, for example, because the system may indicate suitable placement, positioning, orientation, and denervation therapy parameters to the clinician.

The functioning of catheter 12 and generator 30 may be controlled by programmer 124 based on estimated volume of influence of denervation therapy. For example, programmer 124 may determine one or more therapy parameters for a therapy program for achieving predetermined levels of denervation in a target region of a patient. The clinician, generator 30, or programmer 124, optionally may choose which electrodes of electrode arrays 14, 14a, 14b, 14c, 14f are used for power delivery in order to form customized lesion(s) within the renal artery having a variety of predetermined shapes or patterns. The selection of the particular electrode of electrode array 14 with which a denervation stimulus (also referred to herein as denervation stimulation) is delivered to tissue is one example of a therapy delivery parameter value that programmer 124 can determine using the computer modeling techniques described herein.

In some examples, programmer 124 may generate or use therapy programs 134 for determining therapy parameters. For example, each therapy program 134 defines a particular program of therapy in terms of respective values for denervation stimulation parameters, such as the one or more electrodes of electrode array 14 with which the stimulus is delivered to a patient, electrode polarity (if applicable), duty cycle, current or voltage amplitude, and/or frequency.

Generator 30 is configured to receive one or more therapy programs 134 from programmer 124, and apply the denervation therapy parameter values specified by the received one or more therapy programs 134, such as amplitude, duty cycle, and frequency, to generate a denervation stimulus. For example, generator 30 may control stimulation circuitry 138 to generate a denervation stimulation signal according to a particular therapy program, and deliver the denervation stimulation signal via catheter 12. Stimulation circuitry 138 may be electrically coupled to the one or more conductors of catheter 12 using any suitable technique. For example, generator 30 may include switching circuitry configured to switch the stimulation generated by stimulation circuitry 138 across different electrodes or stimulation generator 30 may include multiple energy sources to drive more than one electrode at one time.

In some examples, generator 30 may include sensing circuitry 140 coupled to catheter 12, for example, to receive electrical measurements, feedback, or signals, for example, impedance, which a processor of generator 30 may automatically control the delivery of a denervation stimulation signal via catheter 12.

In some examples, system 10A may include one or both of drive circuitry 141 or drive unit 148 ultimately coupled to therapy delivery device to control one or more of movement, location, or orientation of catheter 12 along the blood vessel in which catheter 12 is disposed. For example, drive unit 148 may include a stepper motor, a servo motor, or suitable motor, or magnetic rail, or any other suitable mechanism for advancing, retracting, rotating, and repositioning catheter 12 along the blood vessel. Drive circuitry 141 may control operation of drive unit 148, for example, by amplifying or sending control signals from processor 125 to drive unit 148. In some examples, drive circuitry 141 may receive feedback signals from drive unit 148 indicative of a current location or orientation of catheter 12, and freedom of or resistance to movement of catheter 12, and may send such feedback signals to processor 125 for ultimately controlling the movement and position of catheter 12.

A user, either a clinician or patient, may interact with processor 125 through user interface 126. User interface 126 may include a display, such as a liquid crystal display (LCD), light-emitting diode (LED) display, or other screen, to present information related to stimulation therapy, and buttons or a pad to provide input to programmer 124. In examples in which user interface 126 requires a 3D environment, the user interface may support 3D environments such as a holographic display, a stereoscopic display, an autostereoscopic display, a head-mounted 3D display, or any other display that is capable of presenting a 3D image to the user. Buttons of user interface 126 may include an on/off switch, plus and minus buttons to zoom in or out or navigate through options, a select button to pick or store an input, and pointing device, e.g. a mouse, trackball, or stylus. Other input devices may be a wheel to scroll through options or a touch pad to move a pointing device on the display. In some examples, the display may be a touch screen that enables the user to select options directly from the display screen.

In some examples, programmer 124 may include a telemetry module that may support wired or wireless communication between programmer 124 and generator 30 or another computing device under the control of processor 125. A clinician or another user may interact with programmer 124 to generate and/or select therapy programs 134 for delivery via catheter 12. In some examples, programmer 124 may allow a clinician to define target volumes of influence, and generate appropriate therapy delivery parameter values to achieve the desired volumes of influence. Programmer 124 may be used to present anatomical regions to the clinician via user interface 126, select therapy programs 134, generate new therapy programs 134 by manipulating computer model 132 or estimated volumes of influence presented on a GUI on user interface 126, and communicate the selected therapy programs 134 to the generator 30.

Programmer 124 may include a power source for delivering operating power to the components of programmer 124. The power source may include at least one battery and a power generation circuit to produce the operating power. In some examples, the battery may be rechargeable to allow extended operation. Recharging may be accomplished through proximal inductive interaction, or electrical contact with circuitry of a base or recharging station. In other examples, primary batteries (e.g., nickel cadmium or lithium ion batteries) may be used. In addition, programmer 124 may be directly coupled to an alternating current source, such would be the case with some computing devices, such as personal computers. The power source may include circuitry to monitor power remaining within a battery. In this manner, user interface 126 may provide a current battery level indicator or low battery level indicator when the battery needs to be replaced or recharged. In some cases, the power source may be capable of estimating the remaining time of operation using the current battery.

In some examples, programmer 124 may be communicatively coupled to medical imaging system 146, or may otherwise receive one or more medical images of a patient from medical imaging system 146. Medical imaging system 146 may be configured to generate a medical image of a region of a patient that includes a target nerve (e.g., intended to be denervated) and, in some cases, a corresponding blood vessel. The corresponding blood vessel may be, for example, an artery or another blood vessel through which the target nerve may be accessed by a therapy delivery device. One or more medical images generated by medical imaging system 146 may be stored by programmer 124 in memory 128, or otherwise used by processor 125, to generate patient anatomy digital reconstruction 130. The medical image can be any medical image that provides sufficient resolution for identifying the tissue regions to avoid (for example, particular muscles, lymph nodes, other blood vessels veins/arteries, the kidney itself, the digestive tract, or other anatomical features or tissue).

In some cases, memory 128 of programmer 124 or another device (e.g., a remote device) may store a plurality of medical images of a patient, which can be, for example, a plurality of medical images of the same or nearly the same region of the patient. In some cases, if there has been a relatively large gap of time between denervation therapy sessions (e.g., on the order of weeks, months, or even years), a clinician may elect to use medical imaging system 146 to generate one or more updated medical images of the patient or otherwise obtain updated medical images of the patient, and update the one or more therapy programs used by generator 30 based on the one or more updated medical images. In some examples, the plurality of medical images may include any suitable available medical images of the patient region, for example, images obtained of the patient region obtained for a therapy other than denervation therapy. There may be changes to a particular patient's anatomy and/or tissue characteristics over time, such as due to weight gain, weight loss, or the like.

In some examples, medical image system 146 includes at least one of a fluoroscopy system, a computer aided tomography (CAT) scan system, a magnetic resonance imaging (MRI) system, a positron emission tomography (PET) scan system, an electrical impedance tomography (EIT) system, an ultrasound system, or an optical imaging system. Processor 125 may be configured to develop computer model 132 based on patient anatomy reconstruction 130. In some examples, computer model 132 includes a finite element model. In some examples, digital reconstruction 130 includes a three-dimensional (3D) reconstruction. Processor 125 may use one or both of digital reconstruction 130 or computer model 132 to determine an estimated volume of influence of denervation therapy, and determine one or more therapy programs 134 based on the estimated volume of influence, as described with reference to FIGS. 14, 15, 16, and 17. Processor 125 may further also be used to deliver and monitor delivery of denervation therapy by generator 30 based on therapy programs 134, as described with reference to FIGS. 14, 15, 16, and 17.

Figure 14:
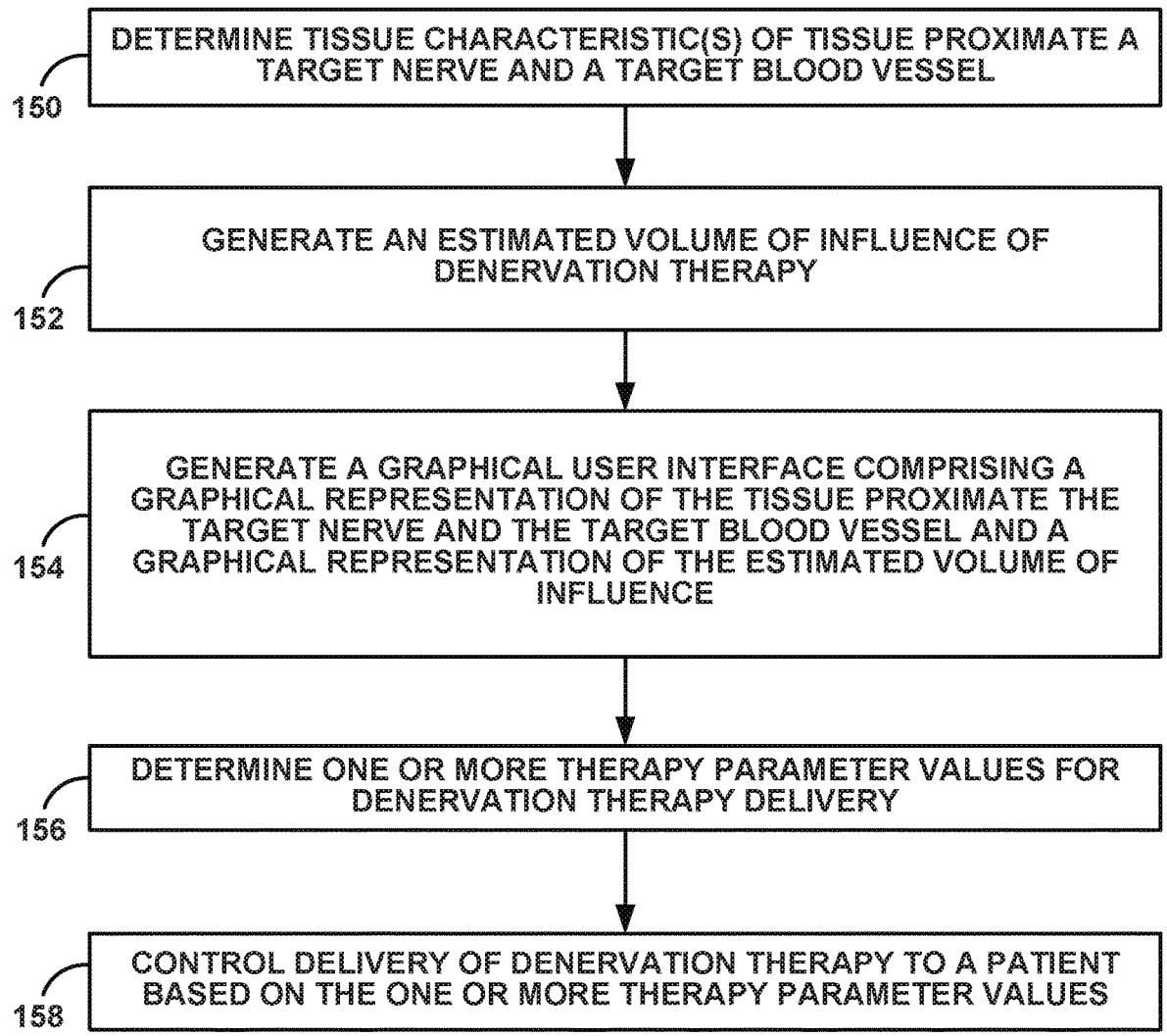
FIG. 14 is a flow diagram illustrating an example technique for delivering denervation therapy.

FIG. 14 is a flow diagram illustrating an example technique for delivering denervation therapy. The example techniques of FIGS. 14 to 17 are described with reference to the example systems of FIGS. 1A, 1B, and 13. However, example techniques of FIGS. 14 to 17 may be performed using any suitable systems or devices. In some examples, the example technique of FIG. 14 includes determining, by processor 125, one or more tissue characteristics of tissue proximate a target nerve and a blood vessel (150). The tissue characteristics may include, but are not limited to, one or more of electrical impedance, thermal conductivity, acoustic impedance, chemical diffusivity, optical transmittivity, or density of tissue. In some examples, processor 125 may determine the tissue characteristics by at least generating a computer model 132 based on digital reconstruction 130 including the target nerve and blood vessel, as described with reference to FIG. 15.

Processor 125 may generate, based on the one or more tissue characteristics, at least one estimated volume of influence of denervation therapy delivered according to one or more respective therapy programs via catheter 12 disposed within the blood vessel (152). For example, based on the thermal and electrical conductivity associated with different tissue types identified from computer model 132 of the region of the patient, processor 125 may determine the volumetric reach to which energy or denervation stimulation may be electrically or thermally conducted from electrode array 14 (or generally from a location and orientation of a therapy delivery element of catheter 12). As an example, processor 125 may determine the estimated propagation of RF signals having predetermined frequencies and amplitudes, and the estimate propagation of thermal waves, based on tissue properties such as conductivities and densities.

In some examples, processor 125 may determine the shape, orientation, reach, or strength of one or more electric fields associated with individual electrodes of electrode array 14 (e.g., which may be electrodes of electrode array 14, 14*a*, 14*b*, 14*c*, or 14*f*) or a cumulative electric field generated by substantially simultaneous delivery of an electrical signal by all of the electrodes. In some examples, processor 125 may determine different electric fields associated with different combinations or patterns of electrodes, and may determine a relationship between the electric fields and the volumes of influence at one or more tissue sites of the patient. In some examples, processor 125 may also determine electrical signal parameters that generated a given electric field pattern or shape. Thus, for given volumes of influence, and based on patient-specific tissue data, processor 125 may determine a combination of electrodes or electrical signal parameters for generating the given volumes of influence. Ultimately, in some examples, based on a given therapeutic effect at one or more tissue sites, processor 125 may determine electrode combinations or configurations and electrical signal parameters to generate the given therapeutic effect, for example, a pattern of ablation or lesion along a vessel.

Because example electrode arrays according to the disclosure can result in a number of different electric fields, for example, electric fields differing in uniformity, symmetry, geometry, orientation, and strength, modeling of electrode arrays and electric fields may help a clinician identify an efficacious and relatively efficient therapy plan by modeling the volume of influence associated with one or more electrode arrays. For example, computer model 132 may be used to determine the type or configuration of an electrode array or catheter suitable for a given tissue site to achieve a uniform electric field or an asymmetric field that would result in an efficacious lesion, such that the clinician can select an appropriate catheter from among a plurality of different types of catheters and electrode arrays. For example, instead of, or in addition to, performing trials or tests using different electrode arrays or catheters, a clinician may use computer model 132 to model the influence at a given tissue site of different electrode arrays or catheters, and then select a suitable electrode array or catheter for delivering therapy to the patient.

In some examples, computer model 132 may account for blood flow rates in one or more blood vessels in a region of the patient. For example, a blood flow rate in a blood vessel, for example, a renal artery, may affect the volume of influence resulting from delivery of a stimulus by catheter 12. For example, a higher blood flow rate may cause relatively faster thermal dissipation, leading to a smaller volume of influence for a given denervation stimulus than a volume of influence associated with a lower blood flow rate. In some examples, computer model 132 may include blood flow rates at or near a target tissue site, which may help increase the efficacy, efficiency, or both, of denervation therapy delivery by a catheter 12 compared to denervation therapy delivered in an ad hoc manner, without the aid of computer model 132. The patient-specific anatomy can include, for example, the locations and relative arrangement of different anatomical structures of the patient (e.g., organs, blood vessels, target tissue sites, and the like), and the size of one or more blood vessels, which may correspond to a blood flow rate through the vessel, and, therefore, thermal and/or electrical conductivity of the blood vessel.

Processor 125 may use any suitable technique to determine the estimated volume of influence, including, but not limited to, a finite element model or another algorithm that numerically represents how different stimuli affect different types of tissue. The estimated volume of influence may be indicative of the extent of denervation stimulus and may be indicative of viability of nerve and non-nerve tissue subjected to the denervation stimulus. For example, processor 125 may determine that no lesions may be formed in tissue outside the estimated volume of influence, while lesions may be formed within the estimated volume of influence. Thus, in some examples, the estimated volume of influence includes a lesion, for example, a denervating lesion.

In some examples, processor 125 may determine two or more estimated volumes of influence based on respective therapy programs. For example, processor 125 may generate a first estimated volume of influence of a first denervation therapy delivered by catheter 12 according to a first therapy program of therapy programs 134, and determine a second estimated volume of influence of a second denervation therapy delivered by catheter 12 according to a second therapy program of therapy programs 134. The second therapy program includes at least one therapy parameter value (e.g., a different subset of electrodes of electrode array 14) different from a respective therapy parameter value of the first therapy program.

In some examples, processor 125 may determine multiple therapy programs that each provides efficacious results for a particular patient, e.g., due to similar targeting of the renal nerve or other nerve or target tissue site of interest by denervation stimuli. However, the result of the delivery of the denervation therapy according to the different therapy programs may differ from each other in one or more ways. For example, some therapy programs may define denervation stimuli that require more power to generate than one or more other therapy programs, such that some therapy programs may be more efficient (for example, in terms of power usage) than others. As another example, some therapy programs may result in lesioning of more non-target tissue than one or more other therapy programs. Thus, processor 125 may select a therapy program not only based on the estimated lesioning of the target tissue site, but also based one or more other factors, such as the power consumed during a therapy session, the effect on a non-target tissue site, and the like. In some examples, processor 125 may order a list of therapy programs based on one or more of these other factors (e.g., ascending or descending order based on power consumption, non-target tissue site volume affected by the therapy, or the like), and present the ordered list of therapy programs to a user via a display of user interface 126. Processor 125 may then select the one or more therapy programs for controlling delivery of the therapy to a patient in response to a user input, or automatically based on the top one or more predetermined number of therapy programs in the ordered list.

In some examples, processor 125 may generate a plurality of therapy programs (which differ from each other by at least one therapy parameter value, including signal parameters and/or electrodes used to deliver a denervation stimulus), and determine a plurality of volumes of influence, each volume of influence of the plurality of volumes of influence being associated with a respective therapy program of the plurality of therapy programs. Processor 125 may determine a volume of influence of the plurality of volumes of influence, for example, at least one volume of influence that extends to a tissue of interest, while avoiding non-target sites, for example, predetermined adverse effect sites. Based on the at least one volume of influence, processor 125 may select a therapy program of the plurality of therapy programs for delivering the denervation therapy to the patient. Processor 125 may control generator 30 to generate and deliver denervation therapy according to the therapy delivery parameters defined by the selected therapy program, generating the at least one volume of influence at the target tissue site, such that the at least one volume of influence does not impact or extend into a non-target tissue site.

In some examples, processor 125 may generate a plurality of therapy programs (which differ from each other by at least a location of volume of influence along a vessel). For example, processor 125 may generate a plurality of therapy programs delivered at a plurality of locations along the vessel, for example, six, nine, twelve, or any suitable number of locations along the length of the vessel. Processor 125 may determine a plurality of volumes of influence, each volume of influence of the plurality of volumes of influence associated with a respective location of the locations along the vessel. In some examples, two or more volumes of influence along the vessel may overlap in volume. In some examples, processor 125 may select a therapy program that achieves a relatively simple pattern of therapeutic influence, for example, ablation, along the vessel. For example, the simple pattern may be the most efficient with respect to power usage or duration of a therapy session, or the easiest for a clinician to deliver, or may result in relatively lowest adverse effects along the vessel in non-target tissue sites along the vessel, or otherwise result in a given pattern of therapy delivery along the vessel. In some examples, processor 125 may select a therapy program that generates a pattern of volumes of influences along the vessel for a given therapy delivery device, for example, a given type or configuration or orientation of catheter or electrodes along the therapy delivery device. In some examples, the given therapy delivery device may include a catheter defining a spiral or helical portion, and three, four, or more electrodes or any suitable therapy delivery elements simultaneously delivering therapy along the spiral or helical portion.

In some examples, processor 125 may select a therapy program generating different volumes of influence, for example, extending to different geometric volumes, at different locations along the vessel. The particular volumes of influence at specific locations may correspond to, for example, the location of the target tissue site (e.g., a renal nerve) relative to the therapy delivery device. In some examples, the therapy program may generate a smaller volume of influence at one or more locations along the vessel, and a larger volume of influence along other locations along the vessel. In some examples, the volumes of influence may progressively increase in volume, or progressively decrease in volume, along the vessel.

In some examples, processor 125 may select a plurality of therapy programs, each therapy program of the plurality of therapy programs associated with a location of the different locations along the vessel. Different therapy programs of the plurality of therapy programs may differ in one or more therapy parameters at different locations. In some examples, the respective magnitudes of therapy parameters of respective therapy programs may progressively increase, or progressively decrease, along the vessel.

In some examples, processor 125 generates a graphical user interface (GUI) and presents the GUI via user interface 126 (154). The GUI may include a graphical representation of the tissue proximate the target nerve and the blood vessel and a graphical representation of the estimated volume of influence. This GUI may provide a clinician with the information to relatively quickly ascertain the therapeutic effects of a particular therapy program on a particular patient in ways that existing renal denervation therapy programming that do not provide such patient-specific modeling may not allow.

In addition to or instead of generating GUI, processor 125 may determine, based on the estimated volume of influence, one or more therapy parameter values for efficacious denervation therapy delivery (156). For example, processor 125 may select one or more of the modeled therapy programs 134 based on the resulting estimated volume of influence (152). The therapy parameter values may include, for example, at least one of an electrical signal parameter and the electrodes or subset of electrodes with which a particular electrical signal is delivered to a target tissue site in a patient. In some examples, the therapy parameter values can include, for example, respective locations within the patient for the delivery of a denervation stimulus. Processor 125 may select the one or more therapy parameter values using any suitable criterion or criteria. For example, in some cases, processor 125 determines the one or more therapy parameter values by at least selecting the one or more therapy parameter values (or therapy programs) determined to result in lesioning of the target nerve and avoiding lesioning of a predetermined adverse-effect region. In other examples, processor 125 determines the one or more therapy parameter values by at least selecting the one or more therapy parameter values (or therapy programs) determined to avoid lesioning of a predetermined adverse-effect region, without necessarily resulting in estimated lesioning of the target nerve.

In examples in which processor 125 generates estimated volumes of influence, processor 125 determines the one or more therapy parameter values for denervation therapy delivery by at least selecting a subset (e.g., one or more) of the plurality of modeled therapy programs. For example, in the example above in which processor 125 generates estimated volumes of influence for each of a first therapy program and the second therapy program based on the respective first and second estimated volumes of influence, processor 125 may select the therapy program associated with the volume of influence that encompasses a denervation target nerve, and/or results in a volume of influence that avoids lesioning of a predetermined adverse-effect region (for example, a tissue or organ in which lesioning is not sought).

In some examples, processor 125 may generate a GUI 126 that orders the therapy programs 134 based on determined efficacy (e.g., resulting in lesioning of a target nerve and/or avoiding lesioning of an adverse-effect region, or a clinician may otherwise select one of therapy programs 134. For example, processor 125 may associate each stored therapy program 134 with a numerical score based on the associated estimated volumes of influence, the score indicating, for example, the amount of overlap of the estimated volume of influence with the target nerve and/or amount of overlap with an adverse-effect region. Processor 125 may then order the therapy programs 134 in ascending or descending order based on scores. A clinician may then quickly review the ordered list of therapy programs to determine which one or more therapy programs should be used to program generator 30.

In some examples, processor 125 may controls generator 30 to generate and deliver denervation therapy to a patient based on the determined one or more therapy parameter values 134 (158). For example, processor 125 may transmit one or more selected therapy programs 134 to generator 30 via wired or wireless communication, or directly controls stimulation circuitry 138 to generate and deliver the denervation therapy based on a selected therapy program 134.

In some examples, the example technique further includes generating, by processor 125 and based on the estimated volume of influence, an indexed location of catheter 12 within the patient, and associating the indexed location with a particular therapy program. For example, the indexed location may be a location along the blood vessel (or alone a shaft of catheter 12), and the indexed location may be a location of a therapy delivery element (for example, electrodes of electrode array 14) of catheter 12 relative to the blood vessel or another anatomical landmark or landmark on catheter 12. The indexed locations may be used to determine the extent to which catheter 12 has advanced within the blood vessel or otherwise the proximity of one or more therapy delivery elements (for example, electrode array 14) of catheter 12. In some examples, drive unit 148 may advance or retract catheter 12 along the blood vessel by monitoring the index locations, for example, index locations on catheter 12 that may be ascertainable external to the body vessel.

Any suitable technique may be used by a processor of drive unit 148 to control the position of catheter 12. For example, drive unit 148 may include an optical unit that monitors visible markers on catheter 12 to determine the relative position of catheter 12 relative to an entry point into the patient. As another example, catheter 12 may include magnetic markers, and drive unit 148 may determine the relative position of catheter 12 (e.g., relative to programmer 124) using the magnetic markers, e.g., the magnitude of a magnetic field generated by the magnetic markers and sensed by a sensor of drive unit 148. In some examples, catheter 12 may include radiopaque or x-ray markers detectable under fluoroscopy, which the clinician or drive unit 148 may align with predetermined registration markers overlaid on a display of the fluoroscopic or other medical image. The radiopaque markers overlaid on a displayed medical image may enable the clinician to manually assess positioning of catheter 12.

In some examples, processor 125 may generate a GUI that includes an image, such a fluoroscopic image of the region of the patient, and may overlay markers on the image to show a clinician where the indexed locations are located relative to patient anatomy. Processor 125 may overlay one marker at a time to help guide the clinician to a next location for delivery of a denervation stimulus, or may overlay a plurality of markers at a time. For example, the clinician may compare the overlaid markers with markers indicative of the indexed locations, for example, radiopaque markers on catheter 12. A clinician may use this information to manually guide catheter 12 to different locations within the patient during a medical procedure. In other examples, processor 125 may communicate with a fluoroscopy imaging system or another imaging system, which may then overlay the one or more markers on a medical image of the patient similar to the foregoing example.

As discussed above, in some examples, processor 125 generates a computer model of a region of a patient, where the computer model defines a spatial representation of tissue, including respective tissue characteristics (e.g., thermal conductivity, electrical conductivity, density, and/or the like), in the region. Processor 125 may generate the computer model using any suitable technique.

Figure 15:
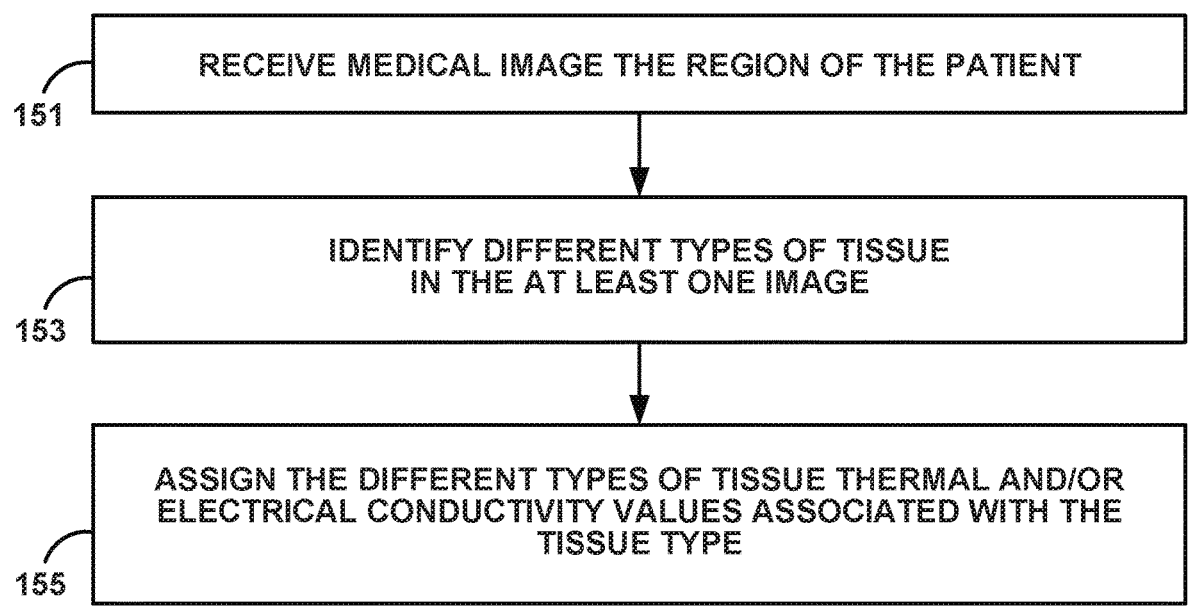
FIG. 15 is a flow diagram illustrating an example technique for generating a computer model of a region of the patient.

FIG. 15 is a flow diagram illustrating an example technique for generating a computer model of a region of the patient. In the example of FIG. 15, processor 125 receives at least one medical image of the region the patient from medical imaging system 146 (151). Any suitable imaging modality may be used for the medical image, examples of which are described above. Based on the at least one image, processor 125 may identify different types of tissue in the at least one image (153). Example tissue types include, but are not limited to, bones, tendons, muscle, fat, lymph nodes, blood vessels, and/or organs. As another example, example tissue types may merely be based on the tissue characteristics, such as, but not limited to, the thermal or electrical conductivity of the tissue, the density of the tissue, the chemical diffusivity of the tissue, sonic or ultrasonic parameters, for example, speed of sound or attenuation, or the like or any combination thereof.

For example, processor 125 may identify predetermined tissue types in the at least one image based on location, size, or one more visual characteristics of the image (e.g., depth of the color of the image), or coordinating with expected densities of different tissue types. As another example, processor 125 may receive user input via user interface 126 (FIG. 13) that identifies different tissue types in the image. For example, a user may provide input outlining different sub-regions of tissue types and identifies the tissue types, such as by assigning the different sub-regions a particular tissue type. Processor 125, however, may also do this automatically in some examples, such as by using image processing techniques, e.g., edge detection, to find boundaries between different tissue types. By identifying the different types of tissue in the at least one image, processor 125 may generate a map of the region of the patient, which indicates the relative location and types of tissue proximate a target nerve and associated blood vessel.

Processor 125 may assign the different types of tissue corresponding tissue characteristics associated with known tissue types (155). For example, processor 125 may assign different identified tissue types within the medical image respective thermal and/or electrical conductivity values or chemical diffusivity values associated with the respective tissue types. In some examples, one or more of thermal or electrical conductivities and tissue densities for different tissue types may be generic to patients, or at least to some classes of patients (e.g., tissue characteristics of newborns may be similar to each other, while tissue characteristics of geriatric patients may be similar to each other). Processor 125 may associate different tissue types with respective tissue characteristics in memory 128 (FIG. 13) of programmer 124 or a memory of another device.

Processor 125 may use, in addition to, or instead of, the at least one image, electrical maps of the patient region, for example, an impedance map determined by a plurality of electrodes introduced into the region of the patient to generate the computer model. In some examples, the clinician may designate the tissue type, and processor 125 may assign the tissue type identified by the clinician with respective tissue characteristics (for example, thermal and electrical conductivities and density). In this way, by combining tissue characteristics with spatial relationships of different tissue types identified in the at least one image, processor 125 may generate computer model 132 representing tissue characteristics at different sites within the patient region in the image. The computer model 132 may be, for example, a digital reconstruction of the region of the patient.

In some examples, processor 125 may process multiple images to generate a 2D or 3D computer model 132. The electrical maps and/or images may be registered to each other using any suitable, such as by aligning anatomical landmarks (e.g., boney landmarks) visible in the images and/or maps.

Figure 16:
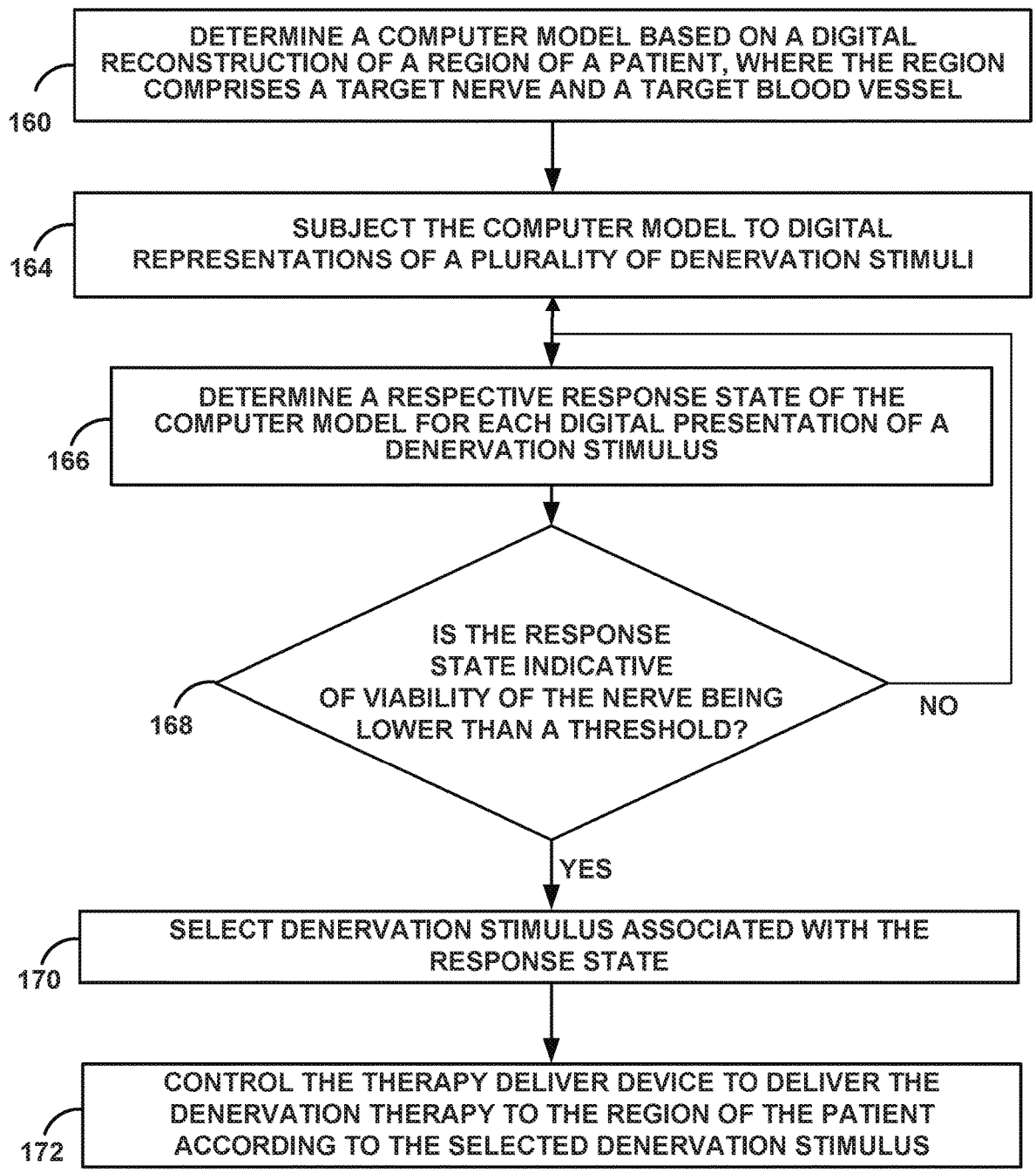
FIG. 16 is a flow diagram illustrating an example technique for delivering denervation therapy.

FIG. 16 is a flow diagram illustrating another example technique for delivering denervation therapy. The technique shown in FIG. 16 may be a more specific example of the technique of FIG. 14. In some examples of the technique shown in FIG. 16, processor 125 determines a computer model 132 based on a digital reconstruction 130 of a region of a patient (160). The region includes a target nerve and a blood vessel. Computer model 132 defines a spatial representation of one or more tissue characteristics in the region. Processor 125 can determine computer model 132 by generating computer model 132, e.g., using the technique described with respect to FIG. 15, or by retrieving an already-generated computer model 132 from memory 128 of programmer 124 or a memory of another device.

Processor 125 subjects computer model 132 to digital representations of a plurality of denervation stimuli (164). For each of the digital representations of a denervation stimulus, processor 125 simulates the delivery of the respective denervation stimulus the digital reconstruction of tissue of the patient by (a digital representation of) catheter 12 in a respective pre-determined orientation and at a respective predetermined location along the blood vessel. Processor 125 determines a respective response state of computer model 132 to each of the digital representations of a denervation stimulus (166). For example, processor 125 may generate the estimated volume of influence based on the magnitude, orientation, and direction of the denervation stimulus, and based on the tissue properties (as represented in computer model 132) of tissue adjacent the target nerve and the blood vessel. The response state may indicate how far the denervating effects of the denervation stimulus are expected to propagate from the catheter 12 within the patient, given the tissue characteristics of tissue proximate the therapy delivery elements of catheter 12.

In the technique shown in FIG. 16, processor 125 generates an estimated volume of influence expected to result from delivery of denervation catheter 12 according to a particular therapy program and catheter (e.g., a particular electrode array) by subjecting computer model 132 to the digital representations of the plurality of denervation stimuli and determining the response state of the computer model 132 to the respective denervation stimulus.

Processor 125 may select the denervation stimulus and catheter for therapy delivery to the patient based on the determined response states. For example, processor 125 may determine a viability of the target nerve based on the response state, and may compare the viability with a threshold (168). In some examples, processor 125 may determine viability based on temperature the target nerve or adjacent tissue is expected to attain, and the time period for which the target nerve or adjacent tissue is expected to maintain the temperature. For example, a lower time duration may be sufficient to affect viability if the expected temperature is relatively higher. If the viability of the nerve is less than the threshold, then the response state may be indicative of denervation of the target nerve (because the viability of the nerve reduced to below the threshold). In some such examples, processor 125 may select the at least one denervation stimulus in response to determining that the respective response state associated with the selected at least one denervation stimulus is indicative of viability of the nerve being lower than a threshold (170). In such examples, processor 125 may store the therapy program used to generate the denervation stimulus in therapy programs 134 as an efficacious therapy program, or by storing the therapy program as a new therapy program added to therapy programs 134. In some examples, processor 125 may associate that therapy program with the particular target nerve, so that processor 125 or another device may select the therapy program if that target nerve is to be denervated.

In some examples, the region of the patient includes at least one non-target non-nerve tissue. In some such examples, in addition to or instead of non-viability or low viability of the target nerve, a sufficiently high viability of a non-target tissue (for example, non-nerve tissue or organ) may be sought. In some such examples, the respective response state associated with the selected at least one denervation stimulus may be indicative of viability of the non-target non-nerve tissue being greater than the threshold. Thus, in some examples, processor 125 selects the at least one denervation stimulus in response to determining that the respective response state associated with the selected at least one denervation stimulus is indicative of viability of the non-target non-nerve tissue being greater than a threshold. Processor 125 may store the therapy program used to generate the denervation stimulus in therapy programs 134 as an efficacious therapy program, or by storing the therapy program as a new therapy program added to therapy programs 134. In some examples, processor 125 may associate that therapy program with the particular target nerve, so that processor 125 or another device may select the therapy program if that target nerve is to be denervated.

Processor 125 may subsequently use the one or more selected denervation stimuli (or resulting therapy programs) to control delivery denervation therapy by generator 30. For example, processor 125 may control generator 30 to generate and deliver the denervation therapy to the region of the patient via catheter 12 according to the denervation stimuli (or resulting therapy programs) (172).

While a clinician may deploy and manipulate the position, orientation, and initiation of denervation stimulus delivery via catheter 12, in some examples, programmer 124 may control or help the clinician with automated or semi-automated positioning, orienting, or triggering of therapy delivery device.

Figure 17:
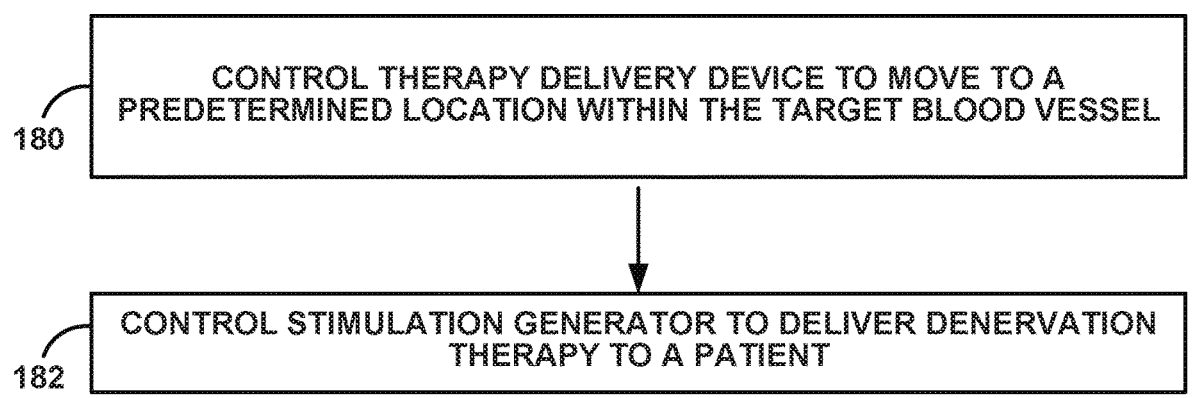
FIG. 17 is a flow diagram illustrating an example technique for delivering denervation therapy.

FIG. 17 is a flow diagram illustrating an example technique for controlling the position of catheter 12 within patient during a medical procedure. Memory 128 of programmer 124 or a memory of another device may store a plurality of indexed locations for catheter 12. The indexed locations may correspond to locations (e.g., relative to some known landmark) at which an electrode of catheter 12 may be positioned along a length of a blood vessel to provide an even distribution of denervation stimuli. In addition, or instead, the indexed locations may correspond to particular therapy programs selected for the respective location to provide the desirable volumes of influence. As discussed above, because of varying tissue characteristics at different positions along a blood vessel, the denervation therapy parameter values needed to generate a volume of influence that results in the desired therapeutic effect may differ based on the location within the patient. The technique of FIG. 17 may help system 10A provide more efficient and effective denervation therapy in a shorter amount of time by associating known locations with respective therapy programs that have been determined (using computer model 132) to likely result in efficacious therapy delivery to the patient.

In accordance with the technique shown in FIG. 17, processor 125 controls a surgical device to move catheter 12 to a predetermined location within the blood vessel (180). For example, processor 125 may send one or more control signals through drive circuitry 141 or otherwise to drive unit 148, and drive unit 148 may engage catheter 12, and cause catheter 12 to advance, retract, or rotate to assume a predetermined position and orientation along the blood vessel and relative to the target nerve or predetermined non-nerve tissue. Once catheter 12 is at the desired, predetermined location, processor 125 may control generator 30 to deliver denervation therapy to a patient based on the one or more therapy parameter values (182). For example, processor 125 may send generator 30 a control signal that causes generator 30 to deliver the denervation stimulus. As another example, processor 125 may notify a clinician, who may then manually control generator 30 to deliver the denervation stimulus.

As discussed above, in some examples, processor 125 generates a GUI 126 and presents the GUI on a display of user interface 126 of programmer 124. The GUI may present, for example, a graphical representation of a region of a patient that includes a target nerve and, if relevant, a corresponding blood vessel. The corresponding blood vessel can be, for example, a blood vessel through which catheter 12 is introduced to access the target nerve. In some examples, the GUI may only include a graphical representation of a region of a patient that includes a target nerve and, if relevant, a corresponding blood vessel. In other examples, the GUI may include other graphical elements, such as a graphical representation of an estimated volume of influence expected to result from delivery of a denervation stimulus to tissue of the patient via catheter 12. Such a GUI may help a clinician better visualize the denervation therapy and gain a better understanding of the affects that different therapy parameter values, including the location of a therapy delivery element within the patient, may have on the volume of influence.

In some examples, rather than generating a graphical representation of a volume of influence based on a known therapy program as discussed in some examples above, a user may provide input indicating a graphical representation of a desired volume of influence within the GUI, and processor 125, in response, may determine the therapy parameter values that are expected to result in the volume of influence. Processor 125 may then program generator 30 using these therapy parameter values, which may be stored as a therapy program.

Figure 18:
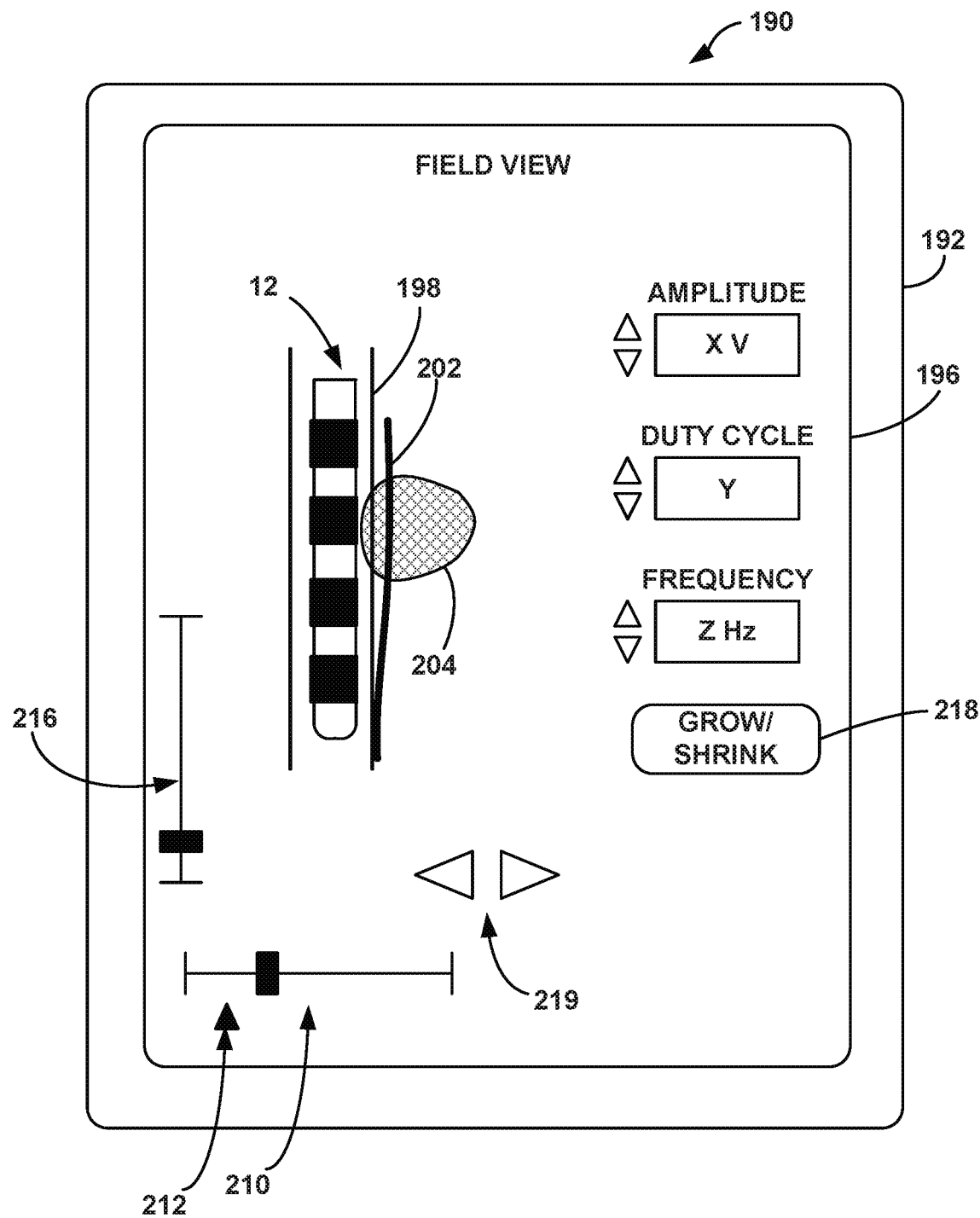
FIG. 18 illustrates a schematic representation of an example graphical user interface (GUI) that may be presented on a display of a user interface of the programmer of FIG. 13.

FIG. 18 illustrates a schematic representation of an example GUI 190 that may be presented on the display of user interface 126 of programmer 124 of FIG. 13. By interacting with GUI 190, a user may generate a graphical representation of an electric field generated by a given electrode array (e.g., one of arrays 14 or 14a-14f), where the electric field may be an example of a volume of influence. In some examples, the user may be able to create an electric field and direct processor 125 to generate a set of therapy parameter values (e.g., a therapy program) that would best match the electric field. In some examples, the user may change the size, shape or position of the electric field within GUI 190 using graphical input media such as cursor or stylus control. The generated electric field may be utilized as a computer model of a therapy field associated with the generated parameters, for example, the volume of influence associated with electrical denervation stimuli. Thus, the volume of influence may be observed by the clinician using GUI 190, and the clinician may select or modify one or more of therapy programs 134 based on the observed volume of influence.

GUI 190 illustrates a graphical representation of catheter 12, which includes a multi-electrode geometry. In the example of FIG. 18, catheter 12 includes four electrodes at different axial positions, generally arranged in a ring. Each electrode is coupled to a respective electrical conductor within catheter 12. Hence, catheter 12 includes multiple electrical conductors, e.g., wires, cables or the like, that extend from the proximal end of the lead to respective electrodes to electrically couple the electrodes to electrical terminals, for example, those of generator 30.

In some examples, each electrode is powered independently by generator 30 so that stimulation energy can be delivered at different axial positions. In some examples, catheter 12 may include combinations of complex electrode array geometries and simple electrode array geometries. For example, ring electrodes that extend about the entire circumference of the lead may be used in combination with electrodes disposed at different axial and angular positions. Selective activation of the electrodes carried by catheter 12 can produce customizable electric fields that may be directed to a particular side of catheter 12 in order to isolate the electric field around a target anatomical region.

GUI 190 illustrates a side view of catheter 12, shown to be introduced in a blood vessel 198. Although not shown in FIG. 18 or 19, the graphical representation of catheter 12 may be spiral and in contact with the inner walls of the graphical representation of blood vessel 198. The size and shape of electric field 204 may be established based on the generic physical characteristics of tissue, as well as based on known physical characteristics of the electrodes of catheter 12. In other words, electric field 204 displayed in GUI 190 may only be an approximation of what the electric field would be in the region of the patient including the target nerve. However, in some examples, physical characteristics of the actual anatomical structure of the patient being treated may be used to generate electric field 204. This anatomical structure information may be presented to programmer 124 in the form of patient anatomical data generated by an imaging modality, such as CT, MM, or any other volumetric imaging system and stored within memory 128 (FIG. 13). Processor 125 may generate electric field 204 using, for example, tissue impedance models, field propagation models, or the like. In some examples, electric field 204 may be a representation of an electric field, current density, voltage gradient, or neuron activation, applied to a generic human tissue or patient-specific tissue characteristics. In addition, the user may be able to switch between any of these representations when desired.

The user may move electric field 204 up or down relative to a longitudinal axis of catheter 12 using vertical scroll bar 216 or some similar control interface. As electric field 204 moves up or down in response to the user input, programmer 124 automatically selects appropriate electrode(s) to support the vertical movement of electric field 204 within GUI 190. GUI 190 includes arrows 219 or similar input media that permit the user to transition between different rotational views.

In addition, the user may rotate the view shown in GUI 190 using horizontal scroll bar 210 or some similar control device, e.g., to visualize electric field 204 relative to other tissue sites not shown in all views. An arrow 212 may be provided next to horizontal scroll bar 210 to indicate the orientation of catheter 12 relative to an anatomical structure.

Movement of electric field 204 within GUI 190 using scroll bars 216 or similar input media may permit the user to evaluate different electric field positions without the need to manually select electrodes and manually enter parameter values. Instead, processor 125 of programmer 124 automatically selects electrodes and parameter values in response to movement of electric field 204 by the user. Although scroll bar 216 is illustrated as examples of input media for movement of electric field 204, other types of input media may be used. Examples include up/down arrows or side-to-side arrows, which may be presented on a touch screen or formed by buttons or keys on programmer 124.

As a further alternative to manipulating the electric field 204, the user may select electric field 204 with a stylus, mouse, or other pointing device and drag the field upward, downward, or rotationally. In some examples, a mouse or other pointing device may support left or right click functionality to perform different operations relative to electric field 204. With a stylus, a first click on electric field 204 may initiate movement, dragging with the stylus directs movement relative to the schematic illustration of catheter 12 in GUI 190, and a second click may terminate movement. In each case, processor 125 of programmer 124 responds to the specified movement by automatically adjusting the electrode combination and the stimulation parameters to approximate the characteristics of electric field 204 presented by GUI 190. As the stimulation parameter values change, the size and shape of electric field 204 presented on the display change. Similarly, as the electrode combination changes in terms of polarity or electrode selection, the size, shape or direction of electric field 204 presented on the display changes.

In some examples, processor 125 of programmer 124 may utilize stimulation templates and select the best fitting stimulation template set to a newly modified electric field 204 in order to generate therapy parameter values for achieving electric field 204 using a particular electrode array. A stimulation template is a predetermined volumetric electric field that processor 125 of programmer 124 may substantially match to a desired electric field 204 from the user. An algorithm for generating stimulation parameter values that fit the user defined electric field may be less computationally intensive for processor 125 compared to an algorithm that references multiple equations or lookup tables to generate the stimulation parameters. The stimulation template may be a representation of an electric field or other electrical stimulation related characteristic, e.g., current density, voltage gradient, or neuron activation, applied to a generic human tissue. For stored stimulation templates, processor 125 may adjust the RF energy to alter the size of the stimulation template to cover the desired electric field 204 from the user.

Processor 125 of programmer 124 may limit the rate of movement of electric field 204 within GUI 190. In other words, electric field 204 may only be moved a certain number of steps per second within GUI 190, or any other user interface that allows the user to drag the electric field. This rate movement limit may prevent unnecessary calculations or ensure patient comfort in real-time programming examples.

In addition to moving electric field 204, GUI 190 may permit the user to perform one or more operations that result in reconfiguration of electric field 204. For example, the user may click on a border, i.e., an outer perimeter, of electric field 204, and drag it inward or outward to resize the electric field. Resizing by enlarging or shrinking electric field 204 in GUI 190 may result in an increase or decrease in RF energy, and, therefore, changes to the parameter values of a therapy program used to generate electric field 204. In some examples, enlarging or shrinking electric field 204 also may result in selection or de-selection of electrodes included in the existing electrode combination. In either case, processor 125 of programmer 124 adjusts the electrode combination and/or parameter values in response to the enlargement or shrinkage of electric field 204 by the user.

When a user clicks on electric field 204 border and drags it, the entire electric field may be expanded in two dimensions in equal proportions. Alternatively, electric field 204 may expand only in the direction in which the user drags the electric field. For example, horizontal dragging of the field perimeter to enlarge electric field 204 may result in overall enlargement of the cross-sectional seize of electric field 204, keeping the vertical to horizontal aspect ratio constant. Alternatively, horizontal dragging may result only in horizontal expansion, leaving the vertical dimension constant. The application of a constant or varying aspect ratio may be specified by a user as a user preference. Alternatively, programmer 124 may provide different aspect ratio modes on a selective basis for expansion and shrinkage of electric field 204.

To enlarge or shrink electric field 204, the user may simply click on the electric field border within GUI 190. Alternatively, the user may click on a grow/shrink button 218 as shown in FIG. 18, and then click on the border of electric field 204 to drag it inward or outward and thereby adjust the size of the electric field. In response, processor 125 of programmer 124 may automatically reconfigure the selected electrode(s) and/or stimulation parameter values to approximate the resized electric field. In this way, a user may generate a volume of influence by directly manipulating the electric field 204. In each case, the user changes electric field 204 by simply changing the representation of the electric field 204 presented on GUI 190, thereby avoiding the need to manually select electrodes and parameter values.

A user may manipulate the size, shape, and/or location of electric field 204 (or another type of volume of influence in other examples) in order to, for example, better target a target nerve and/or to avoid an adverse-effect region. Thus, although not shown in FIG. 18, GUI 190 may include a graphical representation of the target nerve, an adverse-effect region, and/or other tissue sites of interest, or may at least include a medical image of the region of the patient overlaid with the graphical representation of catheter 12 and electric field 204. In some cases, a target nerve may not be visible in a medical image. In these examples, a graphical representation of an adverse-effect region, and/or other tissue sites of interest may still be useful information to present, as it would still guide a user to select denervation therapy parameter values that may avoid the adverse-effect region.

After selecting a desirable electric field 204, processor 125 of programmer 124 may determine the one or more therapy parameter values that are expected to result in the desirable electric field 204, e.g., based on computer model 132. Processor 125 may, in some examples, control generator 30 or another medical device to deliver denervation therapy to the region of the patient in accordance with the one or more therapy parameter values.

Figure 19:
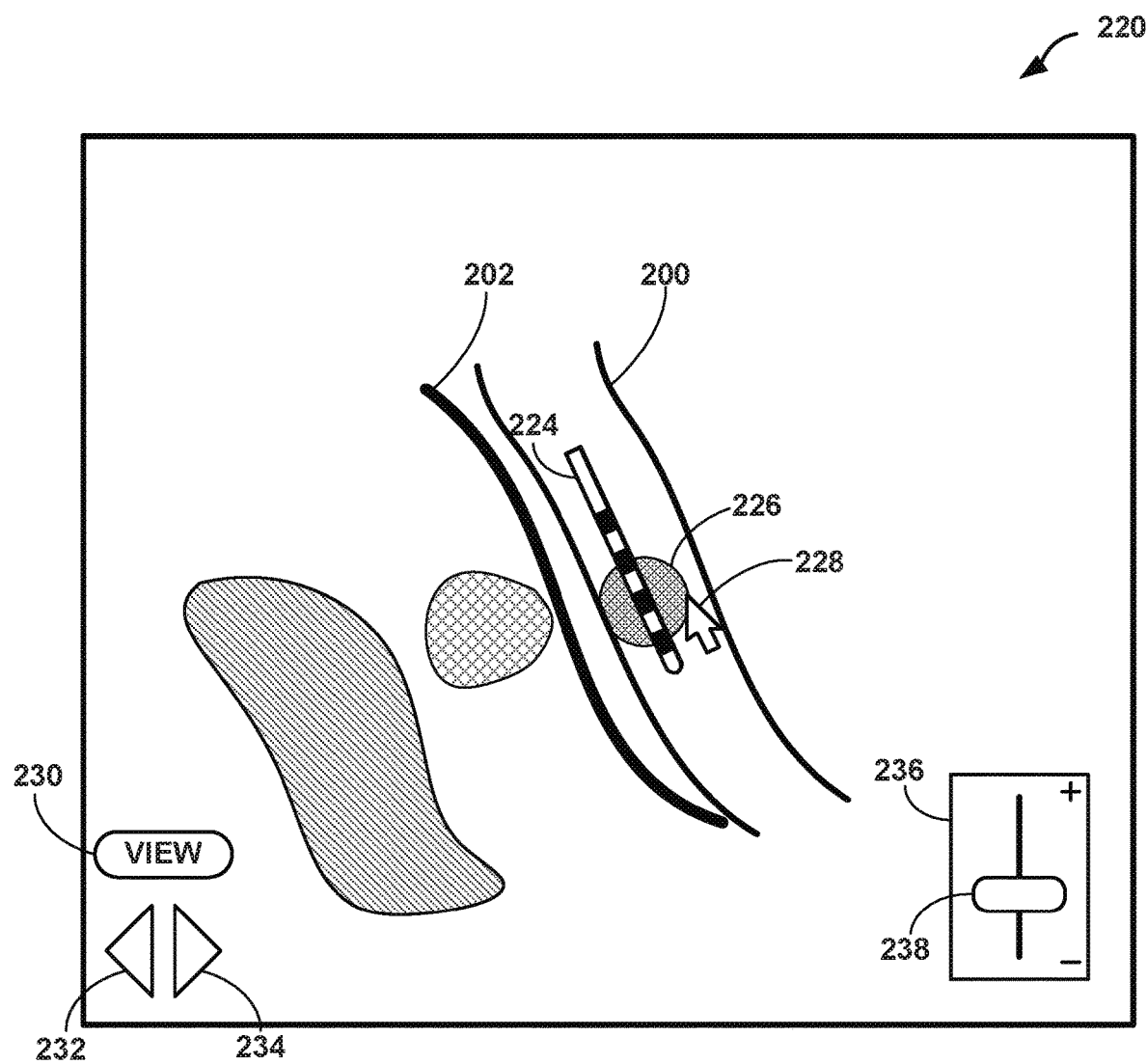
FIG. 19 is a schematic illustration of another example of a GUI that may be presented on the display of the programmer of FIG. 13.

FIG. 19 is a schematic illustration of another example of a GUI 220 that may be presented on the display of programmer 124. A user may interact with GUI 220 via user interface 126 of programmer 124 in order to select desired volumes of influence of denervation therapy and to determine whether a particular catheter and respective electrode array are suitable for achieving efficacious denervation therapy. GUI 220 includes a representation of an anatomical region of a patient, for example, a region including target nerve 102. In GUI 220, a device icon 224 representing catheter 12 is displayed within a graphical representation of a blood vessel 200.

Differently shaded portions of GUI 220 indicate varying densities of tissue within the region. For example, darker portions may indicate more dense tissue. A user may be able to recognize different anatomical structures or tissue types by viewing GUI 220. It should be noted that display 220 shown in FIG. 19 is merely an example image, and actual images may include a wider range of shades and higher image resolution.

Display 220 further includes pointer 228, previous arrow 232, next arrow 234, fine control input mechanism 236, and control slide 238. Pointer 228 may be controlled with a mouse and buttons, a track-ball, touch-pad, touch screen or other movement input device, which may be a part of user interface 126 of programmer 124. A user may use pointer 228 to drag device icon 224 into position or rotate device icon 224. The user may zoom in to or out of the view for a larger view of anatomical region, or move up, down, left, or right to view a larger or smaller portion of the region.

GUI 220 allows the user to select and adjust a size, and, in some examples, a shape of volume of influence 226, which may be further defined in other orthogonal views. The user may use pointer 228 to drag volume of influence 226 to define a smaller or larger size, which may correspond to a lower or higher RF energy level. For example, the user may click on a border, or perimeter of volume of influence 226, and then drag the border to expand or contract volume of influence 226. This adjustment is the coarse control of the size of volume of influence 226. The user may use pointer 228 to move control slide 238 up to slightly increase the size of volume of influence 226 or down to slightly decrease the size of volume of influence 226.

Processor 125 of programmer 124 may limit the rate of movement of volume of influence 226. For example, processor 125 may limit the movement of volume of influence 226 within GUI 220 to a certain number of steps per second. This rate movement limit may prevent unnecessary calculations in real-time changing of denervation therapy parameter values parameters with modifications of volume of influence 226.

View button 230 may permit a user to switch to another view of the region. The other views may include, for example, a view from a different orientation, or a view based on a different imaging technique.

While not shown in FIG. 18 or 19, GUI 190 or 220 may also show a representation of one or more electric fields generated by individual electrodes, in examples in which catheter 12 includes electrodes (for example, electrode arrays 14, 14*a*, 14*b*, 14*c*, or 14*d*).

The techniques described in this disclosure may be implemented, at least in part, in hardware, software, firmware, or any combination thereof. For example, various aspects of the described techniques may be implemented within processing circuitry, including one or more microprocessors, digital signal processors (DSPs), application specific integrated circuits (ASICs), field programmable gate arrays (FPGAs), or any other equivalent integrated or discrete logic circuitry, as well as any combinations of such components. The terms "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described instructions, units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the processing circuitry. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media, for example, non-transitory computer system-readable storage media.

Various examples have been described. These and other examples are within the scope of the following claims.

What is claimed is:

1. A catheter comprising:
   an elongated member configured to be navigated through vasculature of a patient, wherein the elongated member comprises an electrode array including:
   a distal electrode;
   a proximal electrode proximal to the distal electrode; and
   at least one intermediate electrode between the distal electrode and the proximal electrode, wherein the electrode array is configured such that energy can be delivered to the at least one intermediate electrode independent of energy delivery to at least one of the distal electrode or the proximal electrode, and wherein the at least one intermediate electrode and the at least one of the distal electrode or the proximal electrode differ in at least one electrode characteristic by at least a predetermined threshold such that delivery of a given electrical signal by each of the at least one intermediate electrode and the at least one of the distal electrode or the proximal electrode generates, for a given tissue site, substantially similar electric fields such that the electrode array is configured to generate a substantially uniform electric field with reference to a plane orthogonal to a longitudinal axis of the elongated member or an asymmetric electric field with reference to the plane orthogonal to the longitudinal axis of the elongated member.

2. The catheter of claim 1, wherein the distal electrode is a distal-most electrode of the electrode array and the proximal electrode is a proximal-most electrode of the electrode array.

3. The catheter of claim 1, wherein the at least one physical electrode characteristic includes at least one of an electrode length measured in a direction parallel to the longitudinal axis of the elongated member, an electrode surface area, an electrode shape, an electrode thickness measured in a direction orthogonal to the longitudinal axis, an electrode orientation, an electrode composition, or an electrical conductivity.

4. The catheter of claim 1, wherein the at least one intermediate electrode includes at least two intermediate electrodes, and wherein the at least one electrode characteristic is substantially the same for each intermediate electrode of the at least two intermediate electrodes.

5. The catheter of claim 4, wherein a first electrode spacing between the at least one intermediate electrode and the at least one of the distal electrode or the proximal electrode is different from a second electrode spacing between the at least two intermediate electrodes.

6. The catheter of claim 1, wherein the at least one electrode characteristic is substantially the same for the distal electrode and the proximal electrode.

7. The catheter of claim 1, wherein the at least one intermediate electrode and the at least one of the distal electrode or the proximal electrode are configured to generate lesions having a substantially similar volume in the given tissue site.

8. The catheter of claim 1, further comprising a distal conductive element and a proximal conductive element, wherein the distal conductive element is distal to the distal electrode and is configured to influence a distal electric field generated by delivery of a first electrical signal via the distal electrode, wherein the proximal conductive element is proximal to the proximal electrode and is configured to influence a proximal electric field generated by delivery of a second electrical signal delivered via the proximal electrode.

9. The catheter of claim 8, wherein the distal conductive element and the proximal conductive element influence the electric fields generated by the distal electrode and the proximal electrode to be similar to the electric fields generated by the intermediate electrodes.

10. The catheter of claim 1, wherein the elongated member comprises a distal portion including the electrode array, the distal portion being configured to define a helical configuration.

11. The catheter of claim 1, wherein the at least one intermediate electrode consists of two intermediate electrodes.

12. The catheter of claim 1, wherein at least one of the distal electrode, the proximal electrode, or the at least one intermediate electrode includes a continuous ring electrode or a partial ring or segmented electrode.

13. The catheter of claim 1, further comprising at least a first electrical conductor and a second electrical conductor, the first electrical conductor being configured to deliver a first electrical signal from a medical device to the at least one intermediate electrode, and the second electrical conductor being configured to deliver a second electrical signal from the medical device to the at least one of the distal electrode or the proximal electrode independent of delivery of the first electrical signal to the at least one intermediate electrode.

14. The catheter of claim 1, further comprising a plurality of electrical conductors extending within the elongated member, each electrical conductor of the plurality of electrical conductors being configured to deliver a respective electrical signal from a medical device to a respective electrode of the electrode array.

15. The catheter of claim 1, wherein the elongated member defines a lumen configured to receive a guidewire.

16. A system comprising:
a catheter comprising:
an elongated member configured to be navigated through vasculature of a patient,
wherein the elongated member comprises an electrode array including a plurality of selectively activatable electrodes, the selectively activatable electrodes including:
a distal electrode;
a proximal electrode proximal to the distal electrode; and
at least one intermediate electrode between the distal electrode and the proximal electrode, wherein the at least one intermediate electrode and at least one of the distal electrode or the proximal electrode differ in at least one physical electrode characteristic by at least a predetermined threshold such that delivery of a given electrical signal by each of the at least one intermediate electrode and the at least one of the distal electrode or the proximal electrode generates, for a given tissue site, substantially similar electric fields such that the electrode array is configured to generate a substantially uniform electric field with reference to a plane orthogonal to a longitudinal axis of the elongated member or an asymmetric electric field with reference to the plane orthogonal to the longitudinal axis of the elongated member; and
a medical device electrically coupled to the at least one intermediate electrode, the distal electrode, and the proximal electrode, wherein the medical device is configured to generate and deliver at least one electrical signal via at least one electrode of the electrode array.

17. The system of claim 16, wherein the electrical signal comprises a radiofrequency (RF) stimulus configured to ablate tissue at a target treatment site.

18. The catheter of claim 1, wherein the substantially similar electric fields do not differ in volume by more than 10%.

19. The catheter of claim 1, wherein the at least one electrode characteristic is at least one physical electrode characteristic.

* * * * *